US008634960B2

(12) United States Patent
Sandin et al.

(10) Patent No.: US 8,634,960 B2
(45) Date of Patent: Jan. 21, 2014

(54) LAWN CARE ROBOT

(75) Inventors: Paul E. Sandin, Brookline, NH (US); Joseph L. Jones, Acton, MA (US); Daniel N. Ozick, Newton, MA (US); David A. Cohen, Brookline, MA (US); David M. Lewis, Jr., Tyngsboro, MA (US); Clara Vu, Cambridge, MA (US); Zivthan A. Dubrovsky, Waltham, MA (US); Joshua B. Preneta, Billerica, MA (US); Jeffrey W. Mammen, Westford, MA (US); Duane L. Gilbert, Jr., Gottstown, NH (US); Tony L. Campbell, Pepperell, MA (US); John Bergman, River Falls, WI (US)

(73) Assignee: iRobot Corporation, Bedford, MA (US)

( * ) Notice: Subject to any disclaimer, the term of this patent is extended or adjusted under 35 U.S.C. 154(b) by 1229 days.

(21) Appl. No.: 11/688,225

(22) Filed: Mar. 19, 2007

(65) Prior Publication Data

US 2008/0109126 A1    May 8, 2008

Related U.S. Application Data

(60) Provisional application No. 60/783,268, filed on Mar. 17, 2006, provisional application No. 60/803,030, filed on May 23, 2006, provisional application No. 60/865,069, filed on Nov. 9, 2006.

(51) Int. Cl.
*A01D 34/00* (2006.01)

(52) U.S. Cl.
USPC ..................................... 700/258; 56/10.2 E

(58) Field of Classification Search
USPC .............. 701/245, 258, 261, 23, 27; 700/245, 700/250, 258, 259, 261; 318/567, 568.12, 318/568.16, 580; D15/14; 56/10.1, 10.2 R, 56/10.2 E, 10.2 F
See application file for complete search history.

(56) References Cited

U.S. PATENT DOCUMENTS

| 3,457,575 A | 7/1969 | Bienek |
| 3,550,714 A | 12/1970 | Bellinger |
| 3,674,316 A | 7/1972 | De Brey |

(Continued)

FOREIGN PATENT DOCUMENTS

| DE | 199 32 552 A1 | 2/2000 |
| DE | 19932552 | 2/2000 |

(Continued)

OTHER PUBLICATIONS

DE 19932552 Translation.*

(Continued)

*Primary Examiner* — Thomas Black
*Assistant Examiner* — Ce Li
(74) *Attorney, Agent, or Firm* — Fish & Richardson P.C.

(57) ABSTRACT

A robot lawnmower includes a body and a drive system carried by the body and configured to maneuver the robot across a lawn. The robot also includes a grass cutter and a swath edge detector, both carried by the body. The swath edge detector is configured to detect a swath edge between cut and uncut grass while the drive system maneuvers the robot across the lawn while following a detected swath edge. The swath edge detector includes a calibrator that monitors uncut grass for calibration of the swath edge detector. In some examples, the calibrator comprises a second swath edge detector.

20 Claims, 56 Drawing Sheets

(56) References Cited

U.S. PATENT DOCUMENTS

| | | | |
|---|---|---|---|
| 3,937,174 A | 2/1976 | Haaga | |
| 3,946,543 A * | 3/1976 | Templeton | 56/10.9 |
| 4,119,900 A | 10/1978 | Kremnitz | |
| 4,133,404 A * | 1/1979 | Griffin | 180/169 |
| 4,306,329 A | 12/1981 | Yokoi | |
| 4,369,543 A | 1/1983 | Chen et al. | |
| 4,513,469 A | 4/1985 | Godfrey et al. | |
| 4,545,453 A * | 10/1985 | Yoshimura et al. | 180/401 |
| 4,556,313 A | 12/1985 | Miller et al. | |
| 4,603,753 A | 8/1986 | Yoshimura et al. | |
| 4,626,995 A | 12/1986 | Lofgren et al. | |
| 4,674,048 A | 6/1987 | Okumura | |
| 4,679,152 A | 7/1987 | Perdue | |
| 4,696,074 A | 9/1987 | Cavalli et al. | |
| 4,700,301 A | 10/1987 | Dyke | |
| 4,700,427 A | 10/1987 | Knepper | |
| 4,716,621 A | 1/1988 | Zoni | |
| 4,733,431 A | 3/1988 | Martin | |
| 4,756,049 A | 7/1988 | Uehara | |
| 4,777,416 A | 10/1988 | George, II et al. | |
| 4,782,550 A | 11/1988 | Jacobs | |
| 4,811,228 A | 3/1989 | Hyyppa | |
| 4,854,000 A | 8/1989 | Takimoto | |
| 4,887,415 A | 12/1989 | Martin | |
| 4,893,025 A | 1/1990 | Lee | |
| 4,909,024 A * | 3/1990 | Jones et al. | 56/16.7 |
| 4,912,643 A | 3/1990 | Beirne | |
| 4,918,441 A | 4/1990 | Bohman | |
| 4,919,224 A | 4/1990 | Shyu et al. | |
| 4,933,864 A | 6/1990 | Evans et al. | |
| 4,962,453 A | 10/1990 | Pong et al. | |
| 4,974,283 A | 12/1990 | Holsten et al. | |
| 5,002,145 A | 3/1991 | Waqkaumi et al. | |
| 5,086,535 A | 2/1992 | Grossmeyer et al. | |
| 5,093,955 A | 3/1992 | Blehert et al. | |
| 5,109,566 A | 5/1992 | Kobayashi et al. | |
| 5,142,985 A | 9/1992 | Stearns et al. | |
| 5,163,202 A | 11/1992 | Kawakami et al. | |
| 5,163,273 A | 11/1992 | Wojtkowski et al. | |
| 5,165,064 A | 11/1992 | Mattaboni | |
| 5,204,814 A * | 4/1993 | Noonan et al. | 701/25 |
| 5,208,521 A | 5/1993 | Aoyama | |
| 5,216,777 A | 6/1993 | Moro et al. | |
| 5,239,720 A | 8/1993 | Wood et al. | |
| 5,261,139 A | 11/1993 | Lewis | |
| 5,279,672 A | 1/1994 | Belker, Jr. et al. | |
| 5,284,522 A | 2/1994 | Kobayashi et al. | |
| 5,293,955 A | 3/1994 | Lee | |
| 5,303,448 A | 4/1994 | Hennessey et al. | |
| 5,319,828 A | 6/1994 | Waldhauser et al. | |
| 5,321,614 A | 6/1994 | Ashworth | |
| 5,324,948 A | 6/1994 | Dudar et al. | |
| 5,341,540 A | 8/1994 | Soupert et al. | |
| 5,353,224 A | 10/1994 | Lee et al. | |
| 5,369,347 A | 11/1994 | Yoo | |
| 5,410,479 A | 4/1995 | Coker | |
| 5,440,216 A | 8/1995 | Kim | |
| 5,444,965 A | 8/1995 | Colens | |
| 5,446,356 A | 8/1995 | Kim | |
| 5,454,129 A | 10/1995 | Kell | |
| 5,455,982 A | 10/1995 | Armstrong et al. | |
| 5,465,525 A | 11/1995 | Mifune et al. | |
| 5,467,273 A | 11/1995 | Faibish et al. | |
| 5,497,529 A | 3/1996 | Boesi | |
| 5,507,067 A | 4/1996 | Hoekstra et al. | |
| 5,515,572 A | 5/1996 | Hoekstra et al. | |
| 5,534,762 A | 7/1996 | Kim | |
| 5,537,017 A | 7/1996 | Feiten et al. | |
| 5,539,953 A | 7/1996 | Kurz | |
| 5,542,146 A | 8/1996 | Hoekstra et al. | |
| 5,548,511 A | 8/1996 | Bancroft | |
| 5,553,349 A | 9/1996 | Kilstrom et al. | |
| 5,555,587 A | 9/1996 | Guha | |
| 5,560,077 A | 10/1996 | Crotchett | |
| 5,568,589 A | 10/1996 | Hwang | |
| 5,611,106 A | 3/1997 | Wulff | |
| 5,611,108 A | 3/1997 | Knowlton et al. | |
| 5,613,261 A | 3/1997 | Kawakami et al. | |
| 5,621,291 A | 4/1997 | Lee | |
| 5,622,236 A | 4/1997 | Azumi et al. | |
| 5,634,237 A | 6/1997 | Paranjpe | |
| 5,634,239 A | 6/1997 | Tuvin et al. | |
| 5,650,702 A | 7/1997 | Azumi | |
| 5,652,489 A | 7/1997 | Kawakami | |
| 5,682,213 A | 10/1997 | Schmutz | |
| 5,682,313 A | 10/1997 | Edlund et al. | |
| 5,682,839 A | 11/1997 | Grimsley et al. | |
| 5,709,007 A | 1/1998 | Chiang | |
| 5,761,762 A | 6/1998 | Kubo | |
| 5,781,960 A | 7/1998 | Kilstrom et al. | |
| 5,787,545 A | 8/1998 | Colens | |
| 5,794,297 A | 8/1998 | Muta | |
| 5,812,267 A | 9/1998 | Everett, Jr. et al. | |
| 5,819,008 A | 10/1998 | Asama et al. | |
| 5,825,981 A | 10/1998 | Matsuda | |
| 5,839,156 A | 11/1998 | Park et al. | |
| 5,841,259 A | 11/1998 | Kim et al. | |
| 5,867,800 A | 2/1999 | Leif | |
| 5,926,909 A | 7/1999 | McGee | |
| 5,935,179 A | 8/1999 | Kleiner et al. | |
| 5,940,927 A | 8/1999 | Haegermarck et al. | |
| 5,940,930 A | 8/1999 | Oh et al. | |
| 5,942,869 A | 8/1999 | Katou et al. | |
| 5,943,730 A | 8/1999 | Boomgaarden | |
| 5,943,733 A | 8/1999 | Tagliaferri | |
| 5,959,423 A | 9/1999 | Nakanishi et al. | |
| 5,974,348 A | 10/1999 | Rocks | |
| 6,009,358 A | 12/1999 | Angott et al. | |
| 6,041,471 A | 3/2000 | Charky et al. | |
| 6,049,745 A | 4/2000 | Douglas et al. | |
| 6,076,025 A | 6/2000 | Ueno et al. | |
| 6,076,227 A | 6/2000 | Schalig et al. | |
| 6,108,076 A | 8/2000 | Hanseder | |
| 6,112,143 A | 8/2000 | Allen et al. | |
| 6,124,694 A | 9/2000 | Bancroft et al. | |
| 6,166,706 A | 12/2000 | Gallagher et al. | |
| 6,226,830 B1 | 5/2001 | Hendriks et al. | |
| 6,240,342 B1 | 5/2001 | Fiegert et al. | |
| 6,255,793 B1 | 7/2001 | Peless et al. | |
| 6,259,979 B1 | 7/2001 | Holmquist | |
| 6,285,930 B1 | 9/2001 | Dickson et al. | |
| 6,300,737 B1 | 10/2001 | Begvall et al. | |
| 6,374,155 B1 | 4/2002 | Wallach et al. | |
| 6,385,515 B1 | 5/2002 | Dickson et al. | |
| 6,408,226 B1 | 6/2002 | Byrne et al. | |
| 6,438,456 B1 | 8/2002 | Feddema et al. | |
| 6,442,476 B1 | 8/2002 | Poropat | |
| 6,444,003 B1 | 9/2002 | Sutcliffe | |
| 6,463,368 B1 | 10/2002 | Feiten et al. | |
| 6,493,613 B2 | 12/2002 | Peless et al. | |
| 6,496,754 B2 | 12/2002 | Song et al. | |
| 6,496,755 B2 | 12/2002 | Wallach et al. | |
| 6,507,773 B2 | 1/2003 | Parker et al. | |
| 6,525,509 B1 | 2/2003 | Petersson et al. | |
| 6,532,404 B2 | 3/2003 | Colens | |
| 6,535,793 B2 | 3/2003 | Allard | |
| 6,548,982 B1 | 4/2003 | Papanikolopoulos et al. | |
| 6,571,415 B2 | 6/2003 | Gerber et al. | |
| 6,574,536 B1 | 6/2003 | Kawagoe et al. | |
| 6,580,246 B2 | 6/2003 | Jacobs | |
| 6,580,978 B1 | 6/2003 | McTamaney | |
| 6,584,376 B1 | 6/2003 | Kommer | |
| 6,594,844 B2 | 7/2003 | Jones | |
| 6,604,022 B2 | 8/2003 | Parker | |
| 6,605,156 B1 | 8/2003 | Clark et al. | |
| 6,611,120 B2 | 8/2003 | Song et al. | |
| 6,611,734 B2 | 8/2003 | Parker et al. | |
| 6,611,738 B2 | 8/2003 | Ruffner | |
| 6,615,108 B1 | 9/2003 | Peless et al. | |
| 6,658,693 B1 | 12/2003 | Reed, Jr. | |
| 6,661,239 B1 | 12/2003 | Ozick | |
| 6,671,592 B1 | 12/2003 | Bisset et al. | |
| 6,690,134 B1 | 2/2004 | Jones et al. | |
| 6,741,054 B2 | 5/2004 | Koselka et al. | |

(56) References Cited

U.S. PATENT DOCUMENTS

| | | |
|---|---|---|
| 6,748,297 B2 | 6/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,841,963 B2 | 1/2005 | Song et al. |
| 6,845,297 B2 | 1/2005 | Allard |
| 6,870,792 B2 | 3/2005 | Chiappetta |
| 6,883,201 B2 | 4/2005 | Jones et al. |
| 6,901,624 B2 | 6/2005 | Mori et al. |
| D510,066 S | 9/2005 | Hickey et al. |
| 6,938,298 B2 | 9/2005 | Aasen |
| 6,940,291 B1 | 9/2005 | Ozick |
| 6,956,348 B2 | 10/2005 | Landry et al. |
| 6,971,140 B2 | 12/2005 | Kim |
| 6,999,850 B2 | 2/2006 | McDonald |
| 7,024,278 B2 | 4/2006 | Chiappetta et al. |
| 7,069,124 B1 | 6/2006 | Whittaker et al. |
| 7,085,624 B2 | 8/2006 | Aldred et al. |
| 7,206,677 B2 | 4/2007 | Hulden |
| 2001/0047231 A1 | 11/2001 | Peless et al. |
| 2002/0011813 A1 | 1/2002 | Koselka et al. |
| 2002/0016649 A1 | 2/2002 | Jones |
| 2002/0120364 A1 | 8/2002 | Colens |
| 2002/0156556 A1 | 10/2002 | Ruffner |
| 2002/0160845 A1 | 10/2002 | Simonsen |
| 2002/0173877 A1 | 11/2002 | Zweig |
| 2003/0019071 A1 | 1/2003 | Field et al. |
| 2003/0025472 A1 | 2/2003 | Jones et al. |
| 2003/0055337 A1* | 3/2003 | Lin .............................. 600/459 |
| 2003/0060928 A1 | 3/2003 | Abramson et al. |
| 2003/0120389 A1 | 6/2003 | Abramson et al. |
| 2003/0137268 A1 | 7/2003 | Papanikolopoulos et al. |
| 2003/0182914 A1 | 10/2003 | Shibata et al. |
| 2003/0192144 A1 | 10/2003 | Song et al. |
| 2003/0216834 A1 | 11/2003 | Allard |
| 2003/0233177 A1 | 12/2003 | Johnson et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0076324 A1 | 4/2004 | Burl et al. |
| 2004/0088079 A1 | 5/2004 | Lavarec et al. |
| 2004/0111184 A1 | 6/2004 | Chiappetta et al. |
| 2004/0134336 A1 | 7/2004 | Solomon |
| 2004/0134337 A1 | 7/2004 | Solomon |
| 2004/0156541 A1 | 8/2004 | Jeon et al. |
| 2004/0158357 A1 | 8/2004 | Lee et al. |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0220000 A1* | 11/2004 | Falone et al. .................. 473/568 |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0007057 A1* | 1/2005 | Peless et al. .................. 318/580 |
| 2005/0010331 A1 | 1/2005 | Taylor et al. |
| 2005/0020374 A1* | 1/2005 | Wang .............................. 473/300 |
| 2005/0097952 A1* | 5/2005 | Steph et al. .................. 73/304 R |
| 2005/0108999 A1 | 5/2005 | Bucher |
| 2005/0113990 A1 | 5/2005 | Peless et al. |
| 2005/0156562 A1 | 7/2005 | Cohen et al. |
| 2005/0204717 A1 | 9/2005 | Colens |
| 2006/0293794 A1 | 12/2006 | Harwig et al. |
| 2007/0016328 A1 | 1/2007 | Ziegler et al. |

FOREIGN PATENT DOCUMENTS

| | | |
|---|---|---|
| EP | 0 774 702 A | 5/1997 |
| EP | 0774702 | 5/1997 |
| EP | 0 792 726 | 9/1997 |
| EP | 1 331 537 | 7/2003 |
| EP | 1 331 537 A1 | 7/2003 |
| EP | 1704766 | 9/2006 |
| FR | 2 828 589 | 8/2001 |
| GB | 2 142 447 A | 1/1985 |
| GB | 2142447 | 1/1985 |
| GB | 2 283 838 | 5/1995 |
| GB | 2 382 157 | 5/2003 |
| JP | 62-120510 | 6/1987 |
| JP | 62-154008 | 7/1987 |
| JP | 62154008 | 7/1987 |
| JP | 63-183032 | 7/1988 |
| JP | 63-241610 | 10/1988 |
| JP | 2-6312 | 1/1990 |
| JP | 03-051023 | 3/1991 |
| JP | 06-327598 | 11/1994 |
| JP | 07-129239 | 5/1995 |
| JP | 7-295636 | 11/1995 |
| JP | 8-16776 | 1/1996 |
| JP | 08-089451 | 4/1996 |
| JP | 08-152916 | 6/1996 |
| JP | 9-179625 | 7/1997 |
| JP | 9185410 | 7/1997 |
| JP | 11-508810 | 8/1999 |
| JP | 11-510935 | 9/1999 |
| JP | 2001-258807 | 9/2001 |
| JP | 2001-275908 | 10/2001 |
| JP | 2001-525567 | 12/2001 |
| JP | 2002-78650 | 3/2002 |
| JP | 2002-204768 | 7/2002 |
| JP | 2002-532178 | 10/2002 |
| JP | 3356170 | 10/2002 |
| JP | 2002-323925 | 11/2002 |
| JP | 3375843 | 11/2002 |
| JP | 2002-355206 | 12/2002 |
| JP | 2002-360471 | 12/2002 |
| JP | 2002-360482 | 12/2002 |
| JP | 2003-10076 | 1/2003 |
| JP | 2003-5296 | 2/2003 |
| JP | 2003-036116 | 2/2003 |
| JP | 2003-38401 | 2/2003 |
| JP | 2003-38402 | 2/2003 |
| JP | 2003-505127 | 2/2003 |
| JP | 2003036116 | 2/2003 |
| JP | 2003-061882 | 3/2003 |
| JP | 2003-310489 | 11/2003 |
| WO | WO 95/26512 | 10/1995 |
| WO | WO 97/40734 | 11/1997 |
| WO | WO 97/41451 | 11/1997 |
| WO | WO 98/53456 | 11/1998 |
| WO | WO 99/16078 | 4/1999 |
| WO | WO 99/28800 | 6/1999 |
| WO | WO 99/38056 | 7/1999 |
| WO | WO 99/38237 | 7/1999 |
| WO | WO 99/59042 | 11/1999 |
| WO | WO 00/04430 | 1/2000 |
| WO | WO 00/36962 | 6/2000 |
| WO | WO 00/38026 | 6/2000 |
| WO | WO 00/38029 | 6/2000 |
| WO | WO 00/78410 | 12/2000 |
| WO | WO 01/06904 | 2/2001 |
| WO | WO 01/06905 | 2/2001 |
| WO | WO 02/39864 | 5/2002 |
| WO | WO 02/39868 | 5/2002 |
| WO | WO 02/058527 | 8/2002 |
| WO | WO 02/062194 | 8/2002 |
| WO | WO 02/067744 | 9/2002 |
| WO | WO 02/067745 | 9/2002 |
| WO | WO 02/074150 | 9/2002 |
| WO | WO 02/075356 | 9/2002 |
| WO | WO 02/075469 | 9/2002 |
| WO | WO 02/075470 | 9/2002 |
| WO | WO 02/101477 | 12/2002 |
| WO | WO 03/026474 | 4/2003 |

(56) References Cited

FOREIGN PATENT DOCUMENTS

| WO | WO 03/040845 | 5/2003 |
|---|---|---|
| WO | WO 03/040846 | 5/2003 |
| WO | WO 2004/006034 | 1/2004 |
| WO | WO 2004004533 A1 | 1/2004 |
| WO | WO2004058028 A2 | 1/2004 |
| WO | WO 2005/055795 | 6/2005 |
| WO | WO2005077244 A1 | 8/2005 |
| WO | WO2006068403 A1 | 6/2006 |

OTHER PUBLICATIONS

Bohn J., et al. "Super-distributed RFID Tag Infrastructures," Lecture Notes in Computer Science, Springer Verlag, Berlin, DE, vol. 3295, pp. 1-12, Nov. 11, 2004.
International Preliminary Report on Patentability dated Sep. 23, 2008 from International Application No. PCT/US2007/064323.
International Preliminary Report on Patentability dated Sep. 23, 2008 from International Application No. PCT/US2007/064326.
Partial International Search Report dated Apr. 18, 2008 from counterpart application PCT/US2007/064326.
Cameron Morland, *Autonomous Lawn Mower Control*, Jul. 24, 2002.
Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993, pp. 1-6.
Electrolux designed for the well-lived home, website: http://www.electroluxusa.com/node57.as[?currentURL=nodel42.asp%3F, acessed Mar. 18, 2005.
eVac Robotic Vacuum S1727 Instruction Manual, Sharper Image Corp, Copyright 2004.
Everyday Robots, website: http://www.everydayrobots.com/index.php?option=content&task=view&id=9, accessed Apr. 20, 2005.
Facts on the Trilobite webpage: "http://trilobiteelectroluxse/presskit_en/nodel1335asp?print=yes&pressID=" accessed Dec. 12, 2003.
Friendly Robotics Robotic Vacuum RV400—The Robot Store website: http://www.therobotstore.com/s.nl/sc.9/category,-109/it.A/id.43/.f, accessed Apr. 20, 2005.
Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.
Hitachi: News release: The home cleaning robot of the autonomous movement type (experimental machine) is developed, website: http://www.i4u.com/japanreleases/hitachirobot.htm., accessed Mar. 18, 2005.
Karcher Product Manual Download webpage: "http://wwkarchercom/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004.
Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec. 2002.
Kärcher RoboCleaner RC 3000 Product Details webpages: "http://wwwrobocleanerde/english/screen3html" through "...screen6html" accessed Dec. 12, 2003.
Karcher USA, RC3000 Robotic Cleaner, website: http://www.karcher-usa.com/showproducts.php?op=view_prod&param1=143&paràm2=&param3=, accessed Mar. 18, 2005.
Koolvac Robotic Vacuum Cleaner Owner's Manual, Koolatron, Undated.
NorthStar Low-Cost, Indoor Localization, Evolution robotics, Powering Intelligent Products.
Put Your Roomba . . . On "Automatic" Roomba Timer> Timed Cleaning-Floorvac Robotic Vacuum webpages: http://cgi.ebay.com/ws/eBayISAPI.dll?ViewItem&category=43575198387&rd=1, accessed Apr. 20, 2005.
Put Your Roomba . . . On "Automatic" webpages: "http://www.acomputeredge.com/roomba," accessed Apr. 20, 2005.
RoboMaid Sweeps Your Floors So You Won't Have to, the Official Site, website: http://www.thereobomaid.com/, acessed Mar. 18, 2005.
Robot Review Samsung Robot Vacuum (VC-RP30W), website: http://www.onrobo.com/reviews/At_Home/Vacuun_Cleaners/on00vcrp30rosam/index.htm, accessed Mar. 18, 2005.
Robotic Vacuum Cleaner-Blue, website: http://www.sharperimage.com/us/en/catalog/productview.jhtml?sku=S1727BLU, accessed Mar. 18, 2005.
Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.
Wired News: Robot Vacs Are in the House, website: http://www.wired.com/news/print/0,1294,59237,00.html, accessed Mar. 18, 2005.
Zoombot Remote Controlled Vaccum-RV-500 NEW Roomba 2, website: http://cgi.ebay.com/ws/eBayISAPI.dll?ViewItem&category=43526&item=4373497618&rd=1, accessed Apr. 20, 2005.
Hicks et al., "A Survey of Robot Lawn Mowers", http://www.robotics.uc.edu/papers/paper2000/lawnmower.pdf (8 pages).
Wigley, M. "The Electric Lawn", in *The American Lawn*, Princeton Architectural Press new York with Canadian Centre for Architecture Montreal, pp. 155-195 (1999).
International Search Report from counterpart application PCT/US2007/064326, dated Jul. 17, 2008.
Examination report dated Jan. 26, 2011 for U.S. Appl. No. 12/488,094.
Examination report dated Jan. 27, 2011 for U.S. Appl. No. 11/688,213.
Caracciolo L., De Luca A. and Iannitti S. (1999): Trajectory Tracking Control of a Four-wheel Differentially Driven Mobile Robot. IEEE Int. Conf. Robotics and Automation, Detroit, MI, pp. 2632-2638.
K. Kozlowski and D. Pazderski. Modeling and Control of a 4-wheel Skid-steering Mobile Robot. International J. of Applied Mathematics and Computer Science, 14:477-496,2004.
H. Kimura, S. Hirose and K. Shimizu, "Stuck Evasion Control for Active Wheel Passive-Joint Snake-like Mobile Robot 'Genbu'." Proceedings of the 2004 IEEE International Conference on Robotics 8 Automation New Orleans, LA Apr. 2004.
Kubitz O., et al. "Application of radio frequency identification devices to support navigation of autonomous mobile robots" Vehicular Technology Conference, vol. 1, pp. 126-130, May 4, 1997.
"Detecting Water Hazards for Autonomous Off-Road Navigation," Proceedings of SPIE Conference 5083: *Unmanned Ground Vehicle Technology V*, Orlando, FL, Apr. 2003, pp. 231-242.
Sebastian Thrun, Learning Occupancy Grid Maps with Forward Sensor Models, School of Computer Science Carnegie Mellon University, pp. 1-28.
Svetlana Domnitcheva "Smart Vacuum Cleaner an Autonomous Location-Aware Cleaning Device" Proceedings of the International Conference on Ubiquitous Computing, pp. 1-2, Sep. 10, 2004.
Examination report dated Nov. 2, 2011 for U.S. Appl. No. 11/688,213.
Examination report dated Jul. 28, 2011 for U.S. Appl. No. 12/488,094.

\* cited by examiner

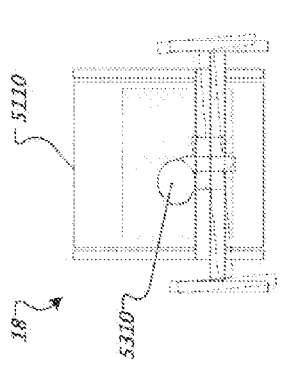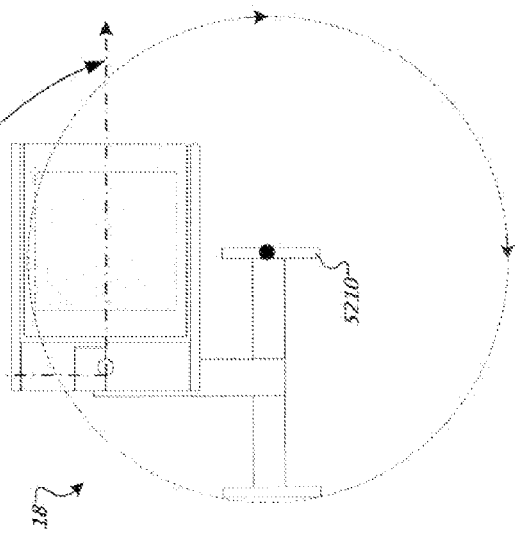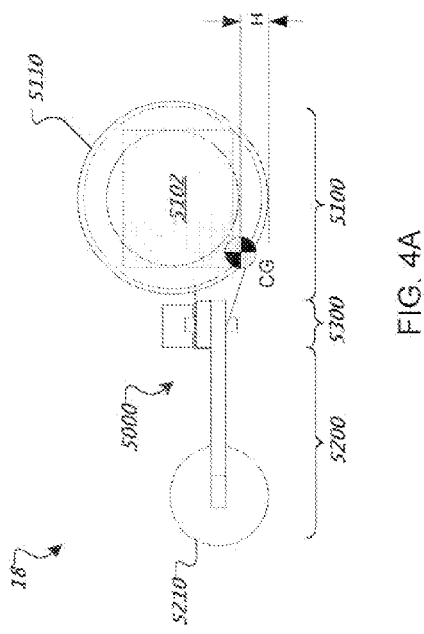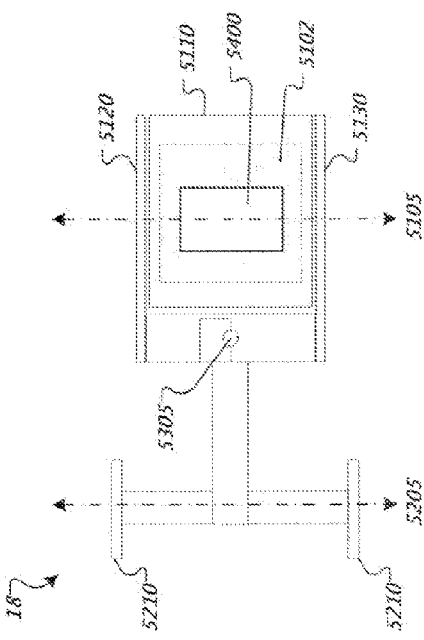

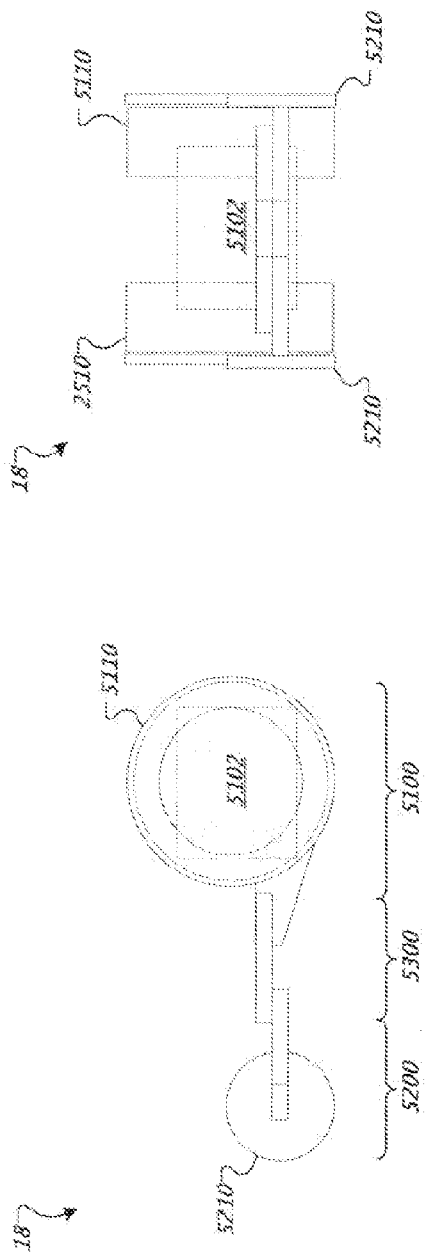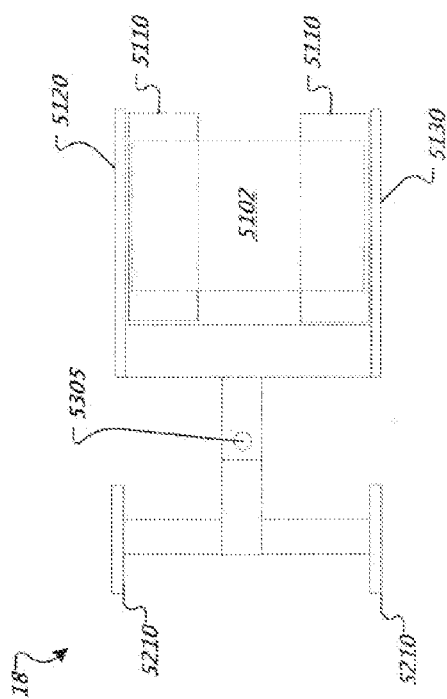

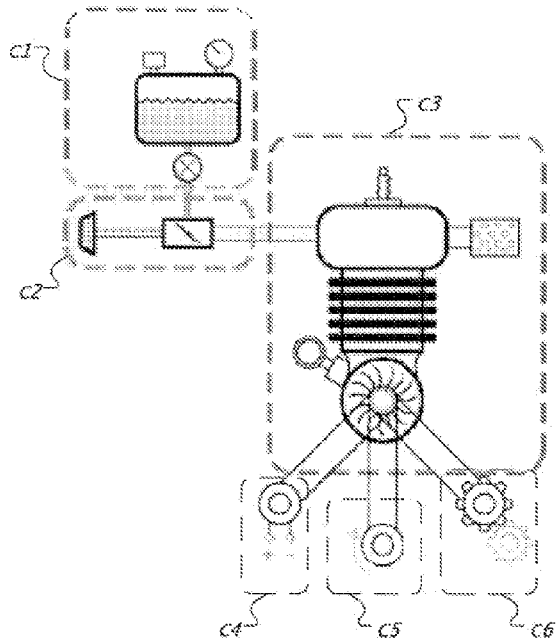

FIG. 6C

| | C1 Fuel | C2 Intake | C3 Engine | C4 Electrical Output | C5 Starting | C6 Mechanical Output | |
|---|---|---|---|---|---|---|---|
| Expected System | • Tank<br>• Vent with Breather<br>• Tank Filter<br>• Fuel Line<br>• Fuel Valve | • Air Filter<br>• Intake Tubing/ Manifold<br>• Carburetor<br>• Throttle<br>• Choke | • Cylinder Head<br>• Cylinder<br>• Exhaust Muffler<br>• Crank case<br>• Output Shaft<br>• Spark Plug<br>• Spark Control Coil<br>• Spark Control Magneto<br>• Cooling System<br>• Oil System | • Alternator / Generator<br>• Wires<br>• CPU | • Electric Motor<br>• Starting Relays<br>• High amp Wires<br>• Battery<br>• Starting System Control<br>• Battery Charge Circuit<br>• Batty Volt Meter | • Output Shaft<br>• Support Bearings<br>• Coupler | Required |
| | • Fuel Level Sensor | • Active Throttle Control<br>• Air Filter Sensing<br>• Active Choke Control | • Crank Velocity Sensor<br>• Oil Level Sensor | • Rectifiers<br>• Voltage Sensor<br>• Battery | | • Clutch<br>• Speed Sensor | |
| | • Fuel Pump<br>• Fuel Pressurization<br>• Fuel Pressure Sender | • Fuel Injection<br>• Pressure Sensors<br>• Temp Sensors<br>• Throttle Position Sensor | • Active Spark Control<br>• Crank Position Sensor<br>• Temp Sensors | • Voltage Regulator | • One-way Clutch<br>• Pull-start Cord<br>• Handle<br>• Offset Drive System | • Transmission<br>• Speed Reducer<br>• Clutch Actuator<br>• Direction Reverser<br>• Load Sensor | Optional |

FIG. 6D

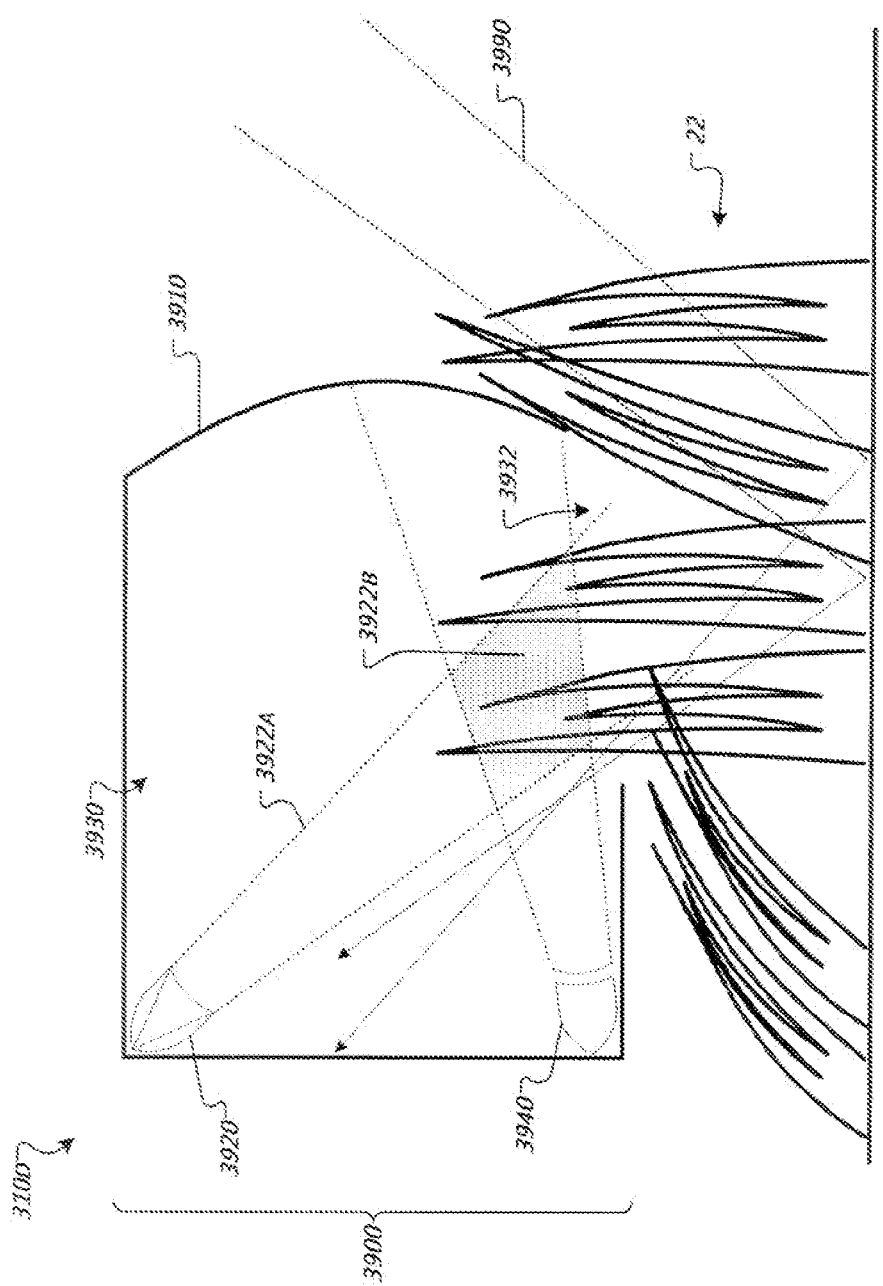

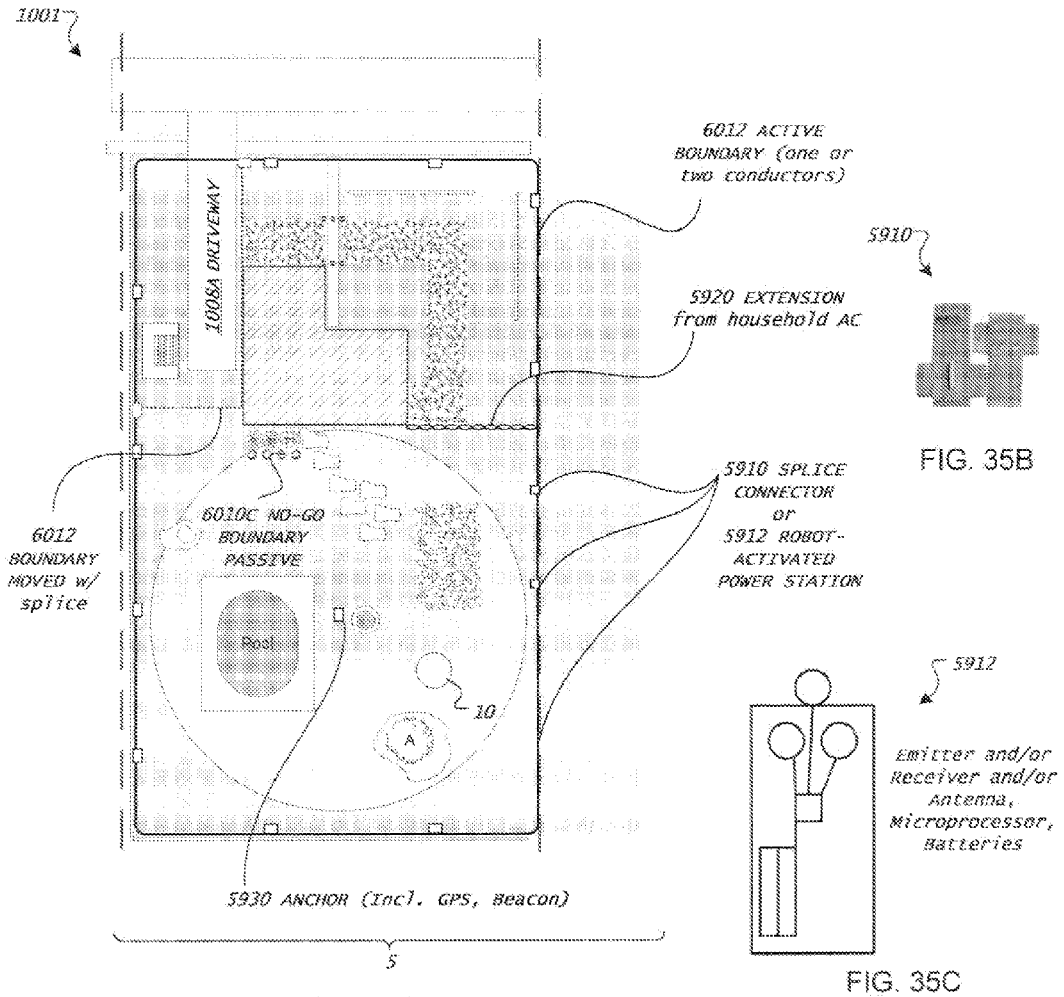
FIG. 35A
FIG. 35B
FIG. 35C
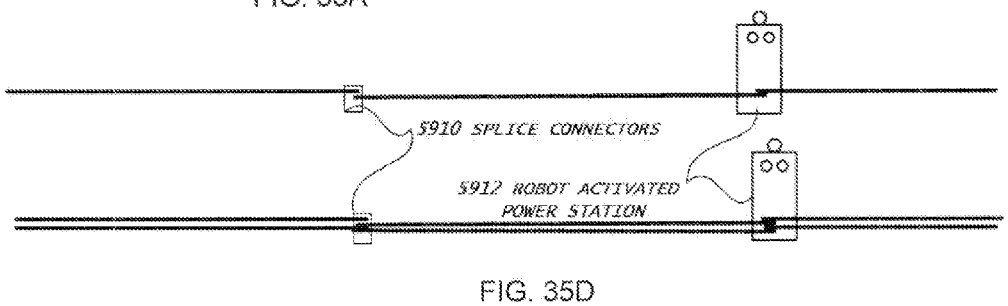
FIG. 35D

LAWN CARE ROBOT

This U.S. patent application claims priority under 35 U.S.C. 119(e) from U.S. provisional patent application 60/783,268, filed Mar. 17, 2006, and entitled "LAWN CARE ROBOT," from U.S. provisional patent application 60/803,030, filed May 23, 2006, and entitled "LAWNMOWER HAVING RECIPROCATING SHEARS," and from U.S. provisional patent, application 60/865,069, filed Nov. 9, 2006, and entitled "HIGHLY MANEUVERABLE AUTONOMOUS PLATFORM." The entire contents of all three priority provisional applications are hereby incorporated by reference.

TECHNICAL FIELD

The disclosure relates to an autonomous robot that can perform lawn care tasks.

BACKGROUND

Autonomous robots that perform household functions such as floor cleaning and lawn cutting are now readily available consumer products. Commercially successful robots are not unnecessarily complex, and generally operate randomly within a confined area. In the case of floor cleaning, such robots are generally confined within (i) touched walls and other obstacles within the rooms of a dwelling, (ii) IR-detected staircases (cliffs) down; and/or (iii) user placed detectable barriers such as directed IR beams, physical barriers or magnetic tape. Walls provide most of the confinement perimeter. Other, much less ubiquitous robots may try to localize or to map the dwelling using a complex system of sensors and/or active or passive beacons (e.g., sonar, RFID or bar code detection, or various kinds of machine vision).

There are examples of consumer robotic lawn mowers that use a similar "invisible" barrier—a continuous guide conductor boundary proposed for confining random motion robotic mowers by the early 1960's (See, e.g., U.S. Pat. Nos. 3,128,840, 3,550,714). Examples include commercial products by Electrolux, Husqvarna, Zucchetti S.A., Belrobotics, and Friendly Robotics. The guide conductor is intended to confine the robot within the lawn or other appropriate area, so as to avoid damaging non-grassy areas of the yard or intruding onto a neighboring property. The conductor is one continuous loop around the property to be mowed. Although the guide conductor can be drawn into the property in peninsulas to surround gardens or other off-limits areas, it remains a continuous loop, and is energized with an AC current detectable as a magnetic field at a few feet. The guide conductor must be supplied with power, usually from a wall socket. Within the bounded area, the known robots may "bounce" randomly as the robot nears the guide conductor, or may follow along the guide conductor. Some of the mowers also touch and bounce from physical barriers. More complex commercial mowers may try to localise or to map the mowing area, again using a complex system of sensors and/or active or passive beacons (e.g., sonar, encoded optical retro-reflector detection, machine vision).

SUMMARY

In one aspect, a robot lawnmower includes a body and a drive system earned by the body and configured to maneuver the robot across a lawn. The robot also includes a grass cutter and a swath edge detector, both carried by the body. The swath edge detector is configured to detect a swath edge between cut and uncut grass while the drive system maneuvers the robot across the lawn while following a detected swath edge. The swath edge detector includes a calibrator that monitors uncut grass for calibration of the swath edge detector. In same examples, the calibrator comprises a second swath edge detector.

Implementations of this aspect of the disclosure may include one or more of the following features. In some implementations, the swath edge detector includes an array of grass length sensors spanning a distance comprising at least a steering error distance and a grass length sensor width. In one example, the swath edge detector has a width of between about 4 and about 10 inches. A first portion of the array is arranged to detect the swath edge and a second portion of the array is arranged to monitor uncut grass.

In some implementations, the swath edge detector includes a plurality of sensor components. Each sensor component includes a sensor housing defining a cavity and a cavity opening configured to allow grass entry while inhibiting direct sunlight into the cavity. Each sensor component also includes an emitter carried by the housing in the cavity and configured to emit an emission across the cavity opening. A receiver, carried by the housing, is configured to receive a grass-reflected emission and is positioned in the cavity to avoid exposure to direct sunlight. The emission may be infrared light. In some examples, the calibrator includes at least one of the sensor components.

In another implementation, the swath edge detector includes multiple projections extending downwardly from the body and an emissive sensor mounted to each projection. The emissive sensor has an emitter and a receiver. The emitter is configured to emit an emission and the receiver is configured to detect the emission as reflected. In some examples, the calibrator includes at least one of the projections.

In yet another implementation, the swath edge detector includes first and second electrically conductive projections extending downwardly from the body. The second projection is longer than the first projection. The first and second projections are configured to form an electric circuit with moist grass contacting the first and second projections.

In some implementations, the swath edge detector includes first and second projections extending downwardly from the body. The first projection is longer than the second projection and a vibration sensor is secured to each projection and is responsive to vibrations therein. The projections may be crenulated flaps.

The robot lawnmower includes a grass orientor, in some examples, carried by the body forward of the swath edge detector and configured to orient grass. The grass orientor may be a flattening wheel.

In some instances, the robot lawnmower includes a not-lawn detector carried by the body and responsive to non-grass surfaces, wherein the drive system, is configured to redirect the robot in response to the detector detecting a non-grass surface. The not-lawn detector includes a sensor housing defining emitter and receiver receptacles. An audio transmitter is carried in the emitter receptacle and transmits an audio emission. A receiver is carried in the receiver receptacle and is configured to receive an audio emission reflected off a ground surface. A controller of the robot compares a received reflected audio emission with a threshold energy to detect a non-grass surface. The audio transmitter transmits multiple audio emissions starting at a fundamental frequency and successively increasing the wavelength of each emission by half the fundamental frequency. For example, the audio transmitter transmits a first audio emission at about 6.5 kHz and a second audio emission at about 8.67 kHz. The controller receives the reflected audio emission from the receiver though a narrow band-pass amplifier. An anti-vibration mounting system secures the receiver in the receiver receptacle. The anti-vibration mounting system includes a first elastic support holding the receiver in a tube below a sound absorber. The tube is secured in the receiver receptacle with a second elastic support having a lower durometer than the first elastic support.

In some examples, the not-lawn detector includes four different colored narrow-spectrum light emitters and an optical receiver that receives reflected light from the emitters. The optical receiver is configured to detect grass by evaluating the received light in other examples, the net-lawn detector is responsive to a pH of the lawn.

The robot lawnmower may include a side trimmer carried on a periphery of the body and configured to cut lawn adjacent the body. The body may define a substantially circular profile in a horizontal plane or a substantially pentagonal profile in a horizontal plane.

The robot lawnmower may include at least one grass erector carried by the body and configured to erect grass. The grass erector includes a driven wheel having an axis of rotation parallel to the lawn and a plurality of flexible grass agitators extending radially outward from the wheel. The robot lawnmower may also include a stasis detector carried by the body.

In another aspect, a robot lawnmower swath edge detector system includes a controller carried by a body of a robot and a plurality of grass length sensors carried by the body and in communication with the controller. Each grass length sensors includes a sensor housing defining a cavity and a cavity opening configured to allow grass entry while inhibiting direct sunlight into the cavity. An emitter is carried by the housing in the cavity and is configured to emit an emission across the cavity opening. A receiver is carried by the housing and is configured to receive a grass-reflected emission. The receiver is positioned in the cavity to avoid exposure to direct sunlight. The controller compares outputs from multiple ones of the grass length sensors to determine a swath edge location. In some implementations, the plurality of grass length sensors spans a distance comprising at least a steering error distance and a grass length sensor width. In one example, the plurality of grass length sensors spans a distance of between about 4 and about 10 inches.

In yet another aspect, a robot lawnmower includes a first body portion defining a payload area and carrying a drive system having at least one driven wheel. The driven wheel has a diameter sized to circumscribe the payload area. A controller is figured to control the drive system to maneuver the lawnmower to traverse a lawn while cutting grass. A second body portion is joined to the first body portion by an articulated joint and carries at least one free wheel. An actuator is actuable to rotate the first body portion relative to the second body portion at the articulated joint in response to a signal received from the controller. A grass cutter is carried by at least one of the first and second body portions.

Implementations of this aspect of the disclosure may include one or more of the following features. In some implementations, the driven wheel is supported by multiple rollers carried by the first body portion and driven by a pinion coupled to a motor carried by the first body portion. The free wheel pivots along an axis perpendicular to an axis of rotation.

In some examples, the robot lawnmower includes a swath edge detector carried by the first body portion and configured to defect a swath edge between cut and uncut grass. The drive system is configured to maneuver the robot across the lawn while following a detected swath edge. The swath edge detector includes a calibrator carried by the body and configured to monitor uncut grass. The controller is in communication with the calibrator and is configured to periodically compare the detected swath edge with monitored uncut grass.

In another aspect, a method of lawn cutting with a robot includes detecting a swath edge with a swath edge detector carried by the robot as the robot maneuvers itself across a lawn and automatically comparing a detected swath edge with uncut grass monitored by a calibrator carried by the robot. The method includes following the detected swath edge and erecting blades of grass of the lawn with a grass erector of the robot. The method includes cutting the lawn with a cutter of the robot and arranging blades of grass of the lawn with a grass arranger carried by the robot.

Implementations of this aspect of the disclosure may include one or more of the following features. In some implementations, the method includes orienting blades of grass of the lawn with a grass orientor carried by the robot. The method may also include continuously scanning for an absence of lawn with a not-lawn detector carried by the robot, and automatically redirecting the robot in response to detecting an absence of lawn. Another method step may include scanning for a body of liquid proximate the robot with a liquid detector carried by the robot, and automatically redirecting the robot in response to detecting a body of liquid. In some implementations, the method includes scanning for a potential obstacle proximate the robot with a proximity sensor carried by the robot, and automatically redirecting the robot in response to detecting a potential obstacle. The method may also include scanning for a boundary responder with a boundary detector carried by the robot, and automatically redirecting the robot in response to detecting a boundary responder.

The details of one or more implementations of the disclosure are set fourth in the accompanying drawings and the description below. Other features, objects, and advantages will be apparent from the description and drawings, and from the claims.

BRIEF DESCRIPTION OF THE DRAWINGS

FIGS. 3A-3K are schematic and block diagram views of lawn care robots.
FIG. 4A is a side view of a lawn care robot.
FIG. 4B is a rear view of a lawn care robot.
FIG. 4C-D are top views of a lawn care robot.
FIG. 4E is a side view of a lawn care robot.
FIG. 4F is a rear view of a lawn care robot.
FIG. 4G is a top view of a lawn care robot.

FIG. 6C is a schematic view of a robotic mower system.

FIG. 6D is a table of components for a robotic mower system.

FIG. 16A-B are schematic views of cut edge detectors.

FIG. 35A is a schematic view of a property with a perimeter boundary having splice connectors, power stations, and an anchor.

FIG. 35B is a schematic view of a splice connector.

FIG. 35C is a schematic view of a robot-activated power station.

FIG. 35D is a schematic view of a perimeter boundary having splice connectors and power stations.

Like reference symbols in the various drawings indicate like elements.

DETAILED DESCRIPTION

An autonomous robot may be designed to clean flooring. For example, the autonomous robot may vacuum carpeted or hard-surfaces and wash floors via liquid-assisted washing and/or wiping and/or or electrostatic wiping of tile, vinyl or other such surfaces. U.S. Pat. No. 6,883,201 by Jones et al. entitled AUTONOMOUS FLOOR CLEANING ROBOT, the disclosure of which is herein incorporated by reference it its entirety, discloses an autonomous cleaning robot. Notwithstanding the use of the term mowing robot herein, these concepts may also apply to a cleaning or other coverage robot.

Figure 1A:
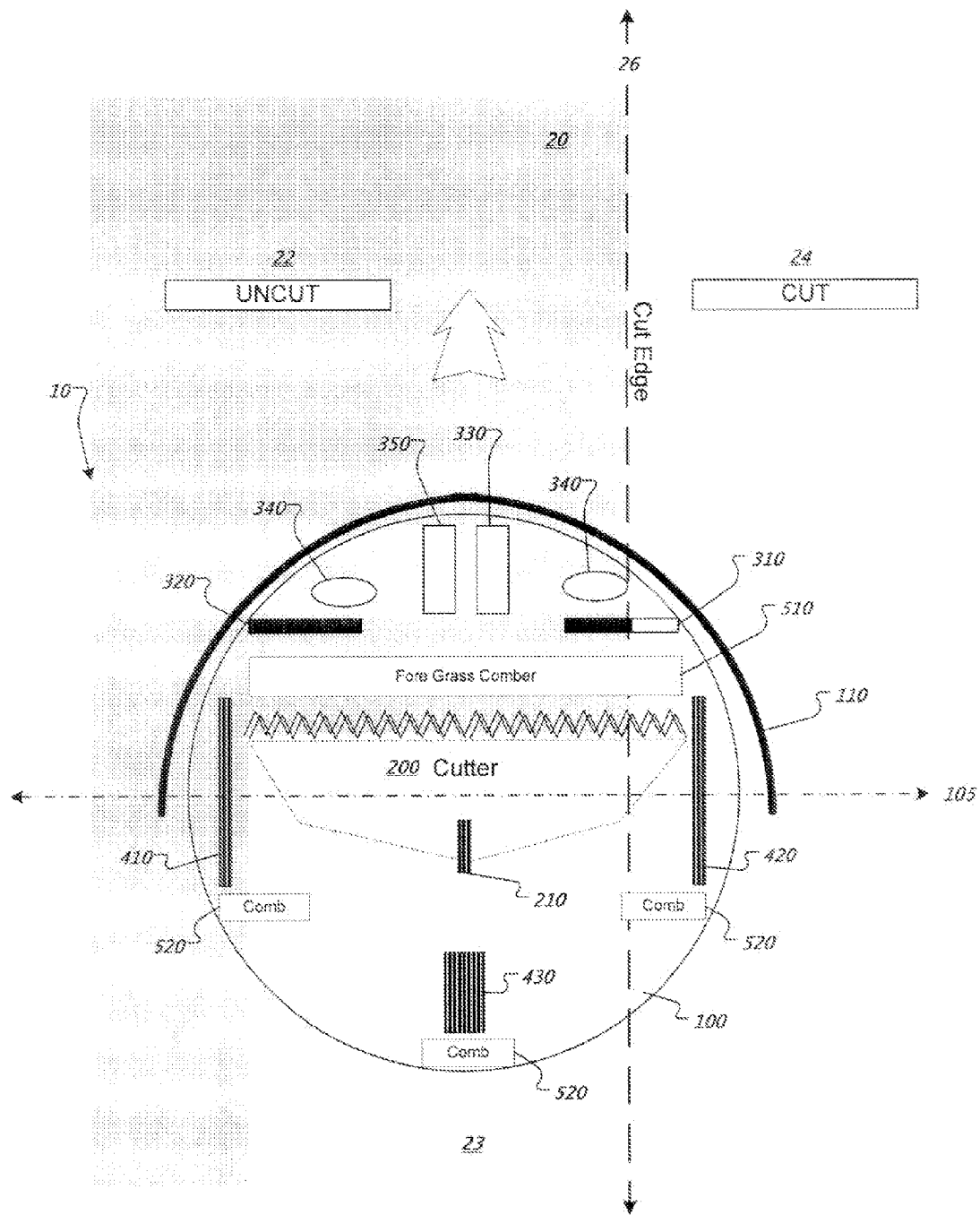
FIG. 1A is a schematic view of lawn care robots.
Figure 1B:
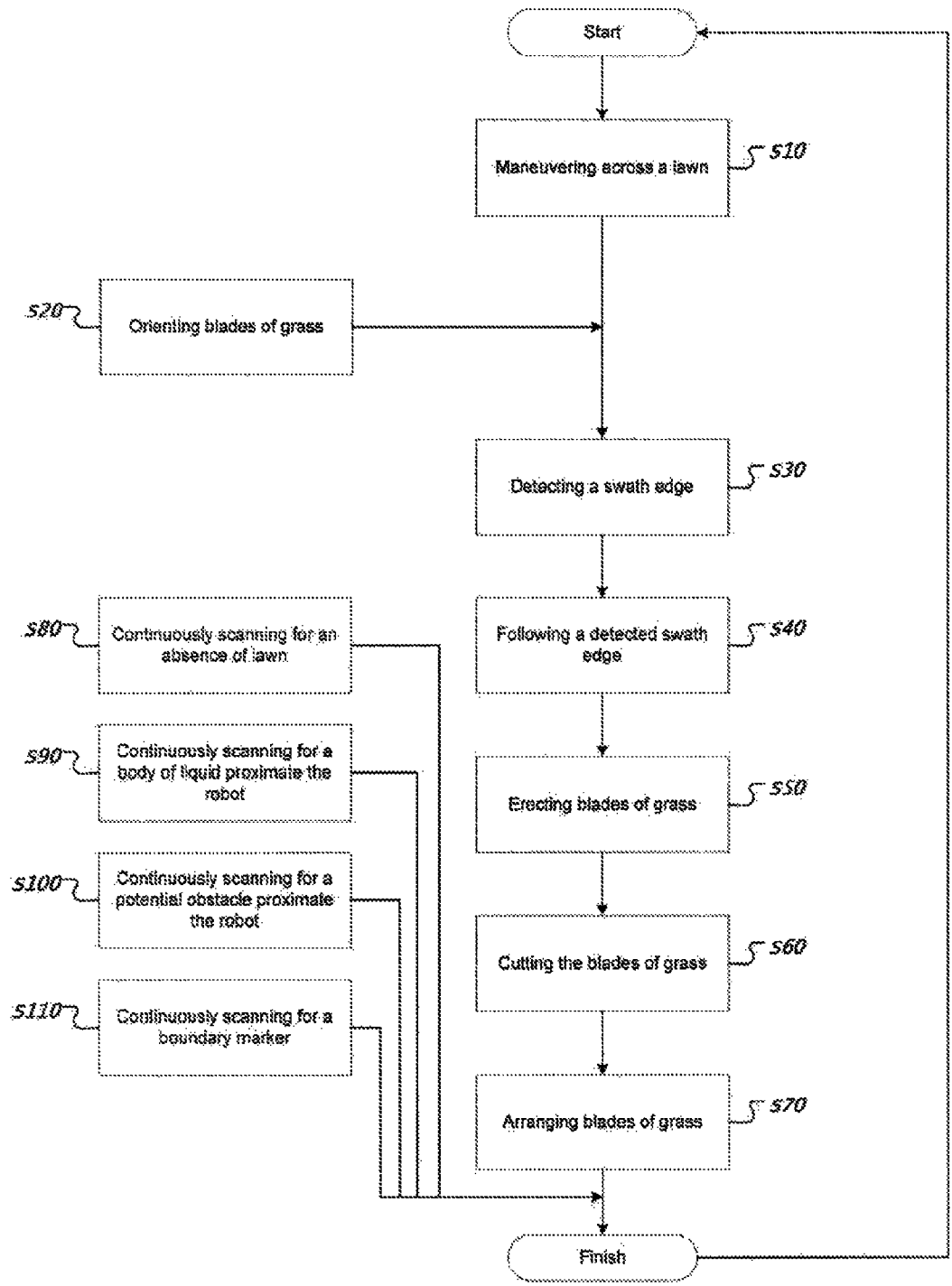
FIG. 1B is a schematic view of a method of lawn cutting with a robotic lawnmower.
Figure 2B:
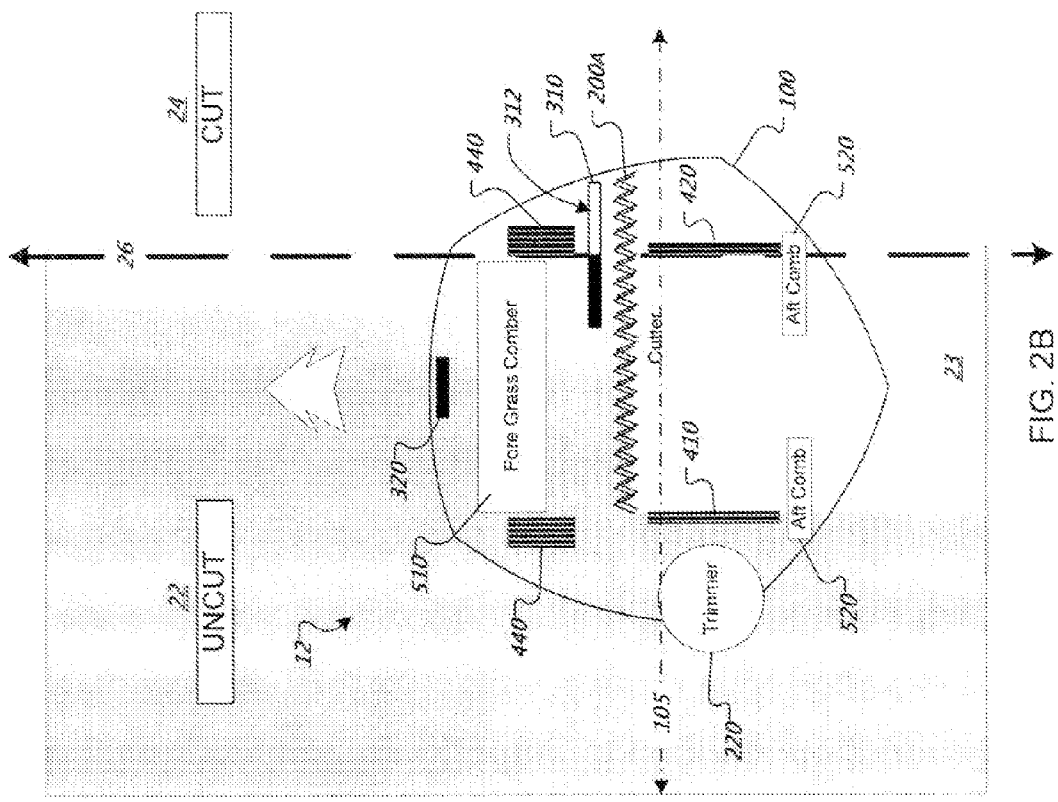
FIGS. 2A-2C are schematic views of lawn care robots.
Figure 2A:
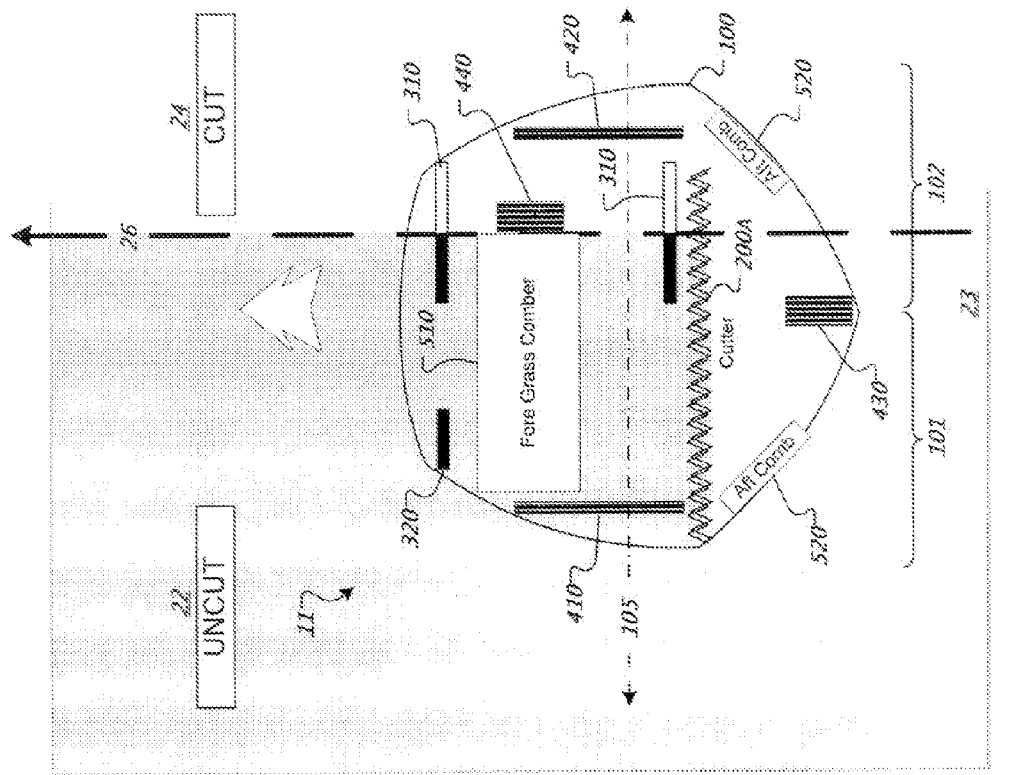

Referring to FIGS. 1-3, an autonomous coverage robot 10 includes a body 100, a surface treater 200 secured to the body 100, and at least one surface sensor 310, 320, 330 carried by the body 100 and responsive to at least one surface characteristic. A drive system 400 is carried by the body 100 and configured to maneuver the robot 10 across a surface 20 while following at least one surface characteristic. Examples of the surface treater 200 include a reciprocating symmetrical cutter floating on a following wheel 210, a rotary cutter, a spreader, and a gatherer. The body 100, as shown in FIG. 1A, has a substantially circular perimeter; however, other shapes are suitable as well, such as a substantially pentagonal, tombstone, or rectangular shape, as shown in FIGS. 2A-3. In some implementations, the robot 10 comprises a frame-and-body structure or a substantially monocoque structure. In some implementations, the body 100 includes a two part articulated body, which will be described later in detail.

In some examples, one or more edge following sensors 310 (also referred to as cut edge detectors) and edge calibrators 320 (e.g. a grass character sensor) are mounted on the body 100. FIG. 1A depicts an exemplary placement of boundary sensors 340, a bumper 110 (which may be coupled to two or more displacement sensors to provide impact directionality) and at least one grass sensor 330 (e.g. determines a presence of grass) on the body 100. An active or passive fore grass comber 510 precedes the surface treater 200 and an aft grass comber 520 follows each wheel 410, 420, 430.

Referring to FIG. 1B, a method of lawn cutting with a robotic lawnmower 10 having a drive system 400 and a cutter 200 carried by a body 100 includes step S10 of activating the drive system 400 to maneuver the robotic lawnmower 10 across a lawn 20, step S30 of detecting a swath edge 26 with the swath edge detector 310, and step S40 of following a detected swath edge. The method may include step S20 of orienting blades of grass of the lawn 20 with a grass arranger 440 carried by the body 100 forward of a swath edge detector 310 carried by the body 100. The method includes step S50 of erecting blades of grass of the lawn 20 with a fore grass comber 510 carried by the body forward 100 of the cutter 200, step S60 of cutting the lawn 20 with the cutter 200, and step S70 of arranging blades of grass of the lawn 20 with an aft grass comber 520 earned by the body 100 rearward of the cutter 200 and/or the drive system 400. In some examples, the method includes one or more of the following steps: step S80 of continuously scanning for an absence of lawn 20 with a lawn detector 330 carried by the body 10, where the drive system 400 redirects the robot 10 in response to detecting an absence of lawn 20; step S90 of continuously scanning for a body of liquid 1004C proximate the robot 10 with a liquid detector 350 carried by the body 100, where the drive system 400 redirects the robot 10 in response to detecting a body of liquid 1004C; step S100 of continuously scanning for a potential obstacle proximate the robot 10 with a proximity sensor (e.g. infrared sensor) carried by the body 100, where the drive system 400 redirects the robot 10 in response to detecting a potential obstacle; and step S110 of continuously scanning for a boundary responder 600 with a boundary detector 1500 carried by the body 100, where the drive system 400 redirects the robot 10 in response to detecting a boundary responder 600.

A configuration and height of the bumper 110, in some instances, are arranged according to a ground clearance or a cut height of the cutter 200. The bumper height may be lower than the cut height of the cutter 200. Also, the bumper 110 may rise and lower with the cutter 200.

In one example, the drive system 400 includes left and right driven wheels, 410 and 420 respectively, and a trailing wheel 430 (e.g. a caster). In one implementation, the drive system 400 includes at least one drive wheel 410, 420 rotated by a motor or other drive mechanism (e.g., an electric motor supplied power from a consumer-level battery, fuel cell, large capacitors, microwave receiver, an internal/external combustion engine powered by an onboard fuel source, hydraulic/pneumatic motor powered by an above aforementioned power source, large potential energy sources such as wound or compressed springs such as in hydraulic or pneumatic, vacuum accumulators, flywheels, or compressed air). In some instances, the drive system 400 includes a differential drive on a center axis 105 with two independently driven wheels 410, 420. One or more of the wheels 410, 420, 430 may swivel to aid navigation or adjustment of yaw of the robot 10. In other implementations, the drive system 400 includes a holonomic drive, particularly in combination with a body 100 having a shape of constant width. The robot 10 may rotate about more than one point within an area defined by an outline of the body 100, thereby escaping from, traversing, or otherwise avoiding entrapment in spaces approaching a width of the robot 10.

Typically, the robot 10 is used on a yard or lawn 20. Referring again to the example of FIG. 1A, as the robot 10 mows the lawn 20, an uncut area 22 is generally longer than a cut area 24. After mowing an initial swath 23, which may be linear, circular, or some other geometry, the robot 10 follows a swath edge 26 (i.e. the boundary edge between the uncut and cut areas, 22 and 24 respectively) for each successive swath 23. If the initial swath 23 is circular or arced, the robot edge following will result in an emergent spiraling path. If the initial swath 23 is linear, upon reaching the end of a swath 23, the robot 100 rotates approximately 180 degrees, aligns itself with the swath edge 26 using the cut edge detector 310, and proceeds to mow another swath 23. The robot 10 successively repeats this process until it determines that it has completed mowing the yard 20, for example, or until if reaches some other state which ends a mowing cycle. By aligning itself to the immediately preceding mowed swath 23, the robot 10 may ensure that it mows the lawn 20 in a generally uniform pattern of adjacently cut swaths 23, achieving a mowed appearance similar to a lawn 20 mowed by conventional devices. By relying on the cut edge detector 310 to continuously realign the robot's heading based as it mows each successive adjacent swath 23, the robot 10 may forgo using other more complex equipment for alignment, such as GPS, triangulation, inertial, and odometric reckoning, requiring additional sensors and/or processing power.

Each of the examples shown in FIGS. 1-4 share relatively large diameter differential drive wheels 410, 420 (e.g., 8 inches or greater), casters 430, 440 of a lesser diameter, and optional fore and aft grass combers/lifters, 510 and 520 respectively.

Figure 2C:
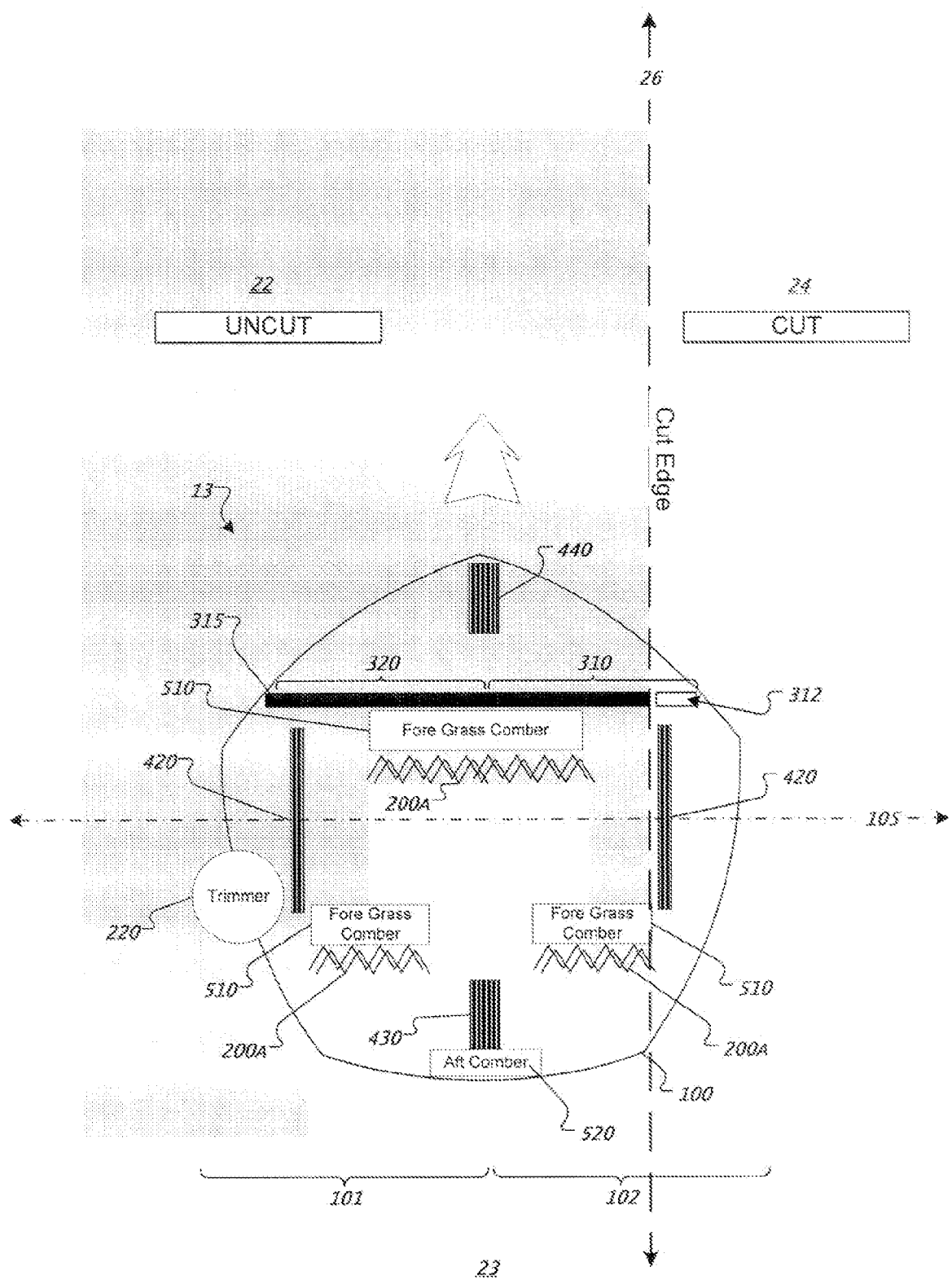

FIGS. 2A-C depict alternative implementations of the lawn care robot 10 having a substantially pentagonal shape of constant width in which the widest portion trails the center axis 105. Each robot 11, 12 includes a differential drive off, near to, or on the center axis 105 and an asymmetrical reciprocal cutter 200A. Separate edge following sensors 310 and grass character sensors 320 are provided in pairs (although only one of each is optional). FIGS. 2A and 2B also illustrate alternative locations of the fore and aft grass combs, 510 and 520 respectively, and the calibration sensors 320. A caster 430 or fixed bearing auxiliary wheel 440 may depress the grass. Example locations of the grass depressing wheel 430, 440 include forward or rearward of one cut edge detector 310, forward of a first cut edge detector 310 and rearward of a second cut edge detector 310 (shown between in FIG. 2A), forward of the cutter 200 (shown ahead in FIG. 2B), and rearward of the cutter 200.

Referring to FIG. 2A, a robot 11 (which is configured as the robot in FIG. 33) includes one trailing caster 430 and a cutter 200A carried by the body 100. The cutter 200A has a blade extending to an uncut side 101 edge of the robot 11. A fore grass comber 510 carried by the body 100 is shown with a relatively larger front to back size to accommodate a rotating bar bearing strings, filaments, chains, tines, bristles, flexible flaps, or a combination of these. The fore grass comber 510 is shown optionally laterally adjacent a grass depressing wheel 440 carried by the body 100. One edge following sensor 310 and grass character sensor 320 pair is carried by the body 100 and located forward of the fore grass comber 510, aligned parallel to a center axis 105, and laterally in-line with each other. A second edge following sensor 310 is carried by the body 100 and located rearward of the fore grass comber 510, but forward of the cutter 200A.

Referring to FIG. 2B, a robot 12 includes a body 100 carrying two leading flattener wheels 440 located forward of an edge following sensor 310 and a cutter 200A that extends to a cut-side 102 edge of the robot 12. The edge following sensor 310 is located rearward of a fore grass comber 510 carried by the body 100, but forward of the cutter 200A. A grass character sensor 320 is carried by the body 100 and located forward of the fore grass comber 510. In this example, the edge following sensor 310 is not laterally in-line with the grass character sensors 320. A trimmer 220 is carried by the body 100 on a different side from the edge sensor 310 and/or cutter 200A. One of the leading flattener wheels 440 (e.g. casters) may depress the grass ahead of a cut-portion span 312 of the edge sensor 310, or immediately ahead of it (e.g., separated in the moving direction by less than a cut grass height or about two inches).

Referring to FIG. 2C, a robot 13 includes a body 100 having a substantially pentagonal shape of constant width in which the widest portion leads a center line 105, with a drive differential substantially on the center axis 105 connecting left and right drive wheels 410 and 420 respectively. A leading caster 440 and a trailing caster 430 are each carried by the body 100. Three reciprocal cutters 200B are disposed on the body 100 at different front-to-back locations that overlap serially in cut width. An extended one-piece grass sensor array 315 is located forward of a fore grass comber 510 and includes edge following sensors 310 and grass character sensors 320. A trimmer 220 may be coupled to the body 100 either of the uncut or cut sides, 101 and 102 respectively. A drive wheel 420 may depress the grass in a narrow portion following the cut-portion span 312 of the cut edge sensor 310 (i.e., no grass comber follows at least this wheel).

Figure 3A:
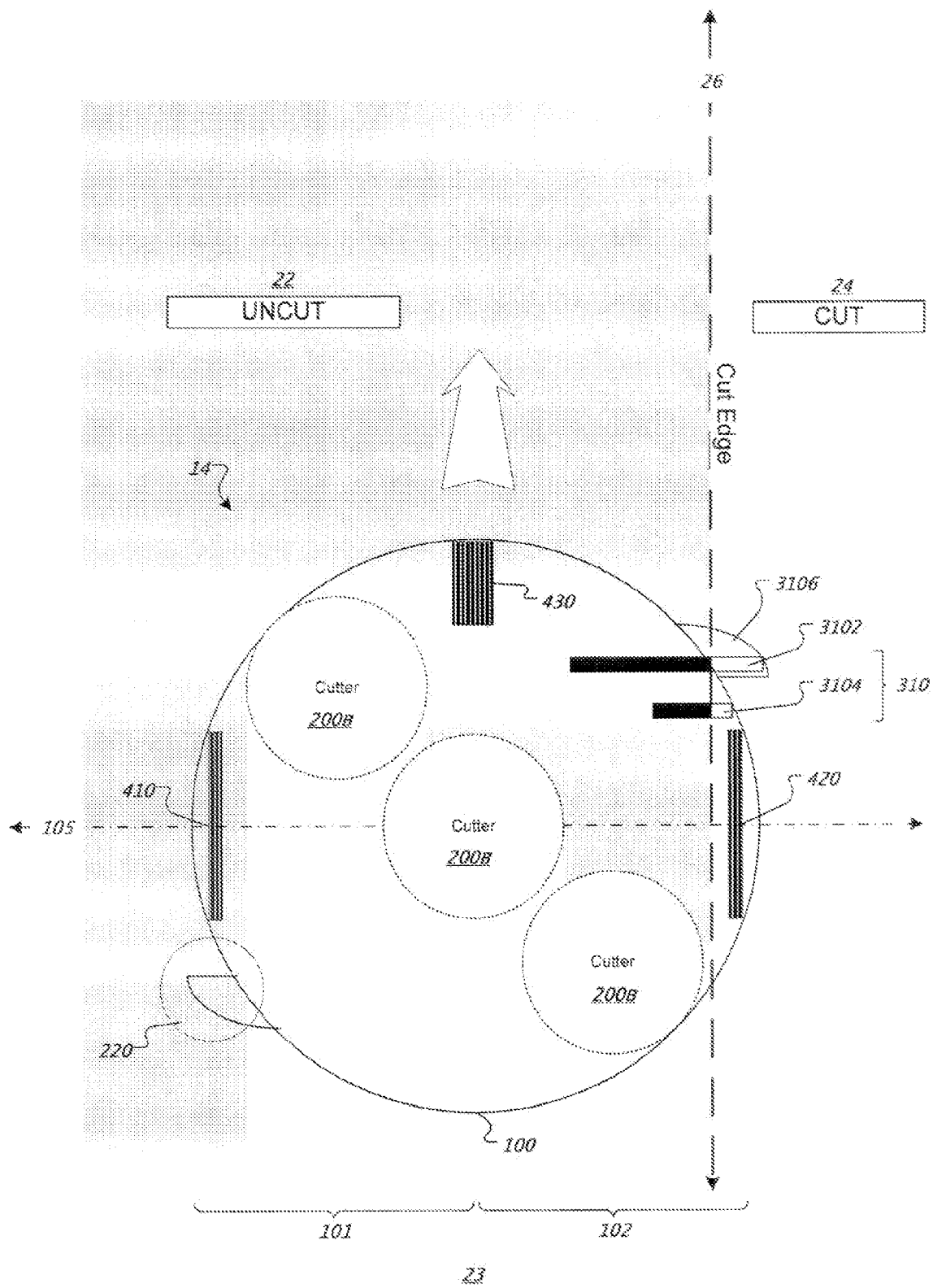

FIG. 3A is a schematic diagram illustrating another exemplary lawn care robot 14 having a substantially circular shape. The body 100 carries differential drive wheels, 410 and 420 respectively, substantially on the center axis 105, one leading caster 430, and three different rotating multi-"exacto" Bellinger blade cutters 200B (as used in U.S. Pat. No. 3,550,714, although with a guard to cover the blades when the cutter 200B is not rotating, and optionally powered by separate motors). The three rotary cutters 200B are placed at different front-to-back locations with overlapping cut widths. The arrangement of the cutters 200B shown (i.e., diagonally) is amenable for either reciprocal cutters 200A or rotating cutters 200B, or counter rotational shear. An edge following sensor 310 disposed on the body 100 includes a fore edge sensor bank 3102 preceding an aft edge sensor bank 3104 in the direction of cutting to provide auxiliary positional input for determining whether the robot 14 is proceeding linearly. For example, if the fore cut edge sensor 3102 and the trailing edge sensor 3104 are aligned along a single line parallel to the forward direction of travel of the robot 14 and both indicate the presence of the cut edge 26, the robot 14 may determine that it is traveling substantially linearly. However, if only one of the cut edge sensors 3102, 3104 indicates the presence of the cut edge 26, the robot 14 may have deviated from a straight line path. More complex interpretation and error-detection is also possible. The leading sensor 3102 may be wider or narrower than the trailing sensor 3104 and is optionally placed on an extending or extended arm 3106 as shown. A trimmer 220 may be coupled to the body 100 either of the uncut or cut sides, 101 and 102 respectively. The fore grass combers 510 may be replaced with fan blades for drawing up the grass with air flow concentric with the rotating cutters 200B.

Figure 3B:
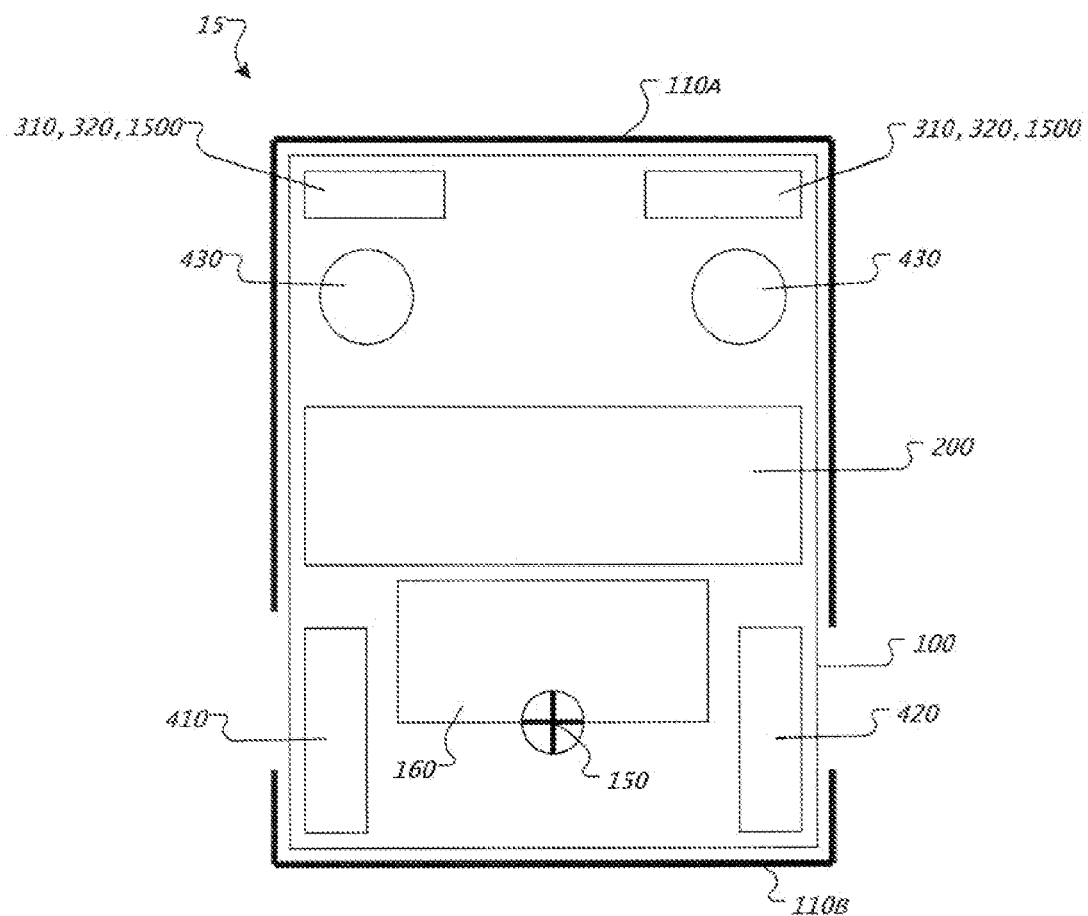

FIG. 3B is a schematic diagram illustrating a layout of another exemplary lawn care robot 15 having a rectangular shape. The robot 15 includes a body 100 carrying differentially steered drive wheels 410 and 420, respectively, located near rear corners of the body 100, and two leading casters 430, located near forward corners of the body 100. Differential steering allows fast yaw rates. Wheels 410,420,430 located at the corners of the rectangular body 100 allows for good approach/departure angles and stability. The robot 15 also includes a cutter 200, a battery 160, edge detectors 310, calibrators 320, and boundary detectors 1500, all carried by the body 100. Front and rear bumpers 110A and 110B, respectively, are secured to the body 100 and may be configured to detect contact. Tight spacing between the wheels 410,420,430 and the cutter 200 allow for reasonable anti scalping. The turning center 150 is located between the drive wheels 410 and 420, respectively. The component layout and body configuration allow the robot 15 to cut up to boundaries and walls and is likely more efficient than a skid steer configuration (shown in FIG. 3D), but may have difficulty cutting to a 90 degree edge. The robot 15 is less likely to damage turf 20 while turning. Drawbacks to the component layout and body configuration of the robot 15, as shown, include not being able to turn in place, requiring bumper protection for all areas for and aft of the drive wheels 410 and 420, respectively, and needing slightly less than 2 times its length to turn 360 degrees (48"-60"). The robot 15 is stable, but transfers about 20% of its weight fore and aft as well as left and right at about 30 degree slopes, which causes difficulty or inability to navigate 30 degree slopes in reverse due to traction loss and drift. A forward center of gravity creates enough inertia to generate wheel slip in wet grass on flat terrain during edge following. The traction loss results in a change in robot heading or drift, which may affect edge following even on flat terrain.

Figure 3C:
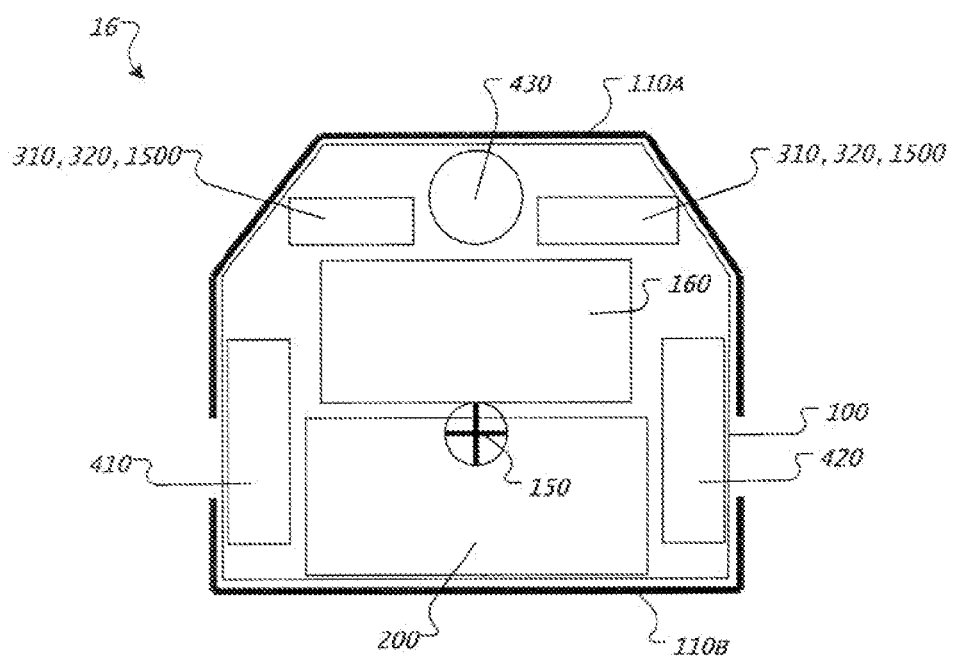

FIG. 3C is a schematic diagram illustrating a layout of another exemplary lawn care robot 16 having a shape of substantially constant width. The robot 16 includes a body 100 carrying differentially steered drive wheels 410 and 420, respectively, located near rear corners of the body 100, and a leading caster 430, located on a forward portion of the body 100. The robot 16 also includes a cutter 200, a battery 160, edge detectors 310, calibrators 320, and boundary detectors 1500, all carried by the body 100. Front and rear bumpers 110A and 110B, respectively, are secured to the body 100 and may be configured to detect contact. Tight spacing between the wheels 410,420,430 and the cutter 200 allow for reasonable anti scalping. The turning center 150 is located between the drive wheels 410 and 420, respectively. The component layout and body configuration allow the robot 15 to cut up to boundaries and walls as well as cut to a 90 degree edge. The robot 15 is not likely to damage turf 20 while turning. The robot 15 is stable, but transfers about 20% of its weight fore and aft as well as left and right at about 30 degree slopes, which causes difficulty or inability to navigate 30 degree slopes in reverse due to traction loss and drift. A forward center of gravity creates enough inertia to generate wheel slip in wet grass on flat terrain during edge following. The traction loss results in a change in robot heading or drift, which may affect edge following even on flat terrain.

Figure 3D:
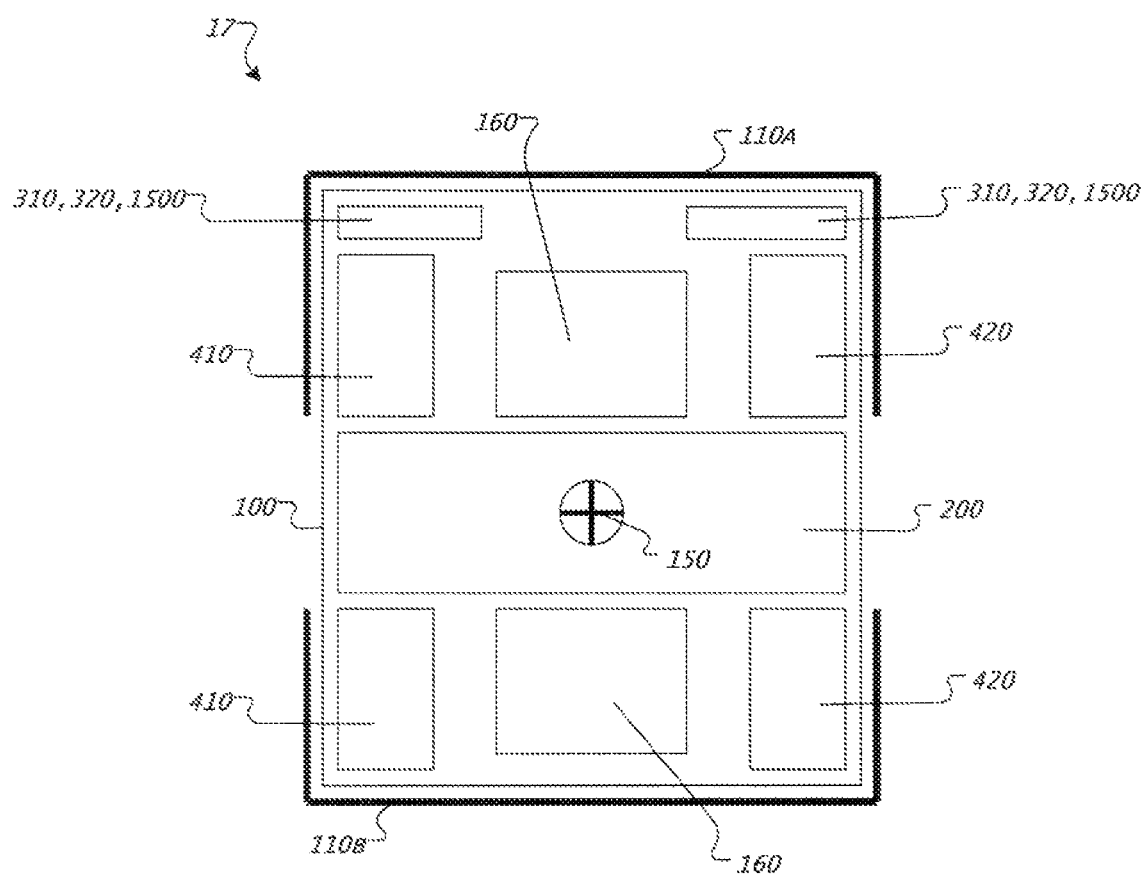

FIG. 3D is a schematic diagram illustrating a layout of another exemplary lawn care robot 17 with skid steering. The robot 17 includes a body 100 carrying differentially steered left and right drive wheels 410 and 420, respectively, located near front and rear corners of the body 100. To turn, the robot 17 may lock one or more wheels 410,420 while driving the others. The robot 17 also includes a cutter 200, a battery 160, edge detectors 310, calibrators 320, and boundary detectors 1500, all carried by the body 100. Front and rear bumpers 110A and 110B, respectively, are secured to the body 100 and may be configured to detect contact. Tight spacing between the wheels 410,420,430 and the cutter 200 allow for reasonable anti scalping. The turning center 150 is located substantially near the center of the robot 17. The component layout and body configuration allow the robot 17 to cut up to boundaries and walls, but may have difficulty cutting to a 90 degree edge. The robot 17 can turn on its center. Four wheel drive reduces the need for a low center of gravity and offers excellent step and hill climbing ability. A 50-50 weight distribution limits the occurrence of drift on slopes.

Figure 3E:
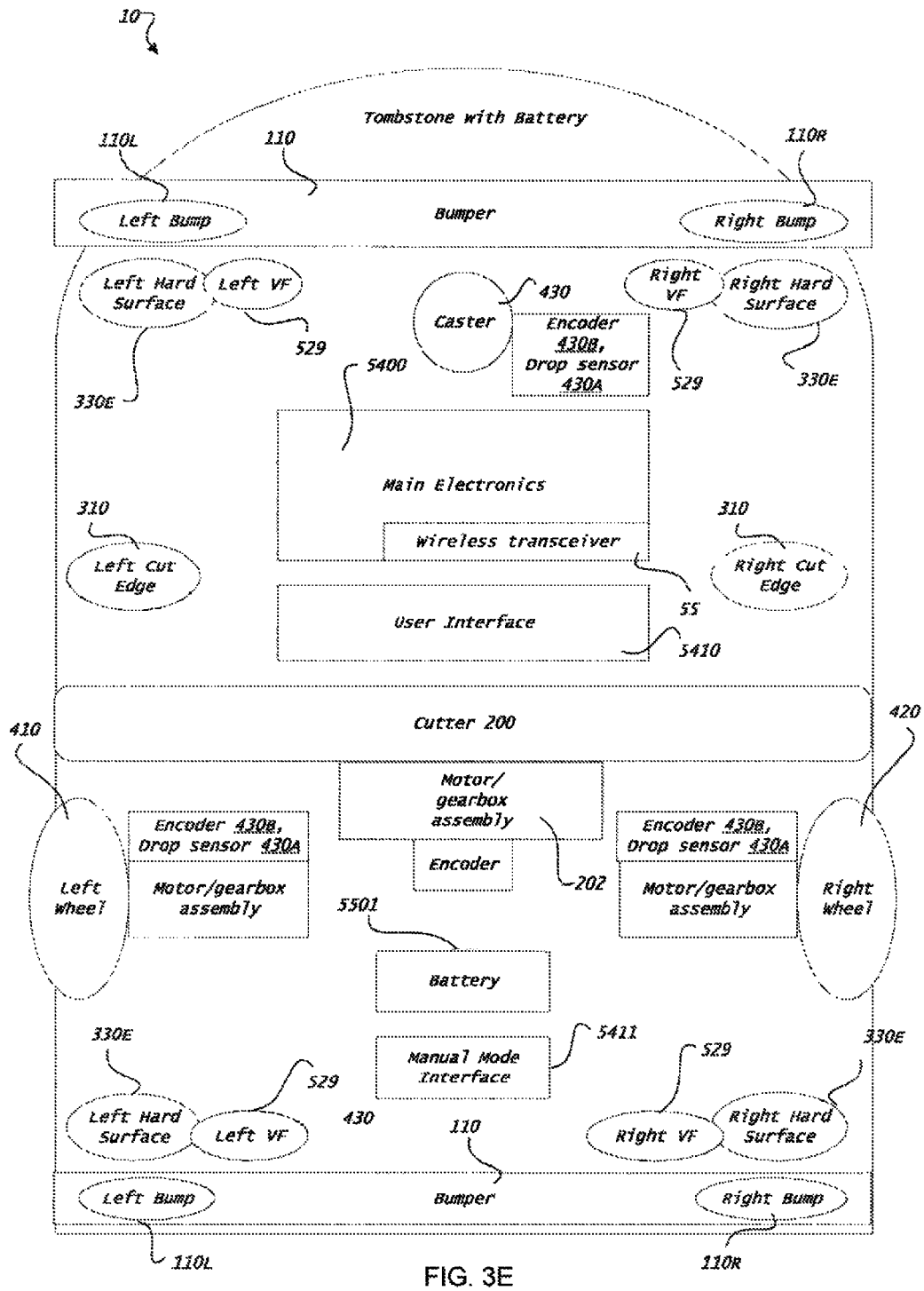
Figure 3F:
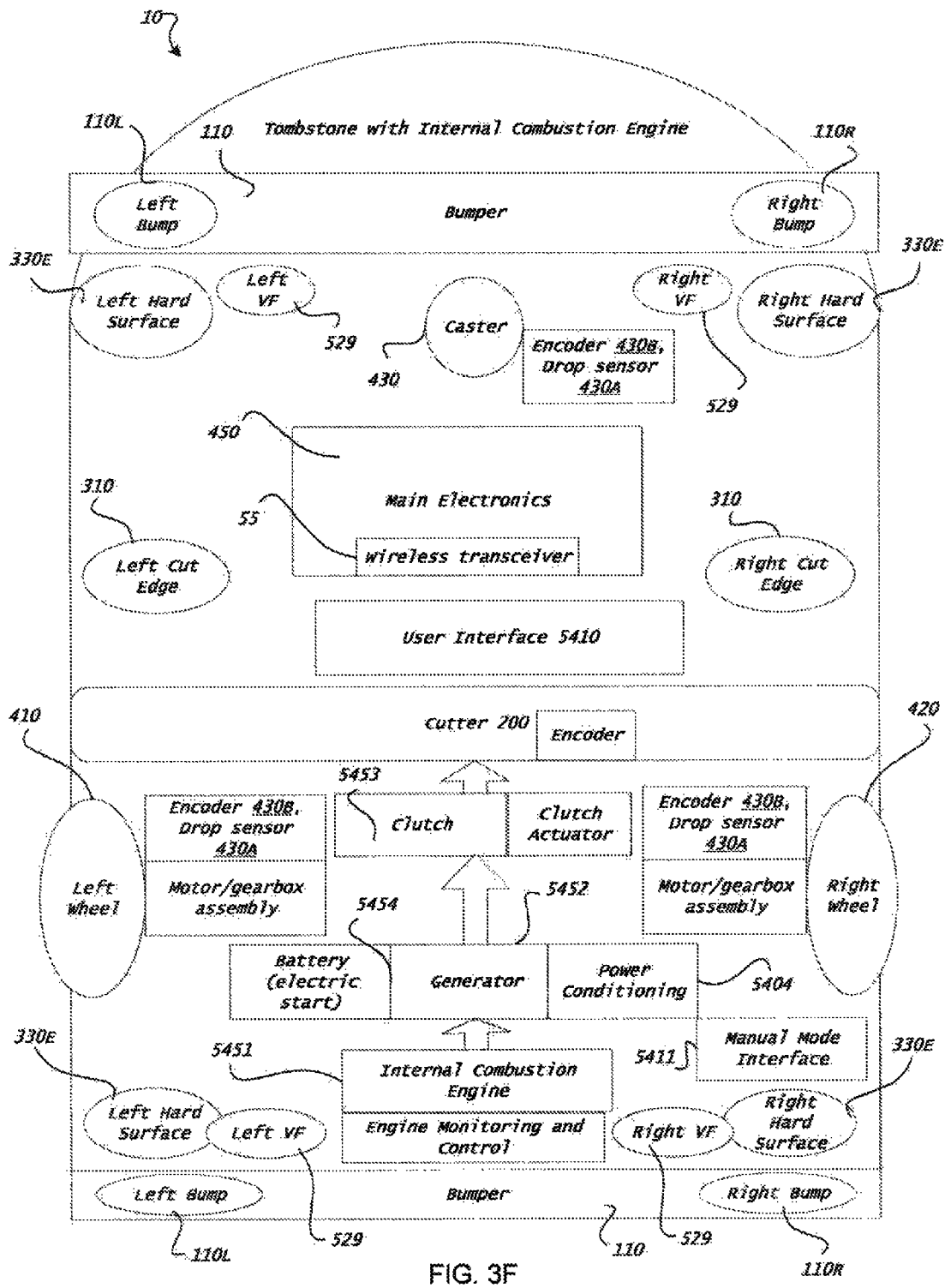

FIGS. 3E-H are block diagrams depicting typical control electronics and instrumentation which may apply to any appropriately similar robot described herein. FIGS. 3E and 3F are block diagrams suitable for a robot 10 with differential steering and an oblong "tombstone" form. Essentially the same components may be used in any of the differentially steered robots disclosed herein. As shown in FIGS. 3E and 3F, a bumper 110 is connected to left and right bump sensors 110L and 110R, respectively, at each of front and rear ends. These permit the robot 10 to detect the direction of a bump using the timing of actuation (e.g., if the left front is actuated before the right, an obstacle is forward and to the left). The controller 450 in main electronics 5400 can use this direction to back and turn the robot 10 away and angled away from the side of detection. Hard surface detectors 330E as discussed herein (one method of determining a lack of grass) are placed at all four corners of the robot 10 and monitored by the controller 450. Artificial boundary (VF—Virtual Fence) detectors 529 as disclosed herein are also placed at all four corners of the robot, monitored by the controller 450. Wheel drop sensors 430A are part of the wheel assemblies of caster 430 and left and right drive wheels 410 and 420, respectively, monitored by the controller 450. Detections on bump, wheel drop 462A, hard surface 330, and VF boundary 529 sensors are activating conditions for obstacle avoidance behaviors and/or obstacle following behaviors ("behaviors" in the context of behavior based robotics) as disclosed in U.S. Pat. No. 6,809,490, as well as those behaviors disclosed in U.S. Patent Application No. 20070016328 for "Autonomous surface cleaning robot for wet and dry cleaning" to Ziegler et al., herein incorporated by reference in its entirety.

FIGS. 3E and 3F further show encoders 430B provided to each wheel assembly 410, 420, 430, which are monitored together with bumps and motor currents by the controller 450 to register a stuck condition (stasis), an activating condition for escape behaviors as disclosed in U.S. Pat. No. 6,809,490. Similarly, a cutter motor assembly 202 is provided with an encoder for detecting jams and speed. Right and left cut edge sensors 310 as described herein in various forms (310A, 310B . . . 310X) are provided and employed by the controller 450 as described herein. A wireless transceiver 55 communicates with the controller 450 (interchangeably controller 5400) to permit the wireless remote to send and/or receive signals. A user interface 5410 (e.g., display panel and/or buttons) controlled from the controller 450 permits status signals and instructions. A manual mode interface 5411 is as described herein with reference to mounting, dismounting, and folding handles (e.g., permitting dead man and other signals to be switched, and handle status detected), for manual and autonomous modes.

FIGS. 3E and 3F differ primarily in that FIG. 3E is primarily powered by an internal combustion engine 5451 (which may directly drive some components via clutches and/or transmissions, and may also drive an alternator or generator for powering devices or charging a battery 5454 to do the same). FIG. 3F is primarily powered by a battery 5501 (which powers, e.g., brushless or other DC motors via motor control circuits and motor amplifiers). An internal combustion engine is primarily selected for energy density and rapid cycle times (e.g., replacing fuel is faster than recharging a battery), and need not be used to directly drive a cutter 200.

It should be noted that a feature of the both internal combustion and battery powered arrangements is that when the robot 10 is placed in manual mode, clutches on the driven wheels (in some instances not shown, but all driven wheels disclosed herein may be clutched for this purpose) disengage wheels that are driven in autonomous modes, providing more power for manual mode. In each case, the controller 450 may, in response to the detection of manual mode (optionally in association with the handle being attached or unfolded), activate a high power mode for the cutter 200 (the cutter motor, gearbox, clutch, and cutting element strength being selected to accommodate this greater stress mode). This is appropriate for instances in which the user believes or perceives the robot 10 may be overmatched by lawn growth. An additional feature is that the wireless transceiver 55 may be used to activate a "normally off" switch connected to the ignition of an IC motor or motor current loop on an electric motor. When the robot 10 is out of range or unable to receive wireless signals from of a wireless remote that broadcasts a (continuous or interval of seconds to minutes) dead man signal, the robot 10 will be deactivated—and may be remotely deactivated by stopping the dead man signal.

The battery powered robot 10 of FIG. 3F is controlled as discussed herein with respect to the included schematics and control diagrams. The internal combustion motor robot 10 of FIG. 3E includes engine monitoring and control (ECU) 5402 for monitoring the state of the motor 5451. Various sensors, including voltage and current states as well as conventional sensor configurations, may be connected to the ECU 5402, including some or all of intake air pressure and temperature, barometric air pressure, coolant temperature, throttle position, crank position, cam position, fuel injection start angle and pulse width, and spark advance. Fuel level, ignition status, kill switch status, and dead-man switch status may be monitored by the ECU 5402 or main controller 450 or 5400. The motor 5451 powers a generator 5452, via a conventional gearbox or other transmission. If the gearbox is fully back-driveable or with appropriate gear ratios, the generator or alternator 5452 may be configured to act as a starter motor (with appropriate circuitry). Power conditioning 5404 turns the output of the generator 5452 into smoothed, less noisy, and optionally DC current for charging batteries and driving electric motors. The battery 5454 may be connected for electric start of the IC motor 5451 for powering electric motors in left wheel assembly 410, right wheel assembly 420 (if these are not directly driven), and for powering main electronics 5400 and wireless transceiver 55. Dead man signals or switches (normally off), or kill switches (normally on) as described herein are connected to leave the main electronics 5400 and wireless transceiver 55 powered even when the robot 10 is immobilized or unable to cut by disabling ignition, fuel supply, air supply, normally disengaged or normally engaged clutches, or motor current loops. The internal combustion motor robot 10 of FIG. 3E includes a clutch 5453 and corresponding actuator (e.g., solenoid, motor, or EM) intermediate the IC motor and the cutter 200 itself. The clutch 5453 disengages the IC motor from a mechanically powered (via a transmission such as a belt, shaft, chain, or gearbox) cutter 200, or disengages an electric motor (not shown) from an electrically powered (via the generator 5452) cutter 200.

Figure 3G:
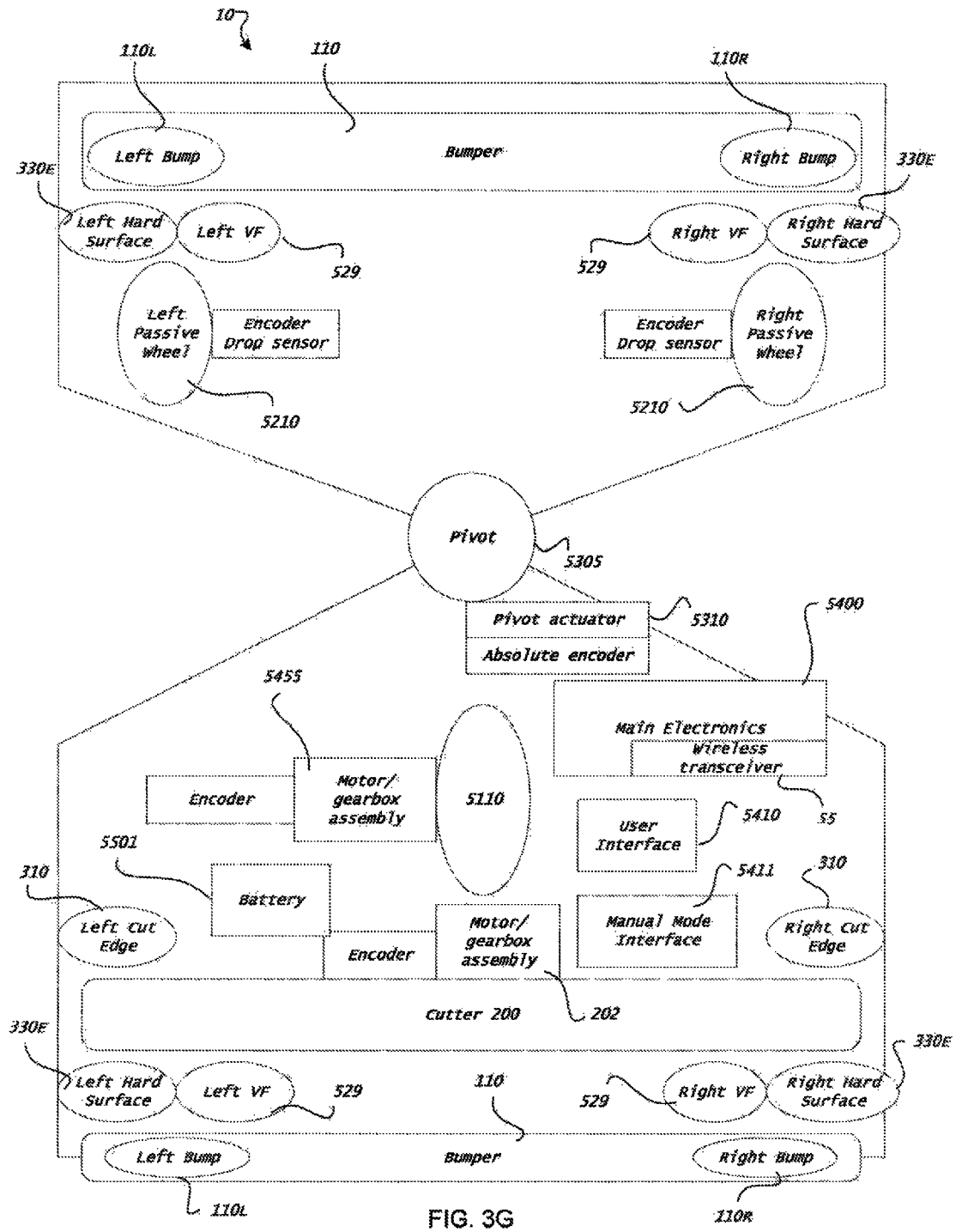
Figure 3H:
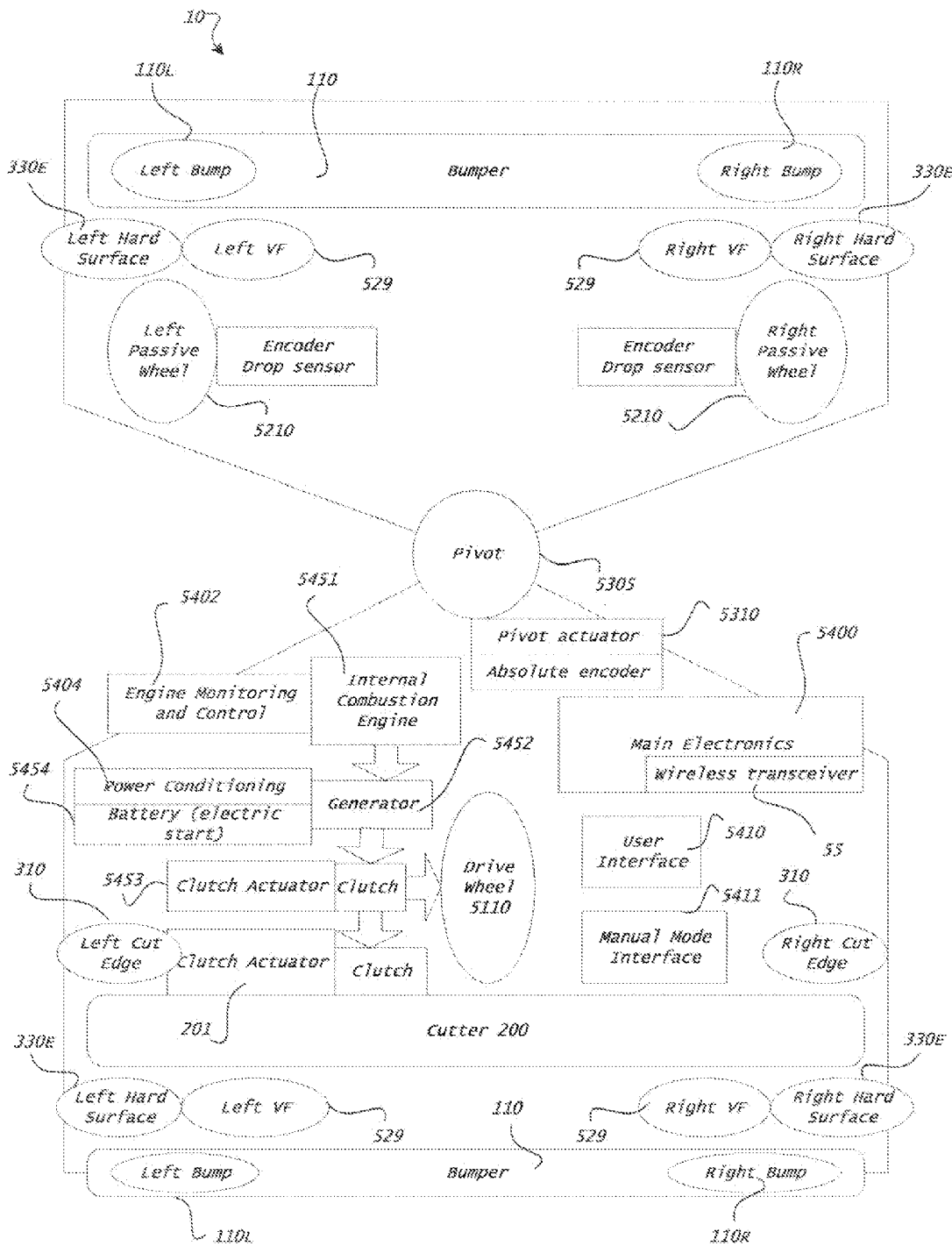

FIGS. 3G and 3H are block diagrams depicting typical control electronics and instrumentation which may apply to any appropriately similar robot described herein, but are particularly suited for an articulating "skidder" configuration. Those elements that have like numbers as elements in FIGS. 3E and 3F have substantially the same structure and function.

Contrasting FIG. 3F to FIG. 3H, the skidder or pivoting configuration (rather than having a single forward caster) includes left and right passive wheel assemblies 5210. Each of these includes a drop sensor 430A and encoder 430B monitored by the controller 430 or main electronics 5400. An articulating pivot 5305 as described herein separates the body 18 into two parts. The pivot 5305 includes a slip ring or flexible wire harness for passing wiring from the first portion 5100 to the second portion 5200 of the body 5000. A (preferably electric motor) pivot actuator 5310 is controlled by main electronics 5400, and the pivot 5310 position is monitored by an absolute encoder (i.e., one which returns an absolute position rather than relative position). A main drive wheel 5110 is powered by a motor assembly 5455.

Many of these same differences are found in contrasting the IC configuration of FIG. 3E to the IC skidder configuration of FIG. 3G. The IC skidder configuration as shown includes two clutch configurations. A drive clutch actuator and clutch 5452 disengages the IC motor 5451 from a mechanically powered (via a transmission such as a belt, shaft, chain, or gearbox) main drive wheel 5110 or disengages an electric motor (not shown) from an electrically powered (via the generator 5452) main drive wheel 5110. A cutter clutch actuator and clutch 201 disengages the IC motor 5451 from a mechanically powered (via a transmission such as a belt, shaft, chain, or gearbox) cutter 200, or disengages an electric motor (not shown) from an electrically powered (via the generator 5452) cutter 200. These and other clutches disclosed herein may be engaged or disengaged for manual mode in stability situations (e.g., using a tilt sensor the controller determines that the robot should be immobilized and engages clutches appropriately) or when an E-stop, dead-man switch or signal, or kill switch or signal is used. The controller 450 may also engage and disengage clutches during escape behaviors.

FIG. 3I depicts connections between electronic components and is one way of connecting components as set forth in FIG. 3G and herein below. FIG. 3I is different from FIG. 3G at least in that all of the motors for drive, pivot, and cutting are electric; and that the two front wheels are each driven. Steering motors 5456 on left and right forward sides are connected (including motor control and amplification) to the control board 5400. An articulation (pivot) motor 5310, a main drive motor 5455, and a payload or cutter motor 202 are similarly connected (including motor control and amplification). Power conditioning 5404 includes a charging or recharging circuit for the battery (one or two circuits may convert IC motor/alternator AC and/or household AC to charge the battery), conditioning for the IC motor/alternator AC current to smooth and remove noise using inductors or the like, and a starting circuit for providing starting current (in appropriate AC or DC form, voltage, and current) to the starter and/or alternator. The starter and alternator may be the same or different devices. Both a kill switch K and a dead man switch D intervene between the ignition and the IC motor 5451 (e.g., in a manner to damp or short ignition functions). Each can be activated by the control board 5400 and robot behaviors and also directly by manual switches, relays, or the like provided on the robot body or attachable/foldable handle.

Figure 3J:
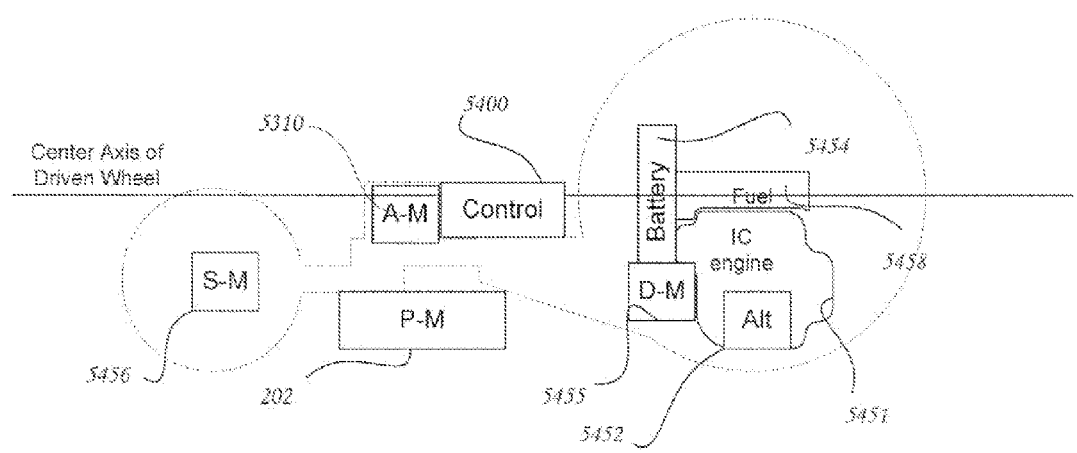
Figure 3K:
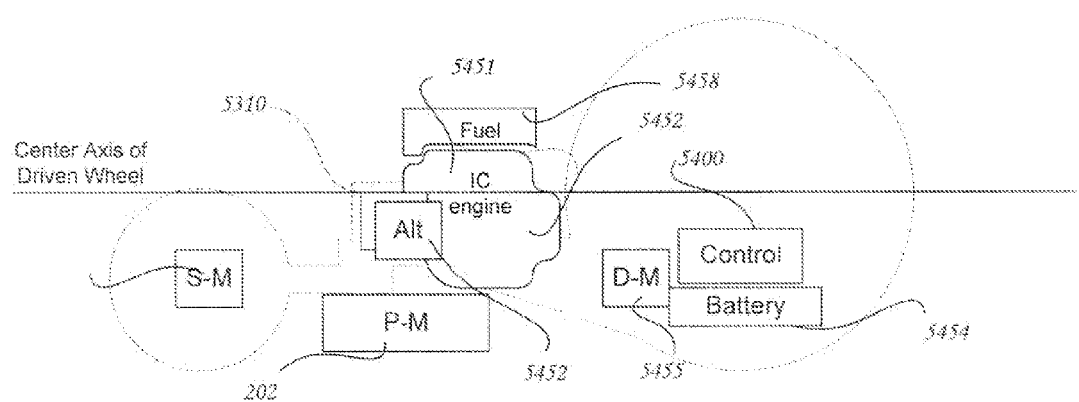

FIGS. 3J and 3K show block component layouts of some of the components discussed with reference to FIGS. 3G and 4A-N below. Payload and payload motor 202 are usually near the ground (in order to carry out lawn care), shown in the middle of the robot. Steering and articulation motors (electrical) 5456 and 5310 are placed essentially adjacent the wheels or pivot to be controlled. However, as shown in FIGS. 3J and 3K, at least half (three components of, in this case, six components) of the heaviest components that may be placed in different locations—an IC engine 5451, alternator/generator 5452, drive motor 5455, battery 5454, control electronics board 5400 (if more than one board, the heaviest ones of these), and fuel tank 5458—are positioned at least in part below the center axis of the highest diameter driven wheel (here main drive wheel 5110) in order to lower the center of gravity. It is not necessary for these components to be placed within the volume of the highest diameter driven wheel 5110 in order to be below the center axis of it. However, as shown in FIGS. 3J and 3K, it is preferable to place at least half of these six components within the volume of the highest diameter driven wheel. In FIG. 3J, the IC engine 5451, alternator 5452, drive motor 5455, battery 5454, and fuel 5458 are within the volume of the highest diameter driven wheel and the control electronics board 5400 is placed within the main body but outside the volume of the highest diameter driven wheel. In FIG. 3K, the control electronics board 5400, drive motor 5455, and battery 5454 are within the volume of the highest diameter driven wheel/but the IC engine 5451, alternator 5452, and feel 5458 tank are placed within the main body but outside the volume of the highest diameter driven wheel. Heavy components (often the engine, motors/generators, batteries, fuel, control electronics including motor amplifiers) are used to lower the center of gravity.

Figure 4H:
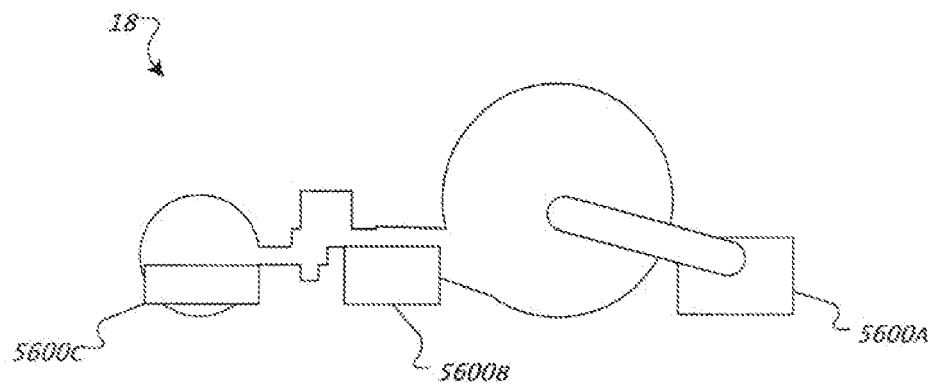
FIG. 4H is a side view of a lawn care robot.
Figure 4I:
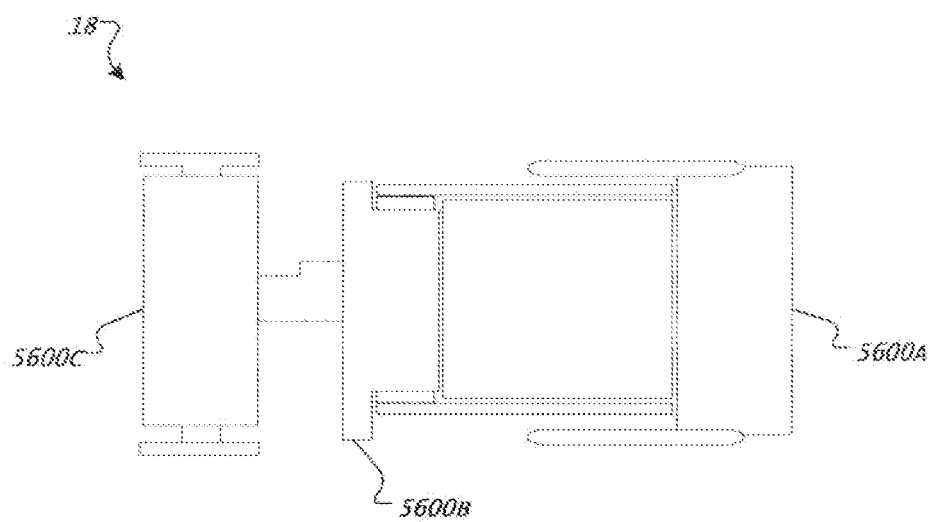
FIG. 4I is a top view of a lawn care robot.
Figure 4K:
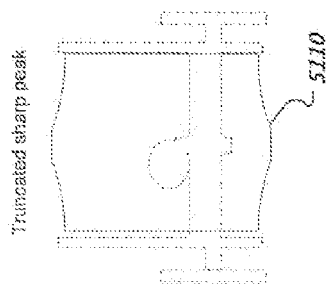
FIG. 4K-N are front views of a drive wheel of a lawn care robot.
Figure 4L:
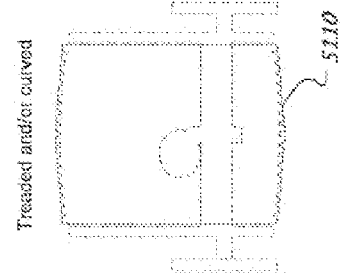
Figure 4M:
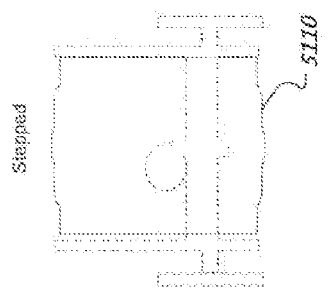
Figure 4N:
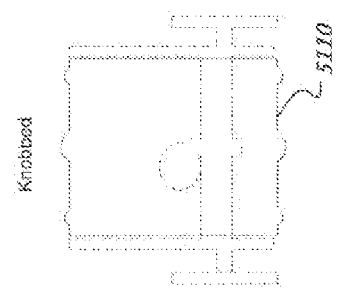
Figure 4J:
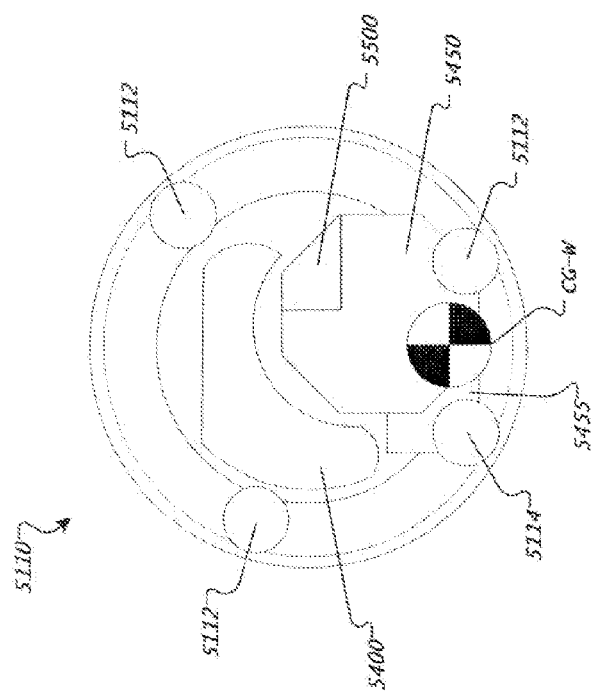
FIG. 4J is a side view of a drive wheel of a lawn care robot.

Referring to FIGS. 4A-N, a robot 18 includes a body 5000 having first and second portions 5100 and 5200, respectively, joined at an articulated joint 5300. The first body portion 5100 defines a payload area 5102 that carries a controller 5400, a drive motor 5450, and a power source 5500, for example. At least one drive wheel 5110 rotates about an axis 5105 defined by the first body portion 5100. The outer diameter of the drive wheel 5110 is sized to be greater than a length and height of the payload area 5102. In some examples, the outer diameter of the drive wheel 5110 is about 16 inches. In one example, as shown in FIGS. 4A-4D, one drive wheel 5110 defines an inner cavity housing the payload area 5102. The first body portion 5100 includes left and right arms 5120 and 5130, respectively, extending from the payload area 5102 around the at least one drive wheel 5110 to the articulated joint 5300. The second body portion 5200 defines an axis 5205 and carries at least one free wheel 5210 that rotates about rear axis 5205. In some examples, the outer diameter of the tree wheel 5210 is about 9 inches and the robot 19 has a center of gravity CG a height H from a ground surface of about 3 inches. The at least one free wheel 5210 may pivot about an axis perpendicular to the rear axis 5205. For example, the at least one free wheel 5210 may pivot laterally with the pivot axis parallel to a direction of travel, allowing the second body portion 5200 to lean into turns.

The articulated joint 5300 includes an actuator 5310 (e.g. a motor and gearbox) controlled by the controller 5400 and configured to rotate the first and second body portions 5100 and 5200, respectively, in relation to each other about at least one pivot 5305 of the articulated joint 5300. In some examples, as shown in FIG. 4B, the articulated joint 5300 allows the second body portion 5200 to twist relative to the first body portion 5100 about a drive direction. In some examples, as shown in FIG. 4D, the articulated joint 5300 rotates a drive direction of the first body portion 5100 an angle A of between about +90° and about −90° with respect to a drive direction of the second body portion 5200. This allows the robot 18 to pivot 360° about a free wheel 5210.

FIGS. 4E-G illustrate an example of robot 18 with two drive wheels 5110 carried by the first body portion 5100. The configuration shown partially exposes the payload area 5102 between the two drive wheels 5110. The two drive wheels 5110 may be driven independently from each other.

Referring to FIGS. 4H-I, the robot 18 may be driven with the first body portion 5100 leading the second body portion 5200 and vice-versa. The robot 18 includes at least one lawn care unit 5600 carried by the first and second body portions 5100 and 5200, respectively. In the example shown, the robot 18 includes lawn care units 5600A and 5600B carried by the first body portion 5100 and lawn care unit 5600C carried by the second body portion 5200. When the robot 18 is configured to have the first body portion 5100 leading the second body portion 5200, lawn care unit 5600A may be configured as a cutter 200, lawn care unit 5600B may be configured as a grass comber 510, 520 and/or a cut edge detector 310, and lawn care unit 5600B may be configured as a cutter 200. When the robot 18 is configured to have the second body portion 5200 leading the first body portion 5100, lawn care unit 5600A may be configured as a cutter 200, lawn care unit 5600B may be configured as a cut edge detector 310, and lawn care unit 5600B may be configured as a grass comber 510, 520 and/or a cut edge detector 310.

Referring to FIGS. 4J-N, in some examples, the drive wheel 5110 is supported by the first body portion 5100 on three roller supports 5112, each positioned about 120° from the other. A drive pinion 5114 coupled to a motor 5450 by a transmission 5455 drives the drive wheel 5110. The drive wheel 5110 has a relatively low center of gravity CG-W. In some instances, the drive wheel 5110 defines a stepped profile, as shown in FIG. 4K. In other instances, the drive wheel 5110 defines a truncated profile with a sharp peak, as shown in FIG. 4L. In other instances, the drive wheel 5110 defines a knobbed profile, as shown in FIG. 4M. In other instances, the drive wheel 5110 defines a treaded and/or curved profile, as shown in FIG. 4N.

Figure 5A:
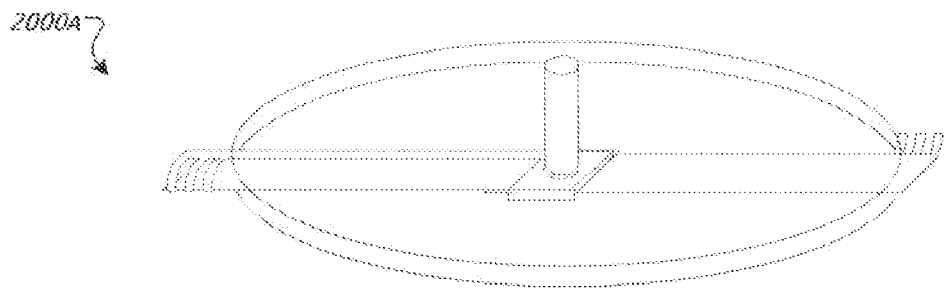
FIG. 5A is a schematic view of a rotary cutter.
Figure 5B:
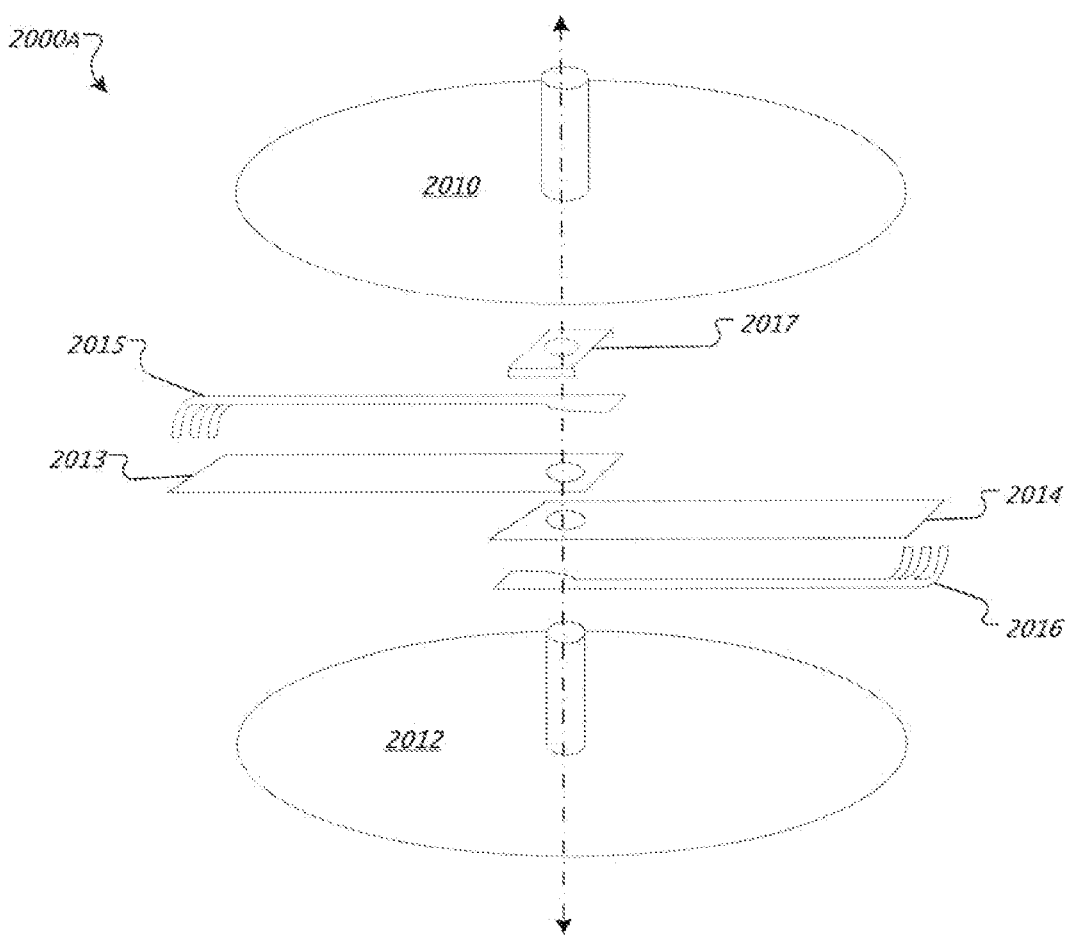
FIG. 5B is an exploded view of a rotary cutter.

Referring to FIGS. 5A-B, a rotary cutter 2000 includes upper and lower disk guards 2010 and 2012, respectively, and first and second cutter blades 2013 and 2014, respectively, disposed between the upper and lower disk guards 2010 and 2012, respectively. The rotary cutter 2000, in some examples, includes first and second blade tip guard combs 2015 and 2016, respectively, disposed on corresponding the first and second cutter blades 2013 and 2014, respectively. The blade tip guard combs 2015, 2016 reduce blade injuries and comb the grass 20. An optional blade lock 201 holds the first and second cutter blades 2013 and 2014, respectively, together to form one rotating cutter.

In some implementations, the robot 10 includes an aerator or erector which lifts cut grass 24, thereby adding perceived volume to the mowed lawn 24 and enhancing an aesthetic appearance of the lawn 20. The aerator/erector may include an active brush or comb for brushing the grass upward, for example. The robot 10 may include an aeration and/or lift system as disclosed in U.S. Pat. No. 6,611,738; US Patent Application Publication 2004/0187457; and/or U.S. Pat. No. 3,385,041, all incorporated herein by reference in their entireties.

In some instances, the surface treater 200 includes sheep shear-style of hedge-trimmer-style cutters 200A, which confine their cutting action to a particular radius and prevent objects greater than that radius from being accidentally cut. For example, the size of the cutting radius may be selected to be smaller than a child's fingers or toes, so as to prevent accidental injury. Moreover, the cutter 200 cuts with a substantially low energy rate of approximately 70 watts over a 0.5 meter cutting length. The rate of energy expenditure is low enough that the robot 10 can run for a sufficient period of time to cut a yard of typical size.

Figure 5C:
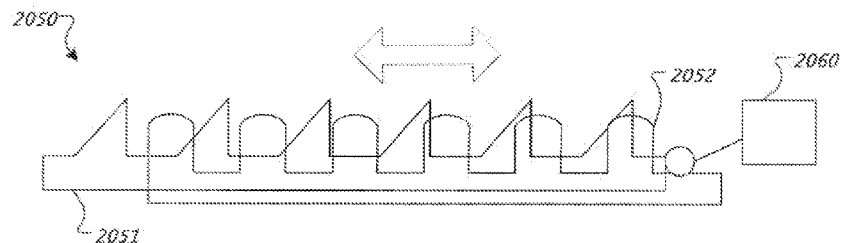
FIGS. 5C-D are schematic views of a reciprocating cutter.

FIG. 5C is a schematic view of a simplified reciprocating cutter 2050 as an example of a reciprocating cutter 200A. The sickle-bar cutter 2050 includes first and second blades, 2051 and 2052 respectively, positioned parallel to each other and moved in opposite reciprocating motions by an actuator 2060.

Figure 5D:
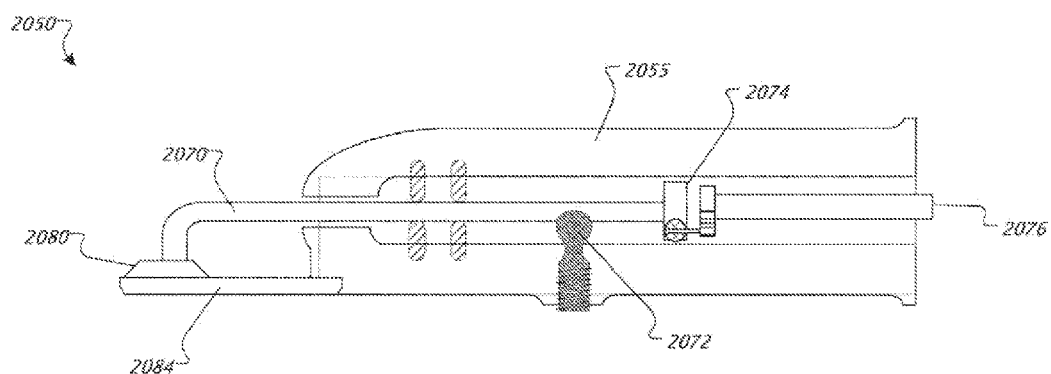
Figure 5E:
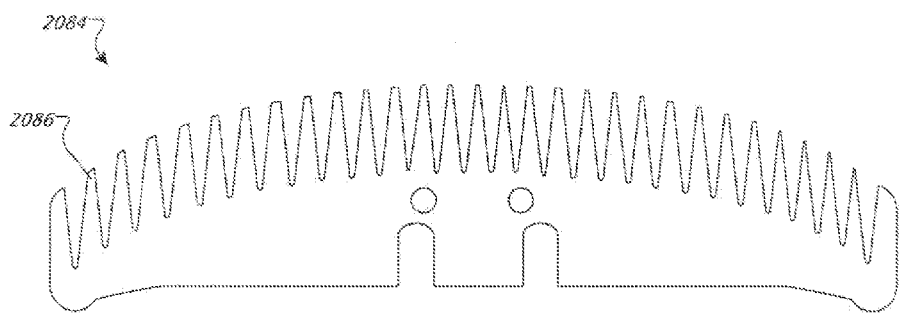
FIG. 5E is a schematic view of a comb of a reciprocating cutter.

Referring to FIGS. 5D-E, a reciprocating cutter 2050 includes a housing 2055 carrying an arm 2070 positioned to rotate horizontally (e.g. from right to left and back) with regard to the lawn about a pivot bearing 2072. A cutting blade 2080 is mounted to an external end of the arm 2070 and abuts a comb 2084 connected to the housing 2055. The spinning motion of a driven shaft 2076 is translated into reciprocating side-to-side motion for the arm 2070 via the eccentric bearing 2074. As the arm 2070 moves horizontally from side to side, the teeth 2082 of the cutting blade 2080 shearingly slide horizontally while in contact with the tines 2086 of the comb 2084, cutting any blades of grass caught in grooves 2085 formed between the adjacent cutting blade 2080 and comb 2084. In one example, the distance of reciprocation is five centimeters or less (i.e., of the blade 2080 with respect to the comb 2084).

Figure 5F:
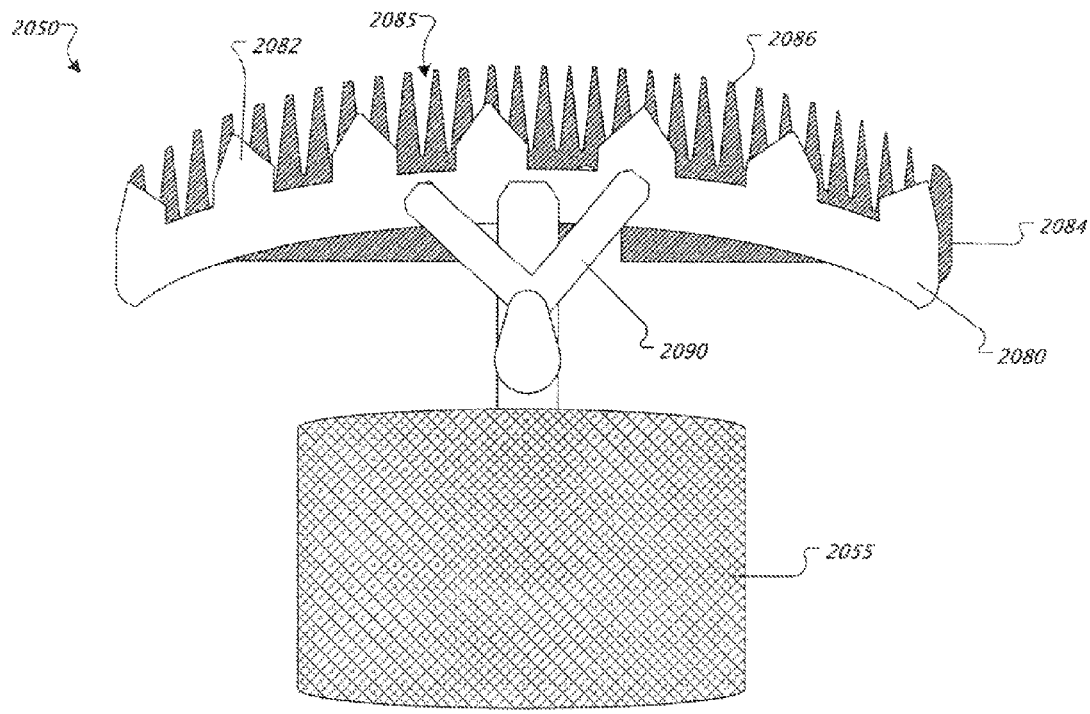
FIGS. 5F-G are schematic views of a reciprocating cutter.

Referring to FIG. 5F, the reciprocating cutter 2050 includes a blade tensioner 2090 providing evenly-spaced downward tension on the cutting blade 2080. The teeth 2082 of the cutting blade 2080 are even urged against the comb 2084, enhancing the shearing action. The blade tensioner 2090 may include one or more arched extensions extending from the arm 2070. Alternatively, the blade tensioner 2090 may include a separate unit connected to the body 100, such as a heavy horizontally-aligned bar that provides a downward pressure against the cutting blade 2080.

Figure 5G:
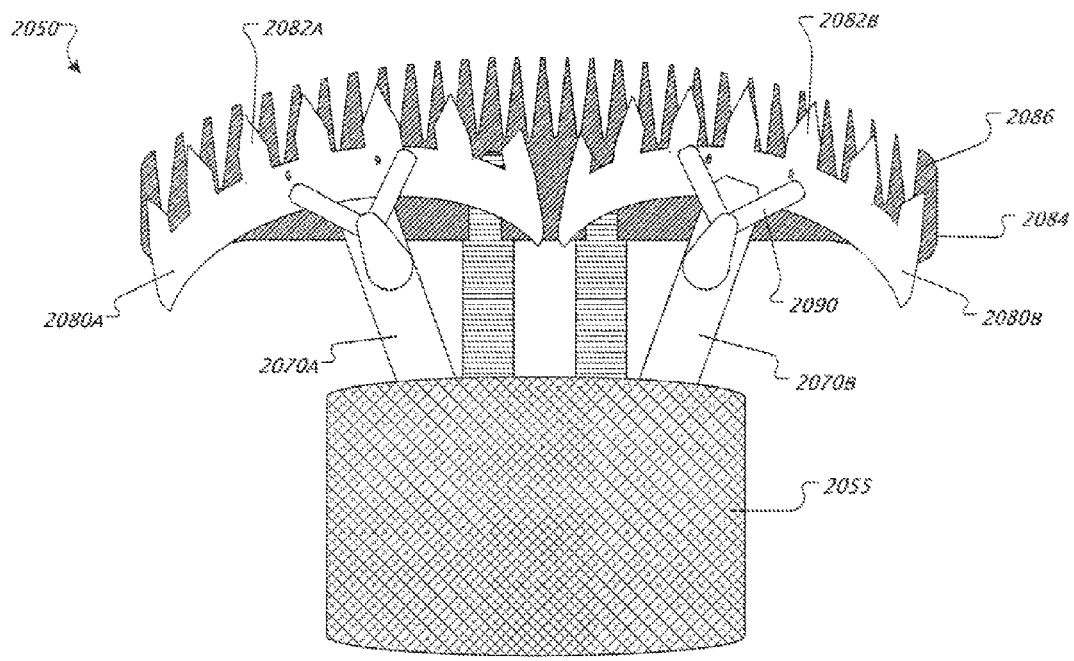

Referring to FIG. 5G, the reciprocating cutter 2050 includes two cutting blades 2080A and 2080B, each actuated by separate arms 2070A and 2070B, respectively, reducing the number of teeth 284A, 284B on each cutting blade 2080A and 2080B, respectively.

The cutting blade 2080 may include four teeth 2082 per every five comb tines 2086. Alternatively, the cutting blade 2080 may include nine teeth 2084 per every ten tines 2086. The cutting blade 2080 and comb 2084 may function such that only one (or alternatively, two) teeth 2082 are cutting at a time during operation of the cutter 2050. The teeth 2082 of the cutting blade 2080 and the tines 2086 of the comb 2084 may have mutually different pitches and may be chamfered. The number of teeth 2082 or tines 2086 may be a multiple of the number of teeth present in a typical sheep-shearer; for example, three times the factor of widening of the comb 2084 with respect to the sheep-shearer. The clamping force provided to the blade 2080 against the comb 2084 may be uniform, or may vary across the horizontal area of the blade 2080, within a range of acceptable clamping force. The material of the cutting blade 2080 and/or comb 2084 may include hardened metal (such as steel) which is stamped, molded, then machined, forged, and machined again.

The comb 2080 and/or cutting blade 2084 may include mounting holes for mounting the cutting blade 2080 or comb 2084 to a yoke. The teeth 2082 or tines 2086 may have rounded tips to guide blades of grass into the grooves 2085. The spacing of the teeth 2082 or tines 2086 may be established to optimize the opening gap 2085.

The curves of the blade 2080 and comb 2084 may have outlines similar to those of a sheep-shearing device when the radius is nine inches or less; when the radius of curvature thereof is greater than nine inches, the curves of the blade 2080 and comb 2084 may be altered in accordance with the driving radius and cutter radius.

Figure 5H:
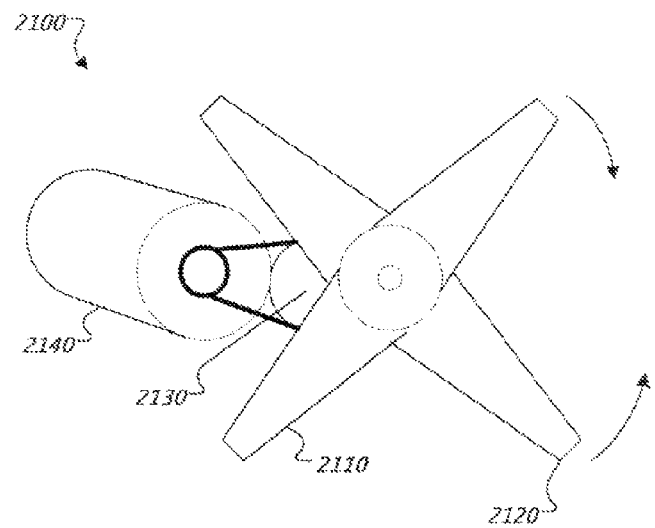
FIGS. 5H-I are schematic views of cutters.

Referring to FIG. 5H, a cutter 2100 includes a first blade 2110 mounted to and rotatably driven by a motor 2140. A second blade 2110 is mounted to and rotatably driven by a planetary gearbox 2130 driven by the motor 2140. The first and second blades 2110 and 2120, respectively, rotate in opposite directions to shear grass. The cutter 2100 has the lift capabilities of a conventional rotary cutter, but requires less power to operate and generally provides a cleaner cut. In some examples, the second blade 2110 is either fixed or free floating, rather than driven by a planetary gearbox 2130. In the fixed second blade configuration, only the first blade 2110 rotates thereby shearing grass with a scissor type action.

Figure 5I:
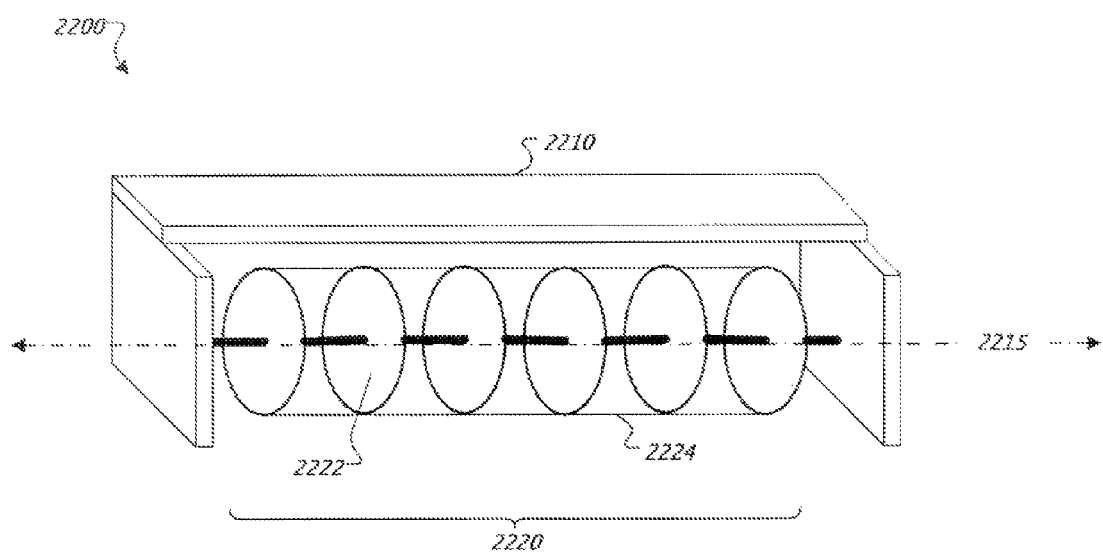

Referring to FIG. 5I, a cutter 2200 includes a cutter frame 2210 defining a longitudinal axis 2215. The cutter frame 2210 is mounted to the body with the longitudinal axis 2215 substantially parallel to a ground surface. A driven wire holder 2220 is rotatably mounted to the cutter frame 2210 to rotate about the longitudinal axis 2215. The wire holder 2220 includes a plurality of spaced disks 2222 and at least one wire 2224 secured near a peripheral edge of the disks 2222 and arranged substantially parallel to the longitudinal axis 2215.

The rotating wire holder 2220 and associated wire(s) 2224 cuts grass with relatively less power than a conventional rotary cutter.

In some examples, the surface treater 200 includes a fertilizer or pesticide dispenser for distributing fertilizer or pesticide over the yard 20, either in lieu of or in addition to other lawn care tasks such as mowing.

Figures 6A, 6B:
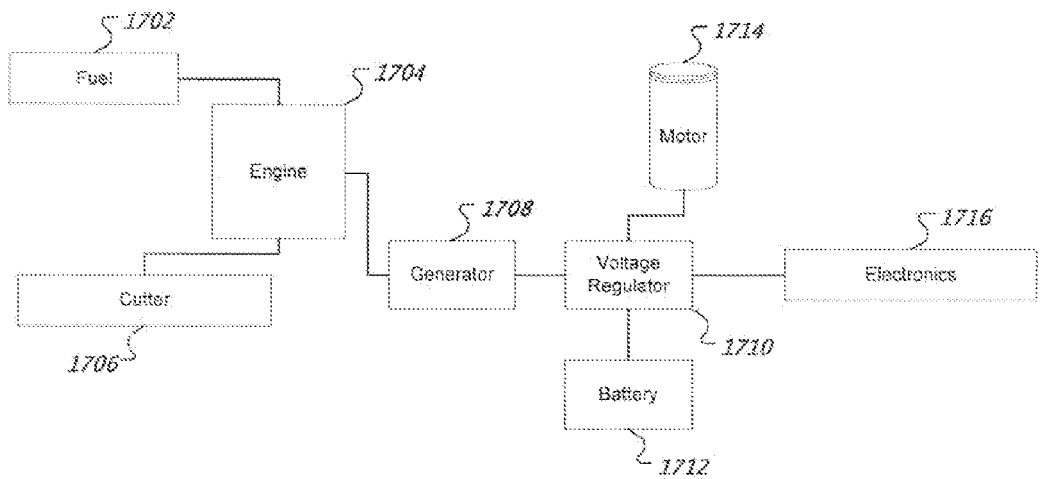
FIG. 6A is a schematic view of a hybrid mechanical-electric robotic mower system.
FIG. 6B is a schematic view of an all electric robotic mower system.

Referring to FIGS. 6A-B, the robot 10 generates electrical power which may be stored. One implementation utilizes a generator 1702, such as a dc motor that spins to generate DC current. Control often involves a voltage regulator 1704 to prevent high and low voltages in the system. Another implementation includes an alternator. An alternator is a three phase generator that is run through a set of diodes to rectify the AC current to DC. With the use of an additional voltage regulator it is possible to get stable, nearly ripple-free DC current from the alternator.

FIG. 6A illustrates a hybrid mechanical-electric system 1700A including a fuel source 1702 delivery fuel to an engine 1704 that drives a cutter 1706 and a generator 1708. The generator 1708 is connected to a voltage regulator 1710. The voltage regulator 1710 is connected to an energy storage unit 1712 (e.g. a battery), a drive motor 1714 and electronics 1716.

FIG. 6B illustrates an all electric system 1700B including a fuel source 1702 delivery fuel to an engine 1704 that drives a generator 1708. The generator 1708 is connected to a voltage regulator 1710. The voltage regulator 1710 is connected to an energy storage unit 1712 (e.g. a battery), a drive motor 1714, a cutter 1706, and electronics 1716.

Referring to FIGS. 6C-D, the robot 10 includes six different categories of components; each of which performs a narrow function of total system operation. The six categories include: C1) Fuel—Storage and delivery of fuel to the engine; C2) Intake—Passage of air into the engine; C3) Engine—Combustion of fuel to create mechanical work from stored energy; C4) Electrical Output—Components to create usable electrical power from shaft work; C5) Starting—Components to start the engine; and C6) Mechanical Output—Components designed to channel shaft work to appropriate locations. For each of the six categories, there are three separate types of components: required (minimum complexity (cost) path to operation), optional (these components will add additional features or functionality to the product at additional cost, and expected.

Figure 6E:
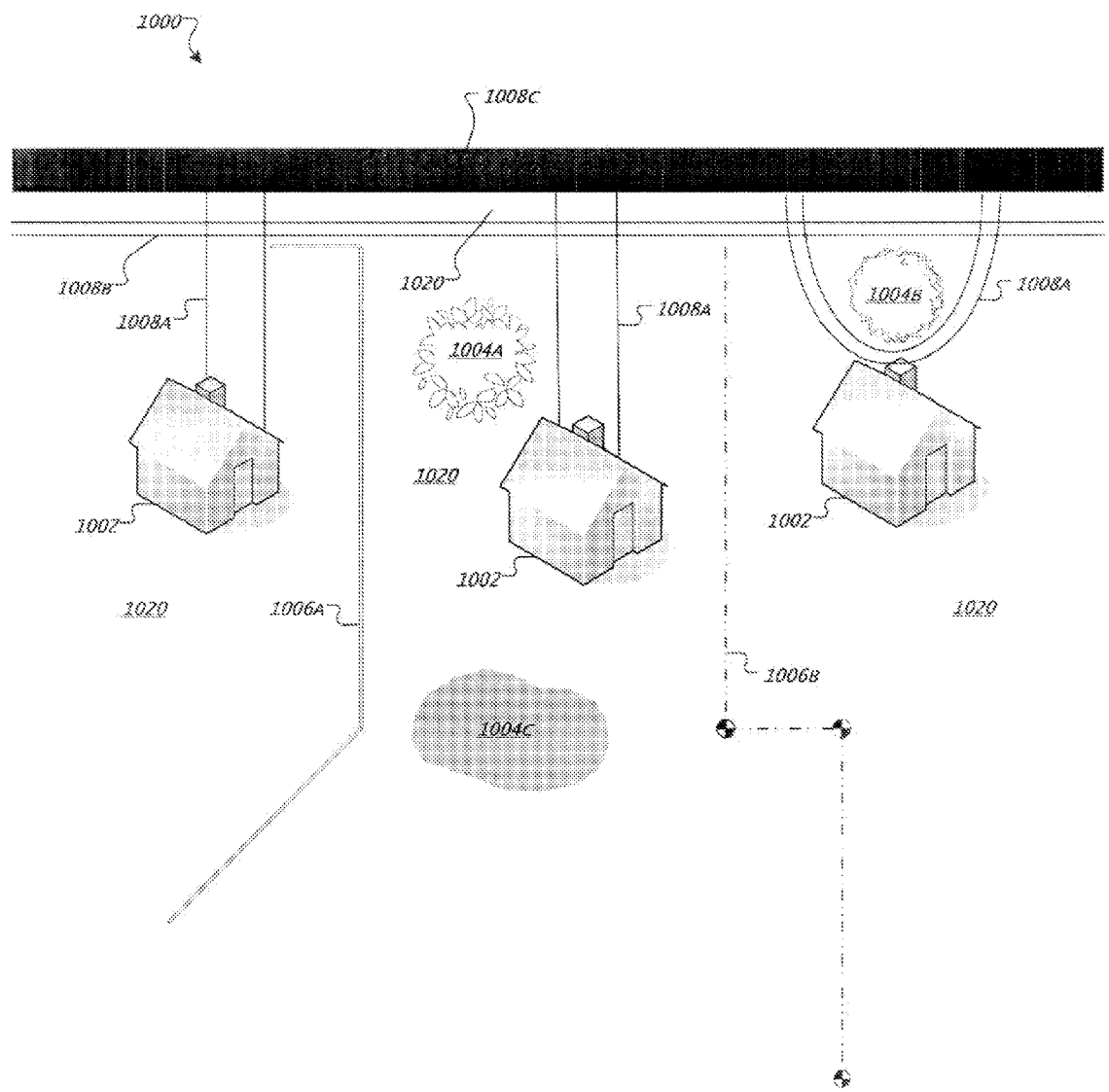
FIG. 6E is a schematic view of grass-cutting obstacles, boundaries, and cuttable areas in a neighborhood.

FIG. 6E provides a schematic view a neighborhood 1000 including houses 1002, grass-cutting obstacles 1004 (e.g. trees 1004A, bushes 1004B, and water 1004C), boundaries 1006 (e.g. fences 1006A and property lines 1006B), non-cuttable areas 1008 (e.g. driveways 1008A, sidewalks 1008B, and roads 1008C), and cuttable areas 1020. Although a fairly simple neighborhood 1000 is shown, the depiction is sufficient for substantially topologically equivalent, less linearly oriented lawns, or lawns with islands, multi-section lawns, and or other discontinuities.

The delineation between areas intended to be traversed by the robot 10 and areas not intended to be traversed by the robot 10 may be divided into different types of boundaries, including visible boundaries and invisible boundaries, natural boundaries, artificial boundaries, arbitrary, political boundaries, navigable and blocking boundaries. Lawn edges are a type of arbitrary boundary that abut many kinds of non-grass or non-mowable areas (e.g., fences, flowerbeds, gardens, mulch, sidewalks, walls, steps). Arbitrary boundaries also include boundaries established for property or other reasons within a physically mowable continuous grass area. Examples of arbitrary boundaries include a boundary between a bed of azaleas (bedded in tree-bark mulch) and a grassy lawn and a boundary between a grassy lawn and a concrete driveway. The transition between the grass and non-grass area, or the non-grass area itself, is discernable by virtue of differing physical properties. In many cases, the difference is visually discernable. However, the robot 10 uses a limited set of less complex physical characteristics, such as average reflected wavelengths of light (i.e., color) or mowing resistance (correlating to grass presence).

The arbitrary boundaries which are not readily ascertainable by differences in physical characteristics include property lines 1006B between adjacent lots in a neighborhood 1000 and a border between a first yard region 1020 which should be mowed and a second yard region 1020 which should not be mowed due to seeding, damage, or the like. To recognize the arbitrary boundaries, the robot 10 uses boundary responders 600, such as lengths of identifiable cord ("cord" also meaning wire, tape, chain, or cord of discrete elements in a bounded line).

FIGS. 7A-7E depict structures relevant to switching between autonomous and manual operation of the robot 10. FIGS. 7A, 7C-7F depict structures suitable as an analog of a conventional push mower handle.

Figure 7A:
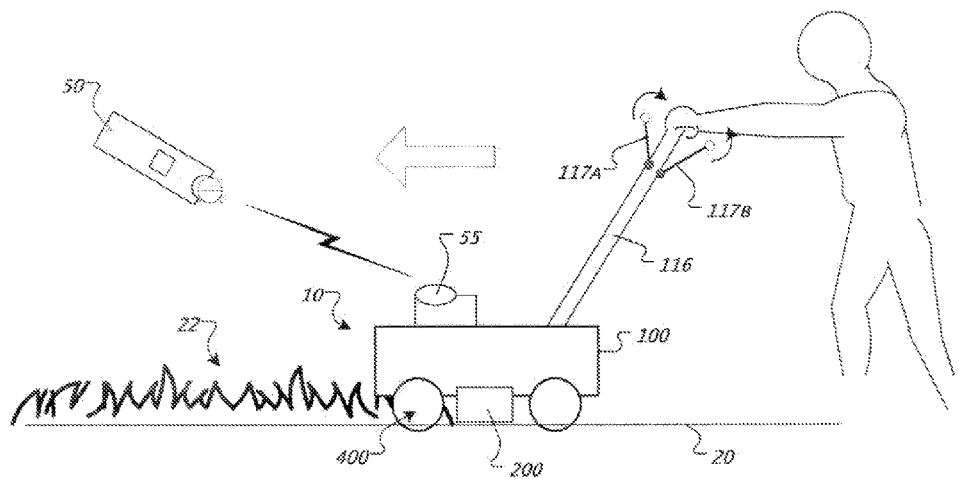
FIGS. 7A-B are schematic views of methods of navigating a mower.
Figure 7B:
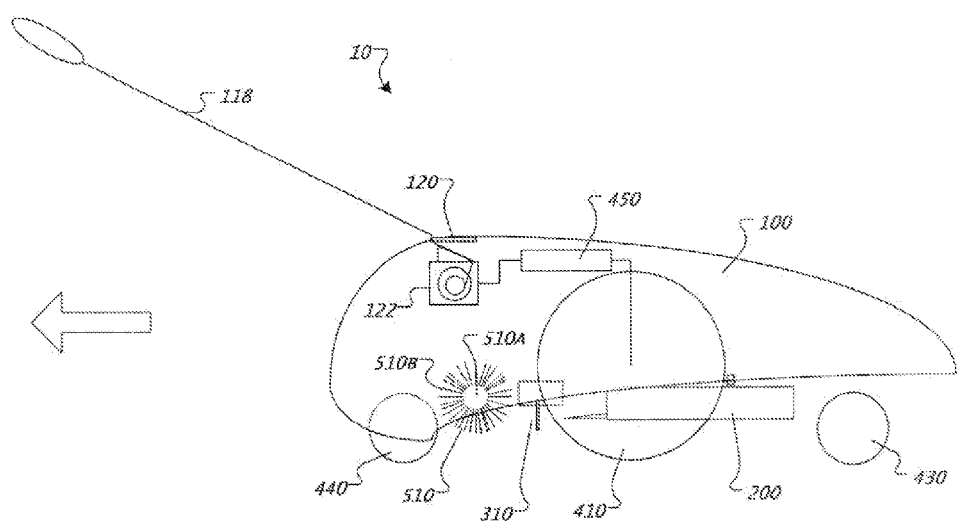

FIGS. 7A and 7B are schematic views of methods of navigating a lawn care robot 10. Referring to FIG. 7A, one method of manually leading the robot 10 includes using an IR or wireless remote 50 that sends a signal to a receiver 55 on the robot 10. The drive system 400 is configured to follow the signal received from the remote 50

Another method includes guiding the robot 10 with a push bar 116 attached to the body 100. The push bar 116 may be detachable from or stowable on the body or housing 100. For example, if the robot 10 is programmed to avoid thick vegetation so as not to become mired or entangled, an operator may nonetheless override the behavior by guiding the robot 10 with the push bar 116. In some cases, the push bar 116 includes a switch, speed setting, or joystick to advance and steer the robot 10. In one instance, the push bat 116 includes one or more pressure or strain sensors, monitored by the robot 10 to move or steer in a direction of pressure (e.g., two sensors monitoring left-right pressure or bar displacement to turn the robot 10). In another instance, the push bar 116 includes a dead man or kill switch 117A in communication with the drive system 400 to turn off the robot 10. The switch 117A may be configured as a dead man switch to turn off the robot 10 when a user of the push bar 116 ceases use or no longer maintains contact with the push bar 116. The switch 117A may be configured act as a kill switch when the push bar 116 is stowed, allowing a user to turn off the robot 10. The dead man or kill switch 117A may include a capacitive sensor or a lever bar. In another instance, the push bar 116 includes a clutch 117B to engage/disengage the drive system 400. The robotic mower 10 may be capable of operating at a faster speed while manually operated by the push bar 116. For example, the robotic mower 10 may operate at an autonomous speed of about 0.5 m/sec and a manual speed greeter than 0.5 m/sec (including a "turbo" speed actuatable to 1.20-150% of normal speed).

Referring to FIG. 7B, in yet another method of navigating the robot 10, the robot 10 includes a pull leash or retractable lead wire 118 fed through a guide 120 from a spool 122. In this example, the drive system 400 includes a controller 450 carried by the body 100 and controlling the release and retraction of the spool 122. The pull wire extends for 6-10 feet, for example, and the robot 10 monitors the amount of extension directly or indirectly (encoder, etc.), as well as the direction in which the wire is pulled (monitoring a position of the wire guide 120). The robot 10 follows the direction of the pull and controls speed to maintain a wire length. FIG. 7B also shows a grass erector 510 carried by the body 100 forward of the cutter 200. The grass erector 510,520 includes a driven wheel 510A having an axis of rotation parallel to the lawn 20,1020 and a plurality of flexible grass agitators 510B extending radially outward from the wheel 510A.

Figure 7C:
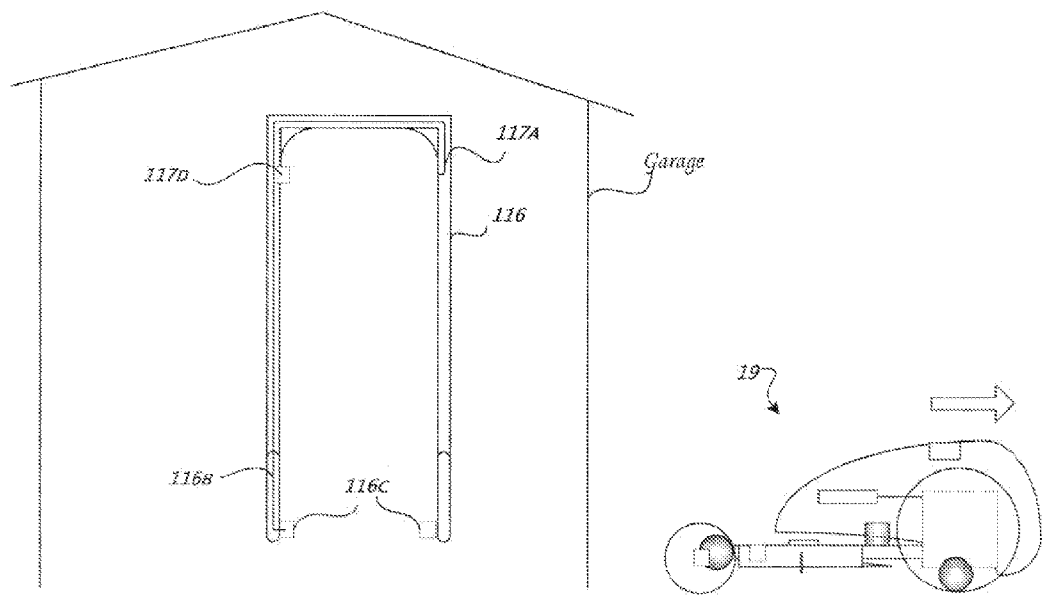
FIG. 7C is a schematic view of a robotic mower and a handle.
Figure 7D:
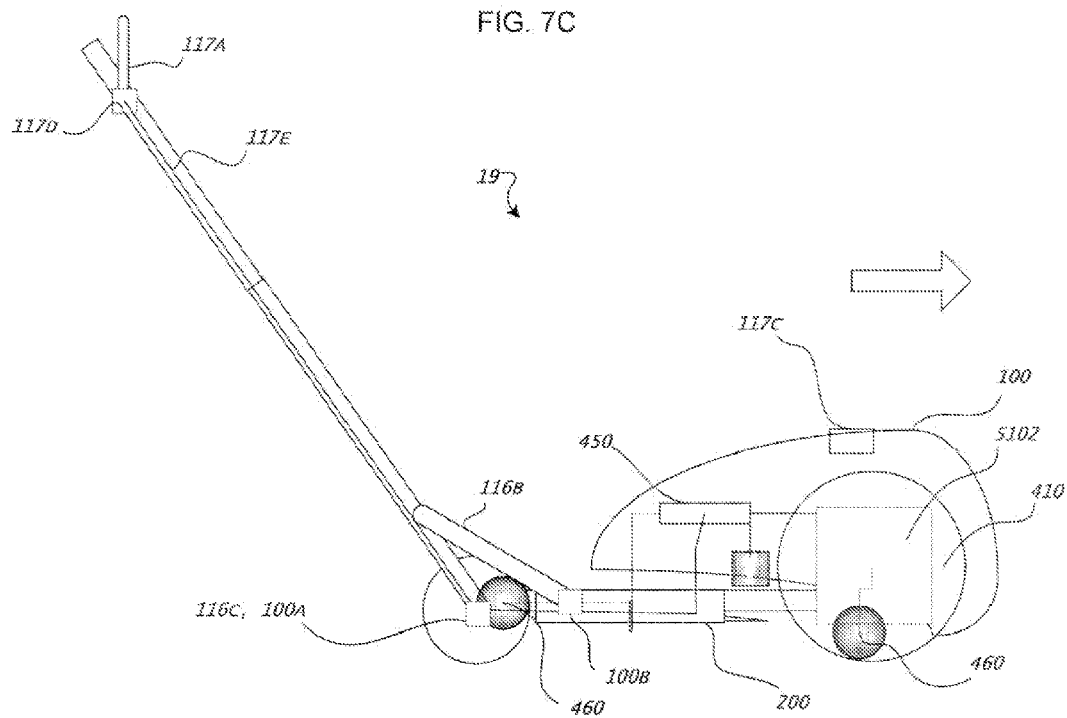
FIG. 7D is a schematic view of a robotic mower with a handle.

Referring to FIGS. 7C and 7D, robot 19 is configured for autonomous and manual (push) modes. As shown in FIG. 7D, the handle 116 is configured substantially in the form of a conventional push mower handle. The handle 116 includes, at an upper end, a dead man switch 117A manually operable by the hand of an operator. The dead man switch 117A is connected to a spring loaded actuator 117D and is thereafter connected to the robot 19 using a connection line 117E (which may be a movable mechanical actuator cable or an electrical line). At a lower end of the handle 116, the connection line 117E is passed through a connector 116C to the robot 19. The handle 116 is connectable to the robot 19 via the connector 116C, as well as via a brace 116B. The lower end of the handle 116 is connected substantially in the neighborhood of the axis of the wheels 410,420 at the rear of the robot 19, while the brace 116B and lower connection together permit the robot 19 to be tipped via the handle 116 as the handle is lowered by a user. In this manner, the robot 19, used in manual mode, may be tipped and turned in place in the manner of an ordinary push mower.

The dead man switch 117a is provided with a mechanical bias or spring that biases the switch 117a to an "off" position. In this case, "off" means a mechanical or electrical state in which an internal combustion or electrical cutter drive cannot function. For an internal combustion cutter drive, examples of "off" include an open circuit from an ignition or a short between a spark terminal and an engine block or other known device for disabling the IC engine. For an electrical cutter drive, examples of "off" include an open circuit, normally off relay, or other known device for disabling an electrical motor. In either case, a brake and/or clutch may be connected to the dead man switch 117a and actuated at the same time as, or instead of, disabling the motor. In an "on" position, the switch 117a is held against the bias of the spring by the operator. The switch 117a may not be locked or fixed in the "on" position.

The robot 19 depicted in FIGS. 7C and 7D, capable of receiving the detachable push/pull handle 116, has an internal combustion engine (or equivalent fuel-based or combustion system providing high energy density such as fuel cells) for direct drive of a cutter, charging batteries or pressurizing fluids. The robot 19 also includes a number of electrical or hydraulic motors, including one or two drive motors 460 (driven to move the robot forward) and/or one or two steering motors 470 (driven at differential rates or together to turn the robot 10). Each motor 460,470 that connects to a driven wheel is provided with an electromagnetic clutch or other electrically actuated clutch to disengage the respective motor in manual modes. One clutch may disengage more than one motor. The electromagnetic clutches may be controlled from the controller 450, or more directly via the connector 116C as discussed herein.

As shown in FIGS. 7C and 7D, the handle 116 is detachable via the connector 116C provided to the robot and a corresponding connector 100A provided on the robot body 100. The connectors 116A or 100A may each be mechanical (i.e., if passing an actuating cable or transmitting its motion), or may be electrical (multi-pin connectors).

The connectors 116A and 100A may have additional functions. When the handle 116 is attached, the dead man switch 117A is a normally off switch that transmits the "off" condition (disengaging or killing the cutter drive) to the mower via the connectors 116A, and can be actuated manually to change to an "on" condition. However, upon removal of the handle 116 from the robot 19, the normally "off" default condition is reversed in order to permit the robot 19 to operate autonomously (and restored whenever the handle 116 is attached). Either or both of the connectors 116A, 100A may be provided with a reversal switch that is actuated when the handle is removed, the reversal switch providing the same status as if the handle 116 were attached and the dead man switch 117A held by an operator. While it is possible to carry out reversal switching in software, it is preferable that a dead man switch 117A rely on robust mechanical connections or open/closed current loops to engage and disengage the switch 117A. The reversal switch associated with connectors 116A or 100A also preferably employs a mechanical switch or open/closed current loop to provide the "switch on" condition. Alternatively, the reversal switch may be provided within the robot body 100 rather than directly at connectors 100A, 116A.

In some implementations, the connectors 116A or 100A, or the dead man switch 117A, are monitored by a handle sensor that detects a presence or absence of the handle 116. The handle sensor is connected to a controller 450, which initiates or deactivates manual mode, (e.g., activating the clutches to disengage the drive and steering motors from the wheels) in response to a detected presence or absence of the handle 116. Based on this detection, the controller 450 may prevent the robot 19 from entering any autonomous mode while the handle 116 is attached (with the exception of a set-up or testing mode in which the robot is pushed within detection range of active or passive barriers or responders.)

As shown in FIG. 7C, as the robot 19 is used in fully autonomous modes, the handle 116 is left hanging or otherwise conveniently stored in a user's garage or other sheltered property. The robot 19 completes the bulk of the yard mowing, or all of the mowing in segmented areas. Depending on the yard configuration, uncut areas may be bounded by obstacles, otherwise unreachable, or outside a boundary set by the user. The user may choose to complete, finish, or touch up remaining areas. Preferably, the robot's dock, home base, or finishing location is in the vicinity of the handle storage location. In any case, the user mounts the handle 116 on the robot 19. As the connectors 116C and 100A engage mechanically, the aforementioned reversal switch is deactivated, bringing the dead man switch 117A into operation (and, as it is normally off, preventing cutting operations). The controller 450 of the robot 19 may detect the presence of the handle 116A and enter a manual mode in response. Either implementation may be used by the controller 450 to power and disengage the clutches of the drive and/or steering motors, 460 and 470 respectively, so that the robot 19 may be freely pushed. In one example, the clutches are normally engaged so that a robot having a dead battery or other power failure will not readily roll down a hill as the normally engaged clutches connect the non-backdriveable or backdriveable with resistance motors to the wheels 410,420. The user may then freely push the mower, pressing the dead man switch 117A to start the motor and/or cutters 200. The robot 19 may be self-propelled in manual mode, faster than autonomous mode, and may be controlled using the dead man switch 117A or other manual control.

Figure 7E:
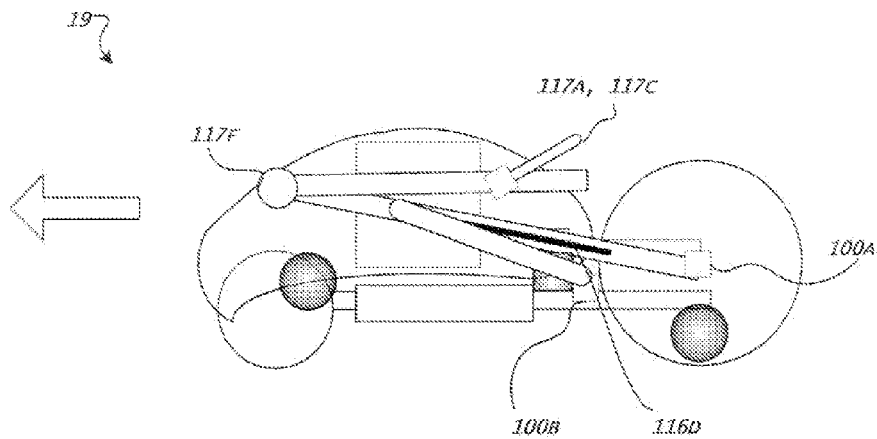
FIG. 7E is a schematic view of a robotic mower with a stowed handle.
Figure 7F:
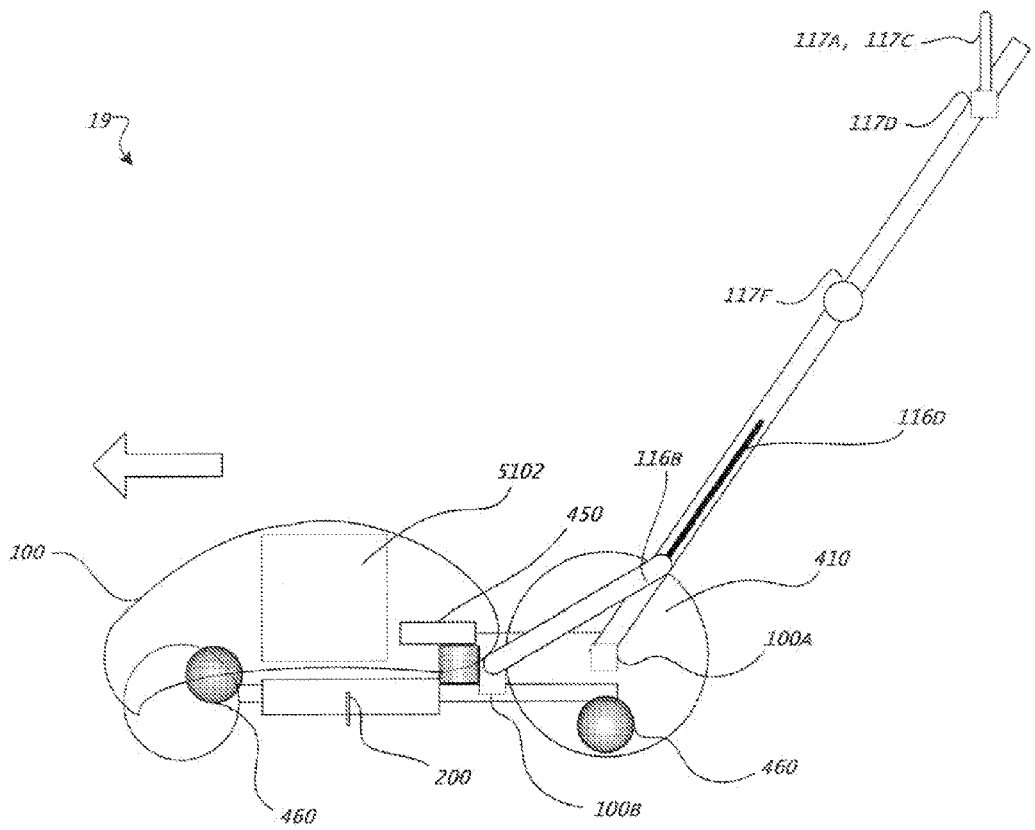
FIG. 7F is a schematic view of a robotic mower with a handle.

FIGS. 7E and 7F depict robot 19 with a different, foldable handle structure and body structure, but in general similar to the detachable handle structure of FIG. 7F. As shown in FIG. 7F, the handle 116, while in use, remains configured substantially in the form of a conventional push mower handle. The handle 116 includes a dead man switch 117A with a spring loaded actuator 117D and connects to the robot 19 via a connection line 117E (not shown). The connection line 117E is passed through a lower end of the handle 116 to the robot 19. The handle 116 is connectable to the robot 19 via a pivot connector 100A on the robot 19, as well as via a sliding brace 116B. The lower end or the handle 116 is connected substantially in the neighborhood of the axis of the wheels 410, 420 at the rear of the robot 19. The sliding brace 116B and lower connection 100A together permit the robot 19 to be tipped via the handle 116 as the handle 116 is lowered by a user. In this manner, the robot 19, used in manual mode, may be tipped and turned in place in the manner of an ordinary push mower.

A folding joint 117F or switches within the pivot connector 100A or sliding brace 116B may have the same functionality as the connectors 116A and 100A, previously described. When the handle 116 is unfolded the dead man switch 117A is a normally off switch that transmits the "off" condition (disengaging or killing the cutter drive) to the mower via the pivot connector 100A, and can be actuated manually to change to an "on" condition. However, upon folding of the handle 116 flush to the robot 19, generally conforming to the body 100 of the robot 19, the normally "off" default condition is reversed to permit the robot 19 to operate autonomously (and restored whenever the handle 116 is attached). The folding joint 117F, the pivot connector 100A, or sliding brace 116B may be provided with a reversal switch that is actuated when the handle is folded down. The reversal switch provides the same status as if the handle 116 was unfolded and the dead man switch 117A held by an operator. As shown in FIG. 7E, the dead man switch 117A may be folded down to a position in which it is facing up and substantially in the same position as a useful kill switch 117C. In this position, and with the reversal switch activated, the dead man switch 117A may become normally "on", actuatable to an "off" condition, and thereby also become a kill switch 117C.

The mower in manual mode, with the handle attached and dead-man either on or off, may be used in a check setup mode by the user. This check setup mode would require the user to circumnavigate and approach all boundaries, obstacles, and marked guarded areas to be avoided by the robot. The robot, via the user interface, notifies the user upon the recognition or activation of each boundary, obstacle, or responder. The user would be instructed to diligently try and "fool" the robot (i.e., manually push the robot to test, avoid, and or approach areas not clearly bound by a boundary or responder) or escape boundary confinement without detection, and if successful, would know to place additional boundary segments or responders, in eluding redundant boundary segments or responders as necessary. The robot may also be configured to permit autonomous mowing only after sufficient setup checking (e.g., certain distance odometered in check setup mode).

In some examples, the autonomous robot 10 includes a non-grass detector 330 to aid mowing grassy areas 20, rather than areas which should not be mowed or traversed, such as concrete, mulched or gravel-covered surfaces. The not-grass detector 330, in various examples, includes a mechanical, electrical, piezoelectric, acoustic, optical or other suitable sensor capable of detecting a presence of grass. Certain of the sensors discussed above with regard to the cut edge sensor 310 may function as the not-grass detector 330 if arranged in a position or extending to a position other than the location of the cut edge sensor. The not-grass detector 330 and cut edge sensor 310 may be integrated or combined as a single unit.

Figure 8A:
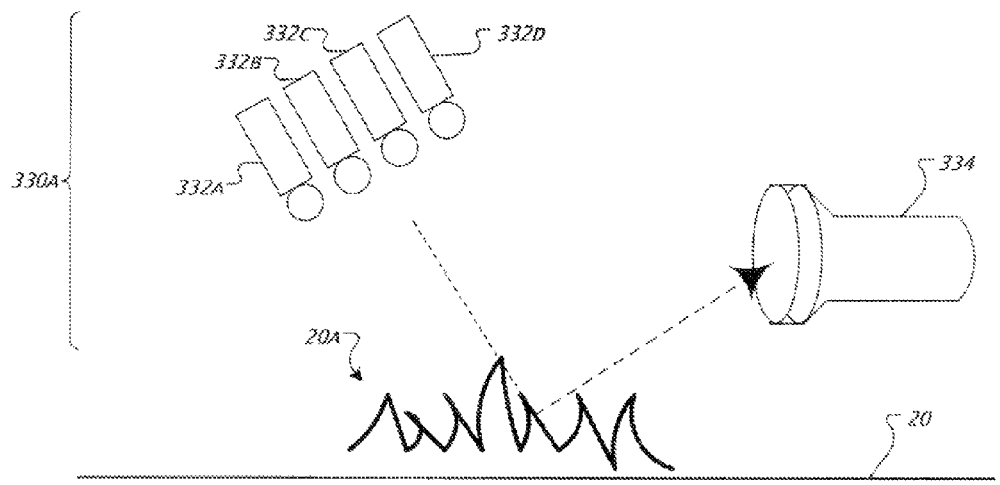
FIG. 8A is a schematic view of an optical not-grass detector.

Referring to FIG. 8A, in some implementations, a not-grass detector 330A includes a chlorophyll detector having one or more light emitters 332 and an optical sensor 334. The wavelengths emitted by the light emitters 332 are selected based on an absorption spectrum of chlorophyll. In one example, the not-grass detector 330A includes four different colored narrow-spectrum light emitting diodes (LEDs) 332A-D. LED 332A emits a blue wavelength. LED 332B emits a green wavelength. LED 332C emits a yellow wavelength. LED 332D emits a red wavelength.

The optical sensor 334 receives and analyzes light reflected from an area illuminated 20A by the light emitters 332 to determine a presence of chlorophyll. In some examples, the optical sensor 334 includes a gray-scale or black and white (1 bit) detector. When an image provided by the optical sensor 334 is primarily dark or black (or weak signal) in response to blue and red light emitted by light emitters 332A and 332D, respectively, but is primarily light or white (or strong signal) in response to green and yellow light emitted by light emitters 332B and 332C, respectively, the robot 10 determines that the illuminated area 20A likely includes grass aid traverses and/or mows the illuminated area 20A.

Figure 8C:
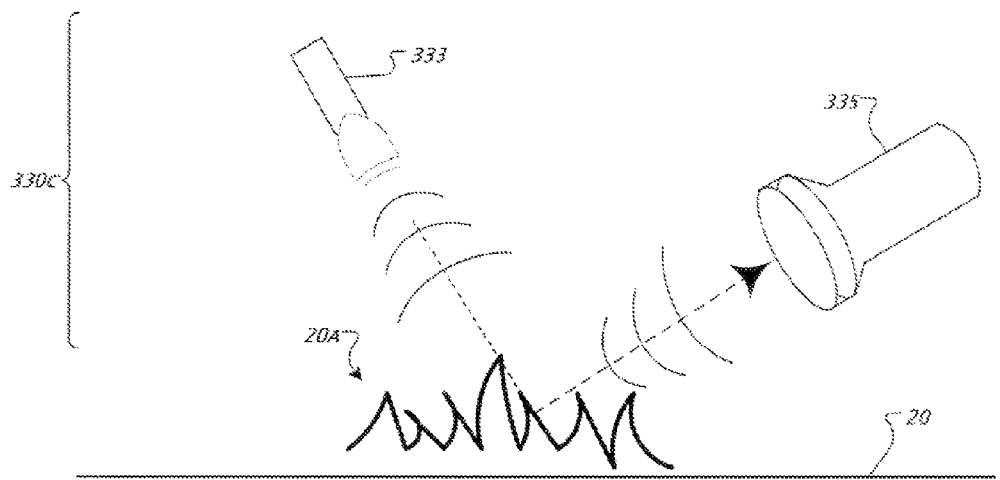
FIGS. 8C-D are schematic views of acoustic not-grass detectors.
Figure 8B:
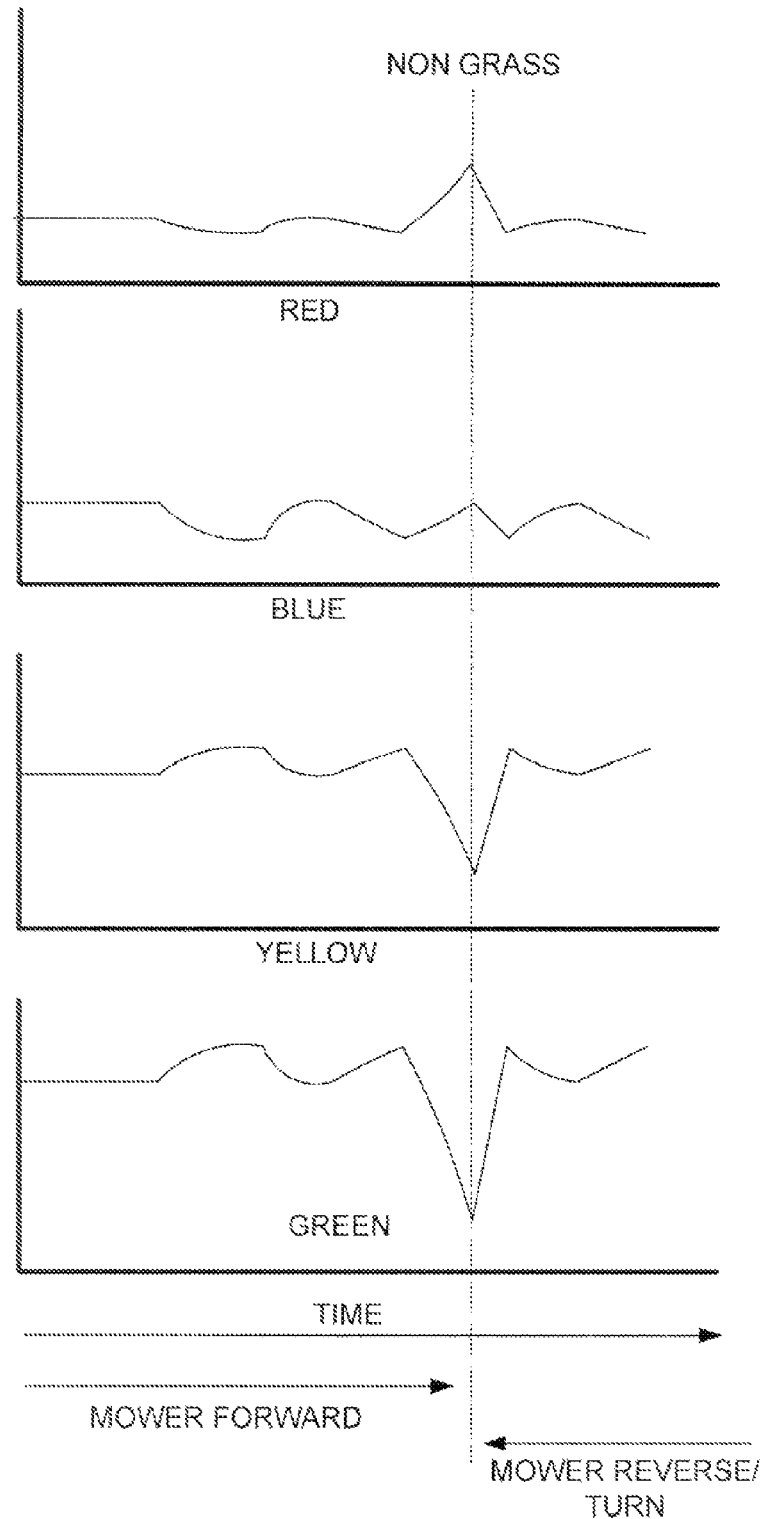
FIG. 8B is a diagram illustrating an example response of an optical not-grass detector over time.

FIG. 8B provides an example of signals from the optical sensor 334 (i.e., (literal averaged over the area 20A) in response to four wavelength emissions, showing comparatively lower responses in the blue and red wavelengths, while comparatively higher responses in the green and yellow wavelengths. As depicted, the robot 10 encounters a non-green area while moving forward and then immediately backs up. As shown, the robot 10 may have encountered something red, but the signal of interest is the non-grass signal.

In additional implementations, a not-grass detector 330B includes a plurality of light emitters 332 having different green wavelengths which are used for secondary color response tests, providing a lawn color range for further resolution. For example, the not-grass detector 330B identifies green but not the same green as cuttable lawn areas 20, 1020. A lawn color may be characterized over time as the mower robot 10 covers the cuttable lawn area 20, 1020. Near IR, or UV black light LED's may also be used for the light emitters 332 in a similar manner. Polarization of the light emitted by the light emitters 332 (e.g. linear or circular) provides additional information.

In one example, gaff-like tape bearing unobtrusive detectable particulate or stranded media (e.g. iron filings, retro reflectors, or the like) is stuck onto a hard surface 1008, such as a driveway 1008A or sidewalk 1008B, and removed, leaving the detectable media adhered to the surface 1008. The not-grass detector 330 detects the detectable media (e.g. light reflected off the detectable media).

In some implementations, the not-grass detector 330 also acts as a cliff detector, since it points down and is angled to focus on an area of interest. The absence of any signal is detection of a cliff.

Referring to FIG. 8C, in some implementations, a not-grass detector 330C includes an ultrasound or acoustic emitter 333 and a microphone or ultrasonic transducer 335 to record and measure acoustic reflections, e.g., echo attenuation, frequency shift or characteristics, to determine a grass presence grass. Hard surfaces 1008 (e.g. driveways 1008A, sidewalks 1008B, and roads 1008C) reflect sound better than grass 20, 1020.

Figure 8D:
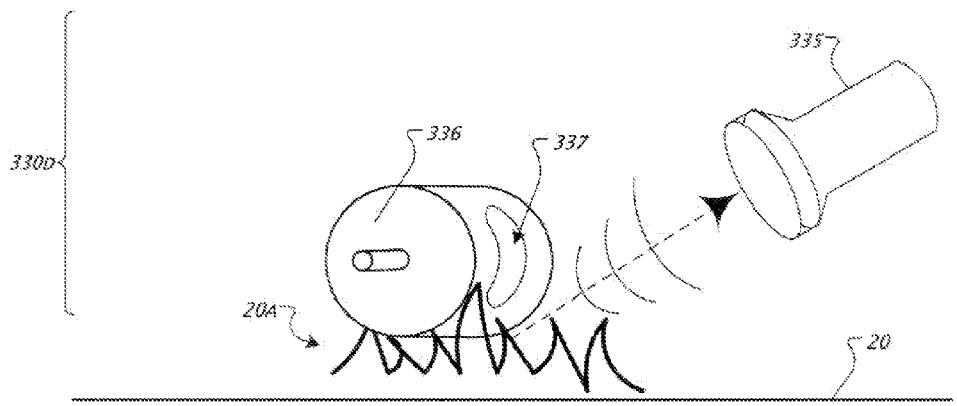

Referring to FIG. 8D, a grass sensor 330D includes a rolling idler wheel 336 (e.g. driven wheel) acoustically monitored by a microphone or piezoelectric pickup 335 for one or more characteristic frequencies, peaks, RMS amplitudes, and damping representative of non-cuttable areas 1008 (e.g. driveways 1008A, sidewalks 1008B, roads 1008C, and flowers/garden 1008D). In one example, the wheel 336 is turned in place to generate a rotational resistance characteristic of non-cuttable areas 1008. In another example, the wheel 336 defines grooves 337 (e.g., longitudinally, laterally, diagonally, or sequentially some of each) that enhance acoustic and rolling resistance information. In another example, the robot 10 includes a pH or chemical sensor bare areas of dirt or pine needles.

Figure 8E:
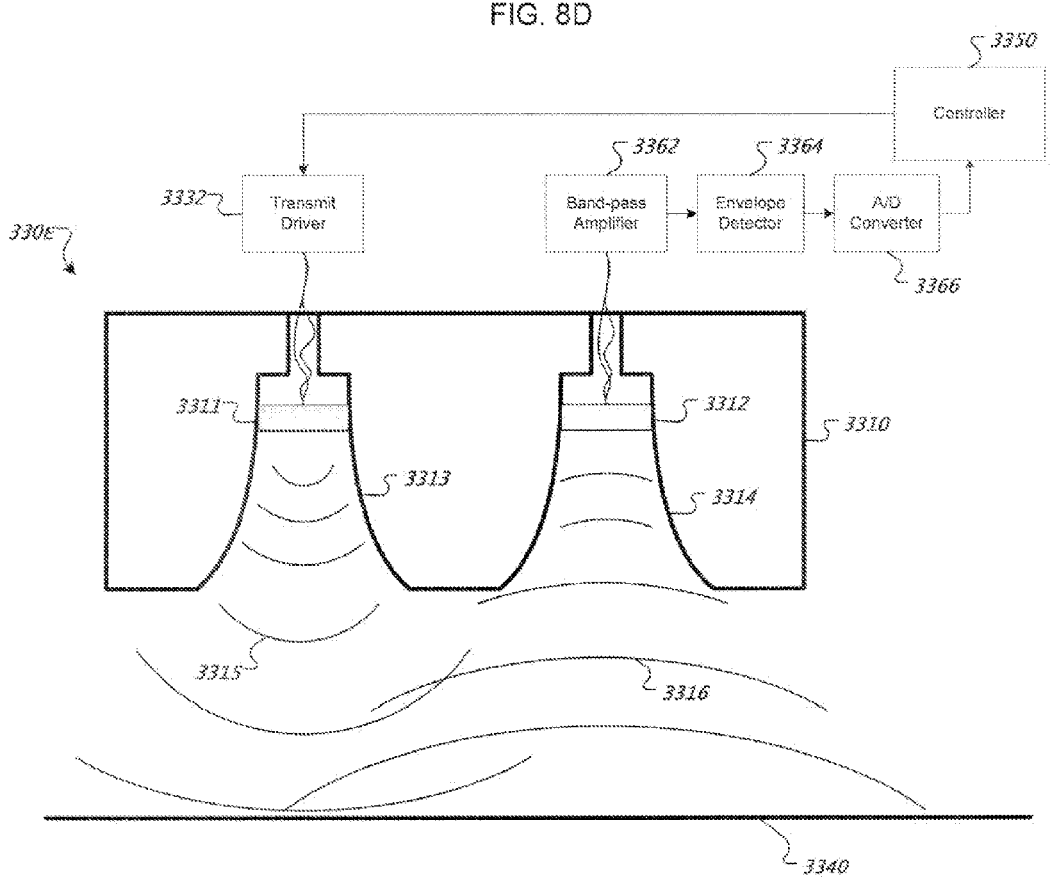
FIG. 8E is a schematic view of an acoustic hard surface detector.

Referring to FIG. 8E, the grass sensor 330, in some examples, includes an acoustic surface sensor 330E having a sensor housing 3310 defining emitter and receiver receptacles 3313 and 3314, respectively. An audio transmitter 3311 (e.g. a piezo-electric element, or moving coil and magnet assembly) is carried in the emitter receptacle 3313 and transmits an audio emission 3315 downwardly. A receiver 3312 (e.g. a piezo-electric element, or moving coil and magnet assembly) is carried in the receiver receptacle 3134 and is configured to receive a reflected audio emission 3316 off a ground surface 3340. A controller 3350 monitors a received reflected audio emission 3316 and compares a maximum receive energy with a threshold energy to classify the surface as hard or soil. The audio transmitter 3311 transmits multiple audio emissions 3315, each having successively larger wavelengths increased by half a fundamental frequency. In one example, the audio transmitter 3311 transmits a first audio emission 3315 at about 6.5 kHz (wavelength of about 52 mm) and a second audio emission 3315 at about 8.6 kHz. The step in transmission frequency between the first and second audio emissions 3315 changes the acoustic energy by a half of a wavelength of a fundamental frequency (e.g. by 26 mm). Small variations in a distance between the acoustic surface sensor 330E and a target surface 3340 may cause large variations in receive energy due primarily to constructive and destructive interference.

In some examples, a relatively narrow band-pass amplifier 3362 limits external acoustic interference for reflected audio signals 3316 received by the receiver 3312. A receive envelope detector 3364 receives a conditioned signal from the band-pass amplifier 3362. The receive envelope detector 3364 is in communication with an A/D converter 3366, which is in communication with the controller 3350.

Using an audio transmitter 3311 and receiver 3312 separate from each other shortens a minimum sensing distance relative to a single unit transmitter-receiver. A single unit transmitter-receiver (e.g. in pulse-echo mode) generally has a wait period after a transmission for ringing to attenuate before the unit 330E can listen for a reflected transmission 3316.

Figure 8F:
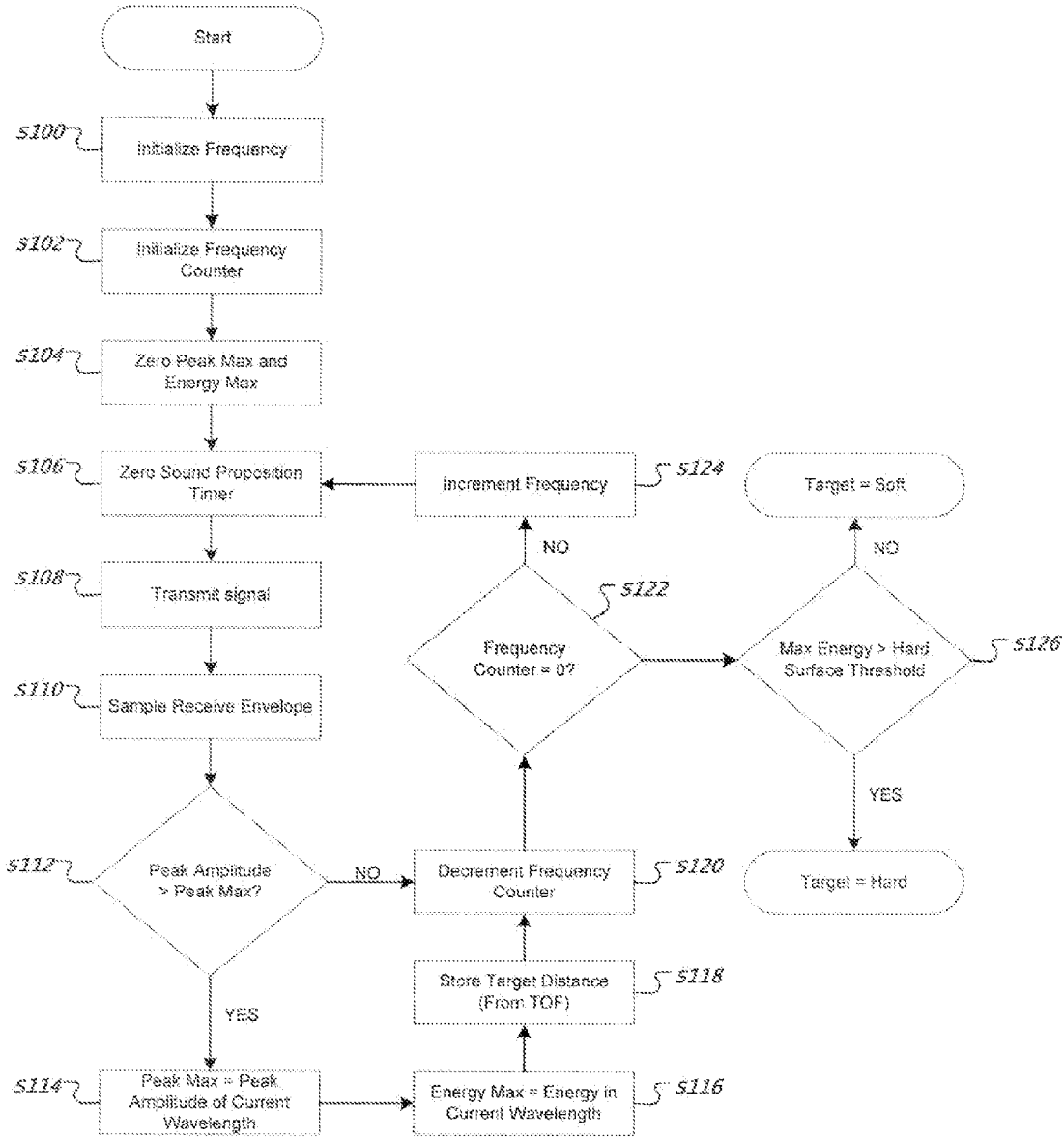
FIG. 8F is a diagram of a process of classifying a target surface with an acoustic hard surface detector.

Referring to FIG. 8F, operation of the acoustic surface sensor 330E commences by step S100 of initializing a transmission frequency, step S102 of initializing a frequency counter, and step S104 of zeroing variables for a maximum peak signal received and maximum energy received. In step S106, a sound propagation timer is zeroed. In step S108, the controller 3350 communicates with a transmit driver 3330, which communicates with the audio transmitter 3311 to generate audio emissions 3315. For each frequency step, the controller 3350, in step S110, samples an amplitude of the receive envelope detector 3364 and determines a maximum reflected energy off the target surface 3340. In step S112, if a peak amplitude of the receive envelope detector 3364 is not greater than a maximum peak signal, the acoustic surface sensor 330E proceeds to step S120, of decrementing the frequency counter. Otherwise, in step S114, the peak amplitude is stored as the peak amplitude of the current wavelength; in step S116, a maximum energy received is stored as the maximum energy received for the current wavelength; and in step S118, a determined target distance is stored. In step S122, if the frequency counter is zero, the acoustic surface sensor 330E increments the frequency in step S124 and loops back to step S106. If the frequency counter is not zero, the controller 3350, in step S126, compares a maximum receive energy with a threshold energy to classify the surface as hard or soil.

Figure 8G:
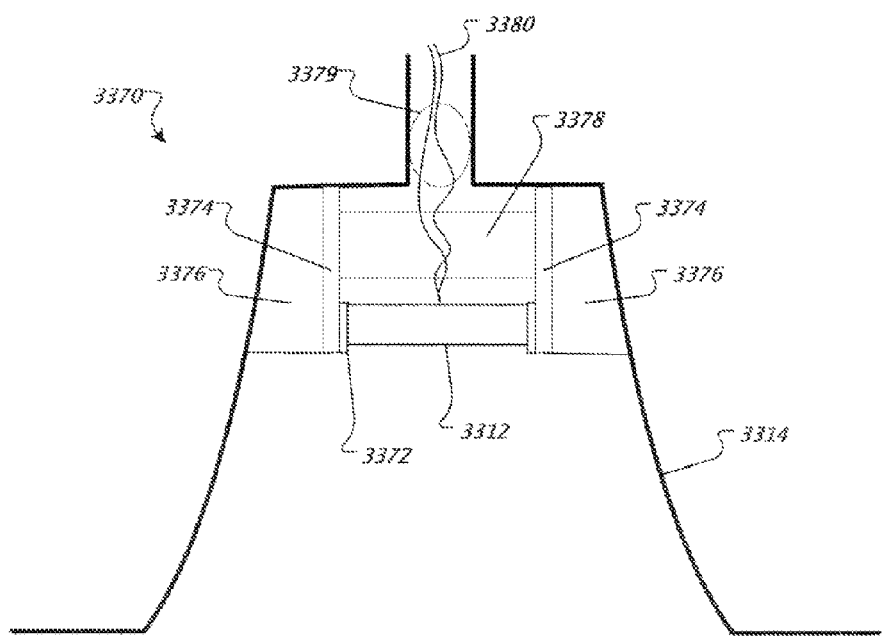
FIG. 8G is a schematic view of a mounting system for an emitter or receiver of an acoustic hard surface detector.

Referring to FIG. 8G, in some implementations, the receiver 3312 and optionally the transmitter 3311 are mounted with an anti-vibration mounting system 3370 in a manner that minimizes vibration transference from the housing 3310. In the example shown, the receiver 3312 is secured with a high durometer rubber 3372 (e.g. Shore value of 70 A by the ASTM D2240-00 testing standard) in a tube 3374. The tube 3374 is secured in the receiver receptacle 3314 with a low-durometer rubber 3376 (e.g. Shore value of 20 A by the ASTM D2240-00 testing standard). Sound absorbing foam 3378 is placed above the receiver 3312 in the tube 3374. An adhesive 3779 (e.g. epoxy) may be used to secure leads 3380 from the receiver 3312 in the receiver receptacle 3314.

Figure 9:
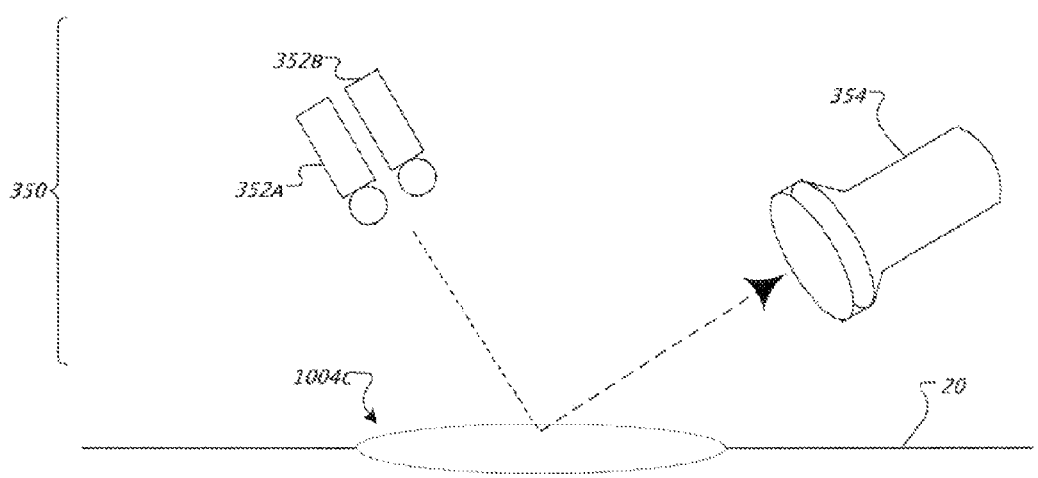
FIG. 9 is a schematic view of a liquid detector.

Referring to FIGS. 1 and 9, in some examples, the robot 10 includes a liquid detector 350 for detecting a liquid presence in its path. In one example, as shown in FIG. 1, the liquid detector 350 is positioned toward the front of the body 100 to provide detection of a liquid quagmire before the drive system 400 contacts the potential obstacle. The liquid detector 350 aids the robot 10 in avoiding inadvertently falling into a body of water 1004C (or losing traction therein). The liquid detector 350, in some instances, includes two polarized light emitters 352A and 352B, respectively, and a polarized light detector 354. The polarized light emitters 352A and 352B, respectively, emit mutually cross-polarized beams of light angled downward. The polarized light detector 354 is polarized with regard to one of the two light emitters 352A, 352B and positioned to detect whether a specular reflection has been removed from a generally quiescent surface of a liquid body 1004C (e.g. water).

In some examples, the liquid detector 350 includes a sonic sensor, like the grass sensor 330 shown in FIG. 8C, that emits a sonic signal and detects its echo. The liquid detector 350 discerns an echo characteristic of water 1004C from an echo characteristic of grass 1020 or an otherwise non-water surface. Microwave or radar echoes may be used to discern the same characteristics. In other examples, the liquid detector 350 includes a capacitive or magnetic sensor which detects a shift in capacitance or magnetic field when proximal to water 1004C.

Upon detecting a pond or other body of water 1004C with the liquid detector 350, the robot 10 performs a behavior consistent with obstacle or cliff avoidance. For example, the robot 10 alters its heading away from the detected body of water 1004C, backs up, or issues an alarm.

Referring to FIGS. 10-22, the robot 10 includes a cut edge detector 310 to determine an edge between uncut and cut grass, 22 and 24 respectively. In some implementations, cut edge sensing entails using a span of sensors 312 to recognize different grass types, growth rates, and other lawn properties. The cut edge detector 310 generally includes a span of sensors 312 extending into the uncut grass 22 to provide self-calibration or normalisation for another span of sensors 312 intended to detect the edge between uncut and cut grass, 22 and 24 respectively. The cut edge sensing techniques employed in robot 10 may include combinations of rolling the cut grass 24 in front of the edge detector 310, erecting the uncut grass 22 in front of the edge detector 310, erecting the cut grass 22 behind the wheels 410, 420, 430, 440, behaviorally interpreting the cut edge 26 to robustly and smoothly follow the cut edge 26, and disposing more than one cut edge detector 310 along the traveling length of the robotic mower 10.

Figure 10:
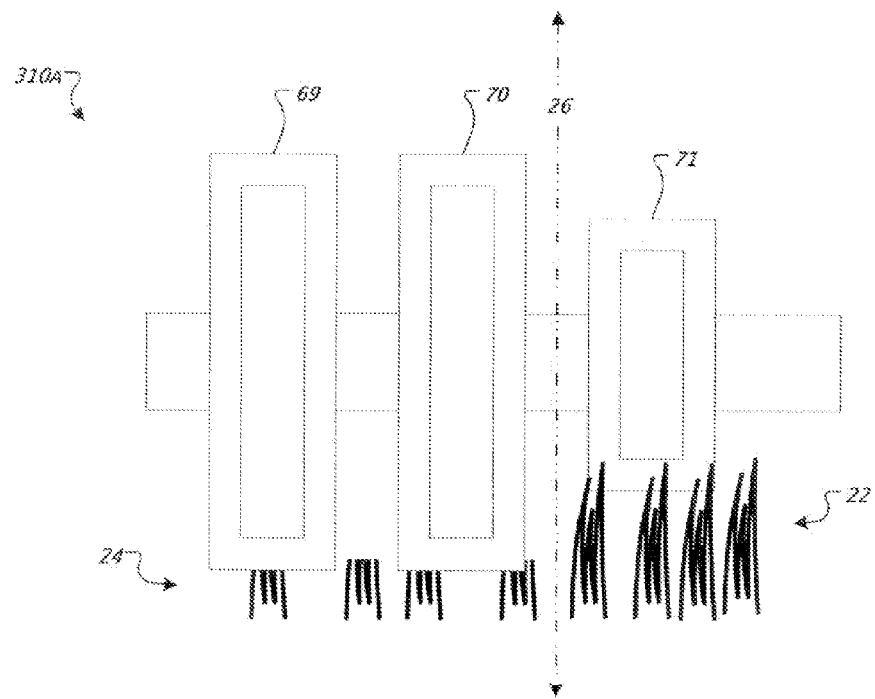
FIG. 10 is a schematic view of a cut edge detector.

Referring to FIG. 10, in some examples, the robot 10 includes an analog cut edge sensor 310A to detect the mowed regions 24 and un-mowed regions 22 of a lawn 20 to ascertain the edge 26 defined therebetween. One example an analog cut edge sensor 310A is provided in U.S. Pat. No. 4,887,415, the entire contents of which are incorporated by reference herein. The analog cut edge sensor 310A includes metallic strips 69, 70 and 71 aligned laterally, orthogonal to a forward direction of travel of the robot 10, in which two of the metallic strips 69 and 70 project downward farther than the third metallic strip 71. As the robot 10 proceeds forward while properly aligned to the cut edge 26, the two larger metallic strips 69 and 70 contact the shorter grass of the previously mowed swath 23 in the cut area 22 while the shorter metallic strip 71 contacts the taller grass of the uncut area 22. An electrical current passes from the shorter metallic strip 71 to the larger metallic strip 69 through moistened grass of the lawn 20. Generally, recently cut grass of the mowed swath 23 will release moisture sufficient to permit electrical conduction. When no current passage from metallic strip 71 to metallic strip 69 is detected, the robot 10 determines that it has strayed from alignment with the cut edge 26 and may alter its heading until the current is once again detected, for example.

Figures 11A, 11B:
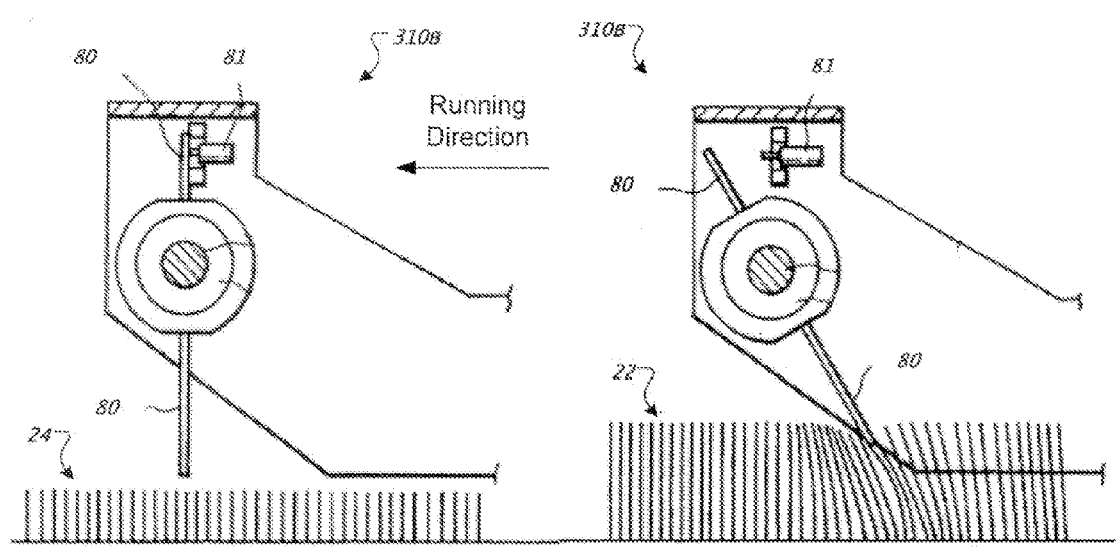
FIGS. 11A-B are schematic views of cut edge detectors.

Referring to FIGS. 11A-B, an alternative cut edge detector 310B is exemplified in U.S. Pat. No. 5,528,888 which is incorporated by reference herein in its entirety. The cut edge detector 310B may include a series of swing arms 80 that break electrical contact with a node 81 when the cut edge detector 310B is in contact with sufficiently tall grass of the uncut area 22. By positioning several swing arms 80 in a row in a comb-like fashion along a direction orthogonal to a forward direction of travel of the robot 10, the cut edge detector 310B can determine that the cut edge 26 lies between first and second adjacent swing arms 80. The first swing arm 80 hits the tall uncut grass 22 and breaks contact with the node 81, while the second swing arm 80 positioned over the shorter grass of the mowed swath 23 maintains contact with the node 81. As otherwise discussed herein, this configuration may also use a calibration portion or sensor 320 separate from the cut edge detector 310B.

Figure 24:
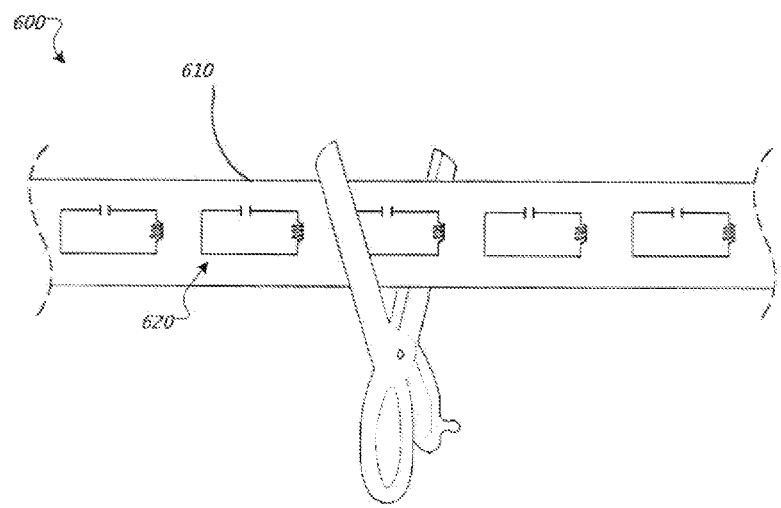
FIGS. 24-29 are schematic views of boundary responders.
Figure 25:
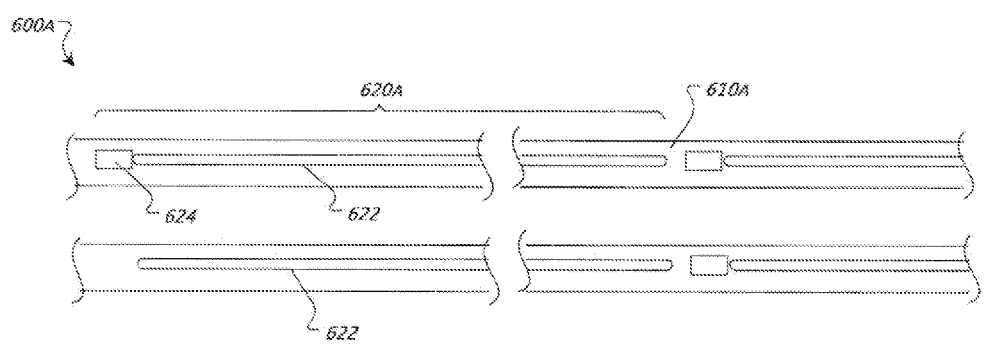
Figure 26:
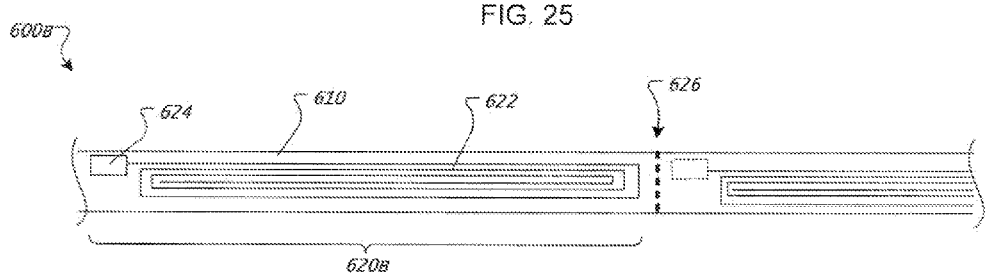

Yet another example of a cut edge defector 310 includes a polarized light emitter, reflector, and detector system, as illustrated and disclosed in FIGS. 24-26 of U.S. Pat. No. 4,133,404, which is incorporated by reference herein in its entirety.

Other example cut edge detectors 310 for detecting the difference between the cut swath 23 and the uncut region 22 so as to determine the edge 26 therebetween include, but not limited to, an acoustic or piezoelectric sensor, an optical sensor, and a mechanical or electrical sensor system.

When an analog cut edge sensor 310 is employed, a calibrator 320 may also be included to provide a reference for calibration and comparison of the analog signal produced by the analog cut edge sensor 310. In general, the calibration sensor 320 provides a reference signal against which the grass-trailing portion of the edge sensor 310 may be normalized or otherwise calibrated. In some examples, the calibration sensor 320 will trail in lawns 20 having essentially the same breed, health, height, moisture content or dryness, weed or clover content, debris/mulch content and character, stiffness, cut history, sparseness, and dumpiness (and other variability) as the lawn 20 being followed for edge sensing. The calibrator 320 may include a sensor element identical or similar to the cut edge sensor 310.

The calibrator 320 may be positioned underneath, in front of, or behind the body 100, so long as the position of the calibrator 320 relative to the body 100 is over the uncut grass area 22. The calibrator 320 (as well as the analog cut edge sensor 310, for example) may be mounted so as to minimize the chance of a damaging collision with rocks, debris, or other obstacles. In some examples, the calibrator 320 includes a rigid rock shield or hood mounted in front of the calibrator 320 to shield against collisions with debris larger than a clearance between the bottom of the rock shield and the ground 20. Preferably, the cut edge detector 310 and the calibrator 320 are flexibly or pivotally mounted and/or floating at a certain height with respect to the ground 20 (e.g. by using a coupled wheel or skid to follow the ground 20 and/or moving together with a floating cutter 200 which may also employ a wheel or skid).

In many instances, the calibration sensor 320 is the same height as the cut edge detector 310. In some examples, as shown in FIGS. 1-3, the calibrator 320 is positioned on the body 100 in a location exposed to the tall grass of the uncut area 22. Accordingly, when the calibrator 320 contacts the uncut area 22, it provides a reference signal characteristic of uncut grass 22. The robot 10 compares the signal provided from the cut edge detector 310 to the signal from the calibrator 320. In some instances, the cut edge detector 310 includes an array of sensors 312 and generates multiple signals or one signal with multiple portions corresponding to each sensor 312 or different regions of the cut edge detector 310. A signal or portion of the signal corresponding to a region of the cut edge detector 310 in contact with the uncut area 22 may substantially resemble a signal from the calibrator 320. Conversely, a signal or portion of the signal corresponding to a region of the cut edge detector 310 exposed to a previously mowed swath 23 will substantially differ from a signal from the calibrator 320. The heading of the robot 10 as it mows along the cut edge 26 is enhanced by continuously calibrating the cut edge detector 310 with the calibrator 320.

One example calibrator 320 includes one or more optical sensors. The optical calibrator 320A is a "break-beam" type sensor where a beam of infrared, visible, or other frequency of light emitted laterally toward a detector is interrupted with the presence of grass. Another example includes a capacitive or static sensor as the calibrator 320. In one instance, an electrical capacitance arising between an electrically charged conductor connected to the robot 10 and the grass of the uncut area 22 is detected. In another instance, static electricity generated by friction between the robot 10 and the tall grass of the uncut area 22 is detected. Other examples of calibrators 320 include sonar (which may be similar to the optical break-beam detector, substituting sound waves for light), acoustic (detecting noise indicative of tall grass as the robot 10 passes over it), displacement-to-magnetic, or any other sensor capable of indicating the difference between taller uncut grass 22 and shorter mowed grass 24.

In some implementations, where the optical calibrator 320A includes multiple optical sensors, the emitters and receivers of the optical sensors may include fiber optics, light pipes, multi-way reflectors and the like. In one example, a plurality of optical emitters may be replaced with a single emitter and an optical element that directs the emission in more than one direction. In another example, a plurality of optical detectors may be replaced with a single detector and an optical element that collects the emission from more than one direction. Conductive, capacitive, or electromagnetically resonant sensors may be combined, averaged, or weighted by connecting them to a conductive element or antenna. These sensors may use one sensor to collect signals from more than one location or direction. Multiple contact sensors responsive to vibration, such as microphones and piezoelectric elements, may be replaced by one or more members that conduct vibration to the sensor, and these also may use only one sensor to collect signals from more than one location or direction.

In some examples, high or distinctive frequencies of signals provided from the cut edge detector 310 and the calibrator 320 (e.g. optical, camera, vibration, acoustic, or other signal discussed herein) are processed or subject to transforms suitable for frequency domain analysis to characterize meaningful frequencies and to remove meaningless frequencies. For example, acoustic signals may be processed to remove or ignore both cyclic components and low frequency noise from motors, wheels, bearings, and/or cutters and identify "white noise" in the frequency range expected for blades of grass striking the detectors during forward movement of the robot 10. Low-pixel camera, optical, and other signals may be processed similarly.

In some implementations, the type of sensor employed in the cut edge detector 310 and calibrator 330 are the same, in order to simplify the comparison of the calibration signal to the cut edge detector signal. However, these sensors 310, 320 may be different and signal comparison is facilitated by normalization or conditioning of one or both of the signals.

Following an edge smoothly is somewhat analogous to following a wall smoothly. Once an appropriately conditioned signal is obtained, the robot 10 may perform signal interpretation and analysis and obstacle following algorithms, as disclosed in U.S. patent application Ser. Nos. 11/166,986, by Casey et al., filed Jun. 24, 2005 and titled OBSTACLE FOLLOWING SENSOR SCHEME FOR A MOBILE ROBOT, as well as U.S. Pat. No. 6,304,844; U.S. patent application Ser. Nos. 10/453,202; 09/768,773; and U.S. Provisional Application Nos. 60/582,992 and 60/177, 703, all of which are incorporated by reference herein in their entireties. In this case, the "obstacle" or wall is the cut edge 26. In addition to the edge following algorithm, in some examples, the robot 10 includes algorithms for determining or estimating the end of a row/swath 23 and turning to establish a new row while depending on the cut edge 26.

Figure 12:
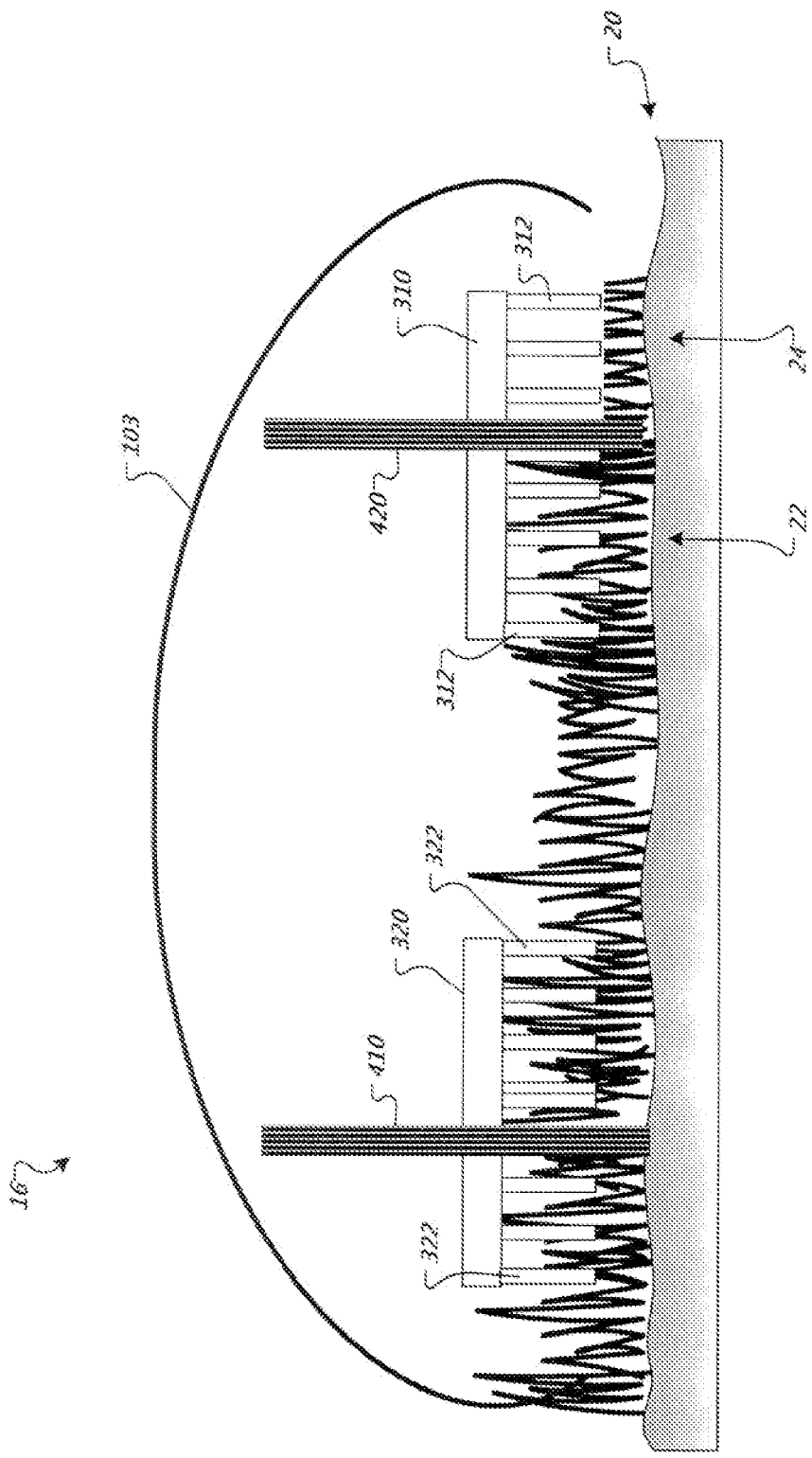
FIG. 12 is a rear schematic view of a lawn care robot having a cut edge detector and a calibrator.

FIG. 12 shows a rear schematic view of an example of a robot 10 including wheels 410, 420, a body 103, a cut edge detector 310, and a calibrator sensor array 320. The cut edge detector 310 and the calibrator sensor array 320 each include a plurality or span of sensors, 312 and 322 respectively, projecting into the lawn 20. The sensors 312 of the cut edge detector 310 project into the cut edge path 26. In several instances, some of the sensors 312, 322 may detect grass and some or all are positioned with respect to a cutting height (e.g. height of the cutter 200 and cutting blades) so that they do not detect cut grass 24. The signals from multiple sensors 312 and 322 may be combined, averaged, filtered to provide one or more simple grass no grass signals in digital form, or encoded (n bits of left-to-right grass/no-grass distribution).

Example arrangements of the plurality or span of sensors, 312, 322 include lateral spans, front-to-back sets, and diagonal spans. Different arrangements provide different advantages in detecting grass and collecting averaged or cumulative data.

Figure 13:
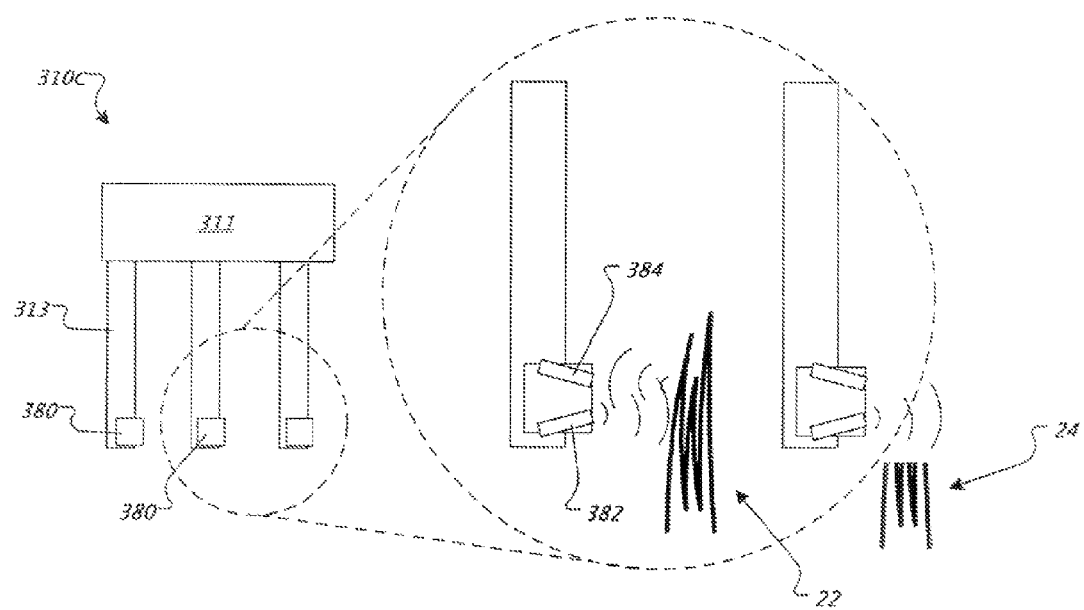
FIG. 13 is a schematic view of a cut edge detector.

Referring to FIG. 13, in some implementations, the robot 10 includes a cut edge detector 310C having light sensors 380 mounted on struts 313 extending from a sensor mount 311. The light sensor 380 includes an IR or visible light emitter 382 coupled with a receiver 384. In some example, the emitter 382 and receiver 384 are angled toward an area of interest/ distance of interest. The emitter 382 may be stepped up in power until reflected illumination is detected by the receiver 384. Time of flight and/or phase measurements may be used to detect grass 20 in the area of interest. An active acoustic emitter and receiver may be used in a similar way, in addition detection echoes or the attenuation of echoes over time.

Figure 14:
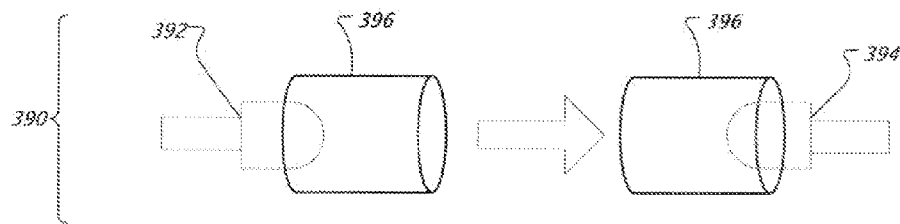
FIG. 14 is a schematic view of an optical sensor.

FIG. 14 shows an infrared (IR) sensor 390 including a light emitting diode (LED) 392 and phototransistor 394 pointed at and mounted opposite each other. Each is shielded from stray light by short black tubes 396 (e.g. heat-shrink tubing of about ⅛" i.d.). Light reaching the phototransistor 394 from the LED 392 is measured by synchronous detection, using cliff-sensor technology as discussed herein. This system can detect single or multiple grass blades with a vertical resolution of about ¼ inches. LED power levels, distance between IR emitter 392 and detector 394, and diameter and length of the optical tubes 396 are all parameters that can be varied.

Figure 15A:
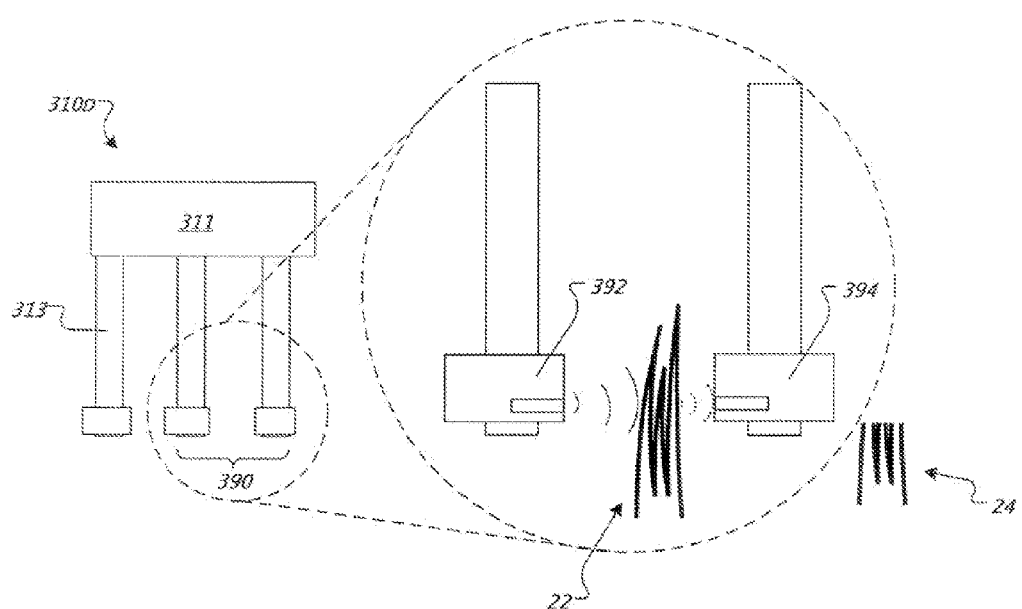
FIG. 15A is a schematic view of a cut edge detector.

Referring to FIG. 15A, in some implementations, the robot 10 includes a cut edge detector 310D having emissive sensors 390 mounted on struts 313 extending from a sensor mount 311. The emissive sensors 390 include an IR or visible light emitter 392 and receiver 394 positioned and aligned with each other such that an emission passes through an area or distance of interest. The receiver 394 may be configured to detect a partial or full obstruction. Time of flight or phase measurements may be used to detect grass in an area of interest. An active acoustic emitter and receiver may be used in a similar way.

Figure 15B:
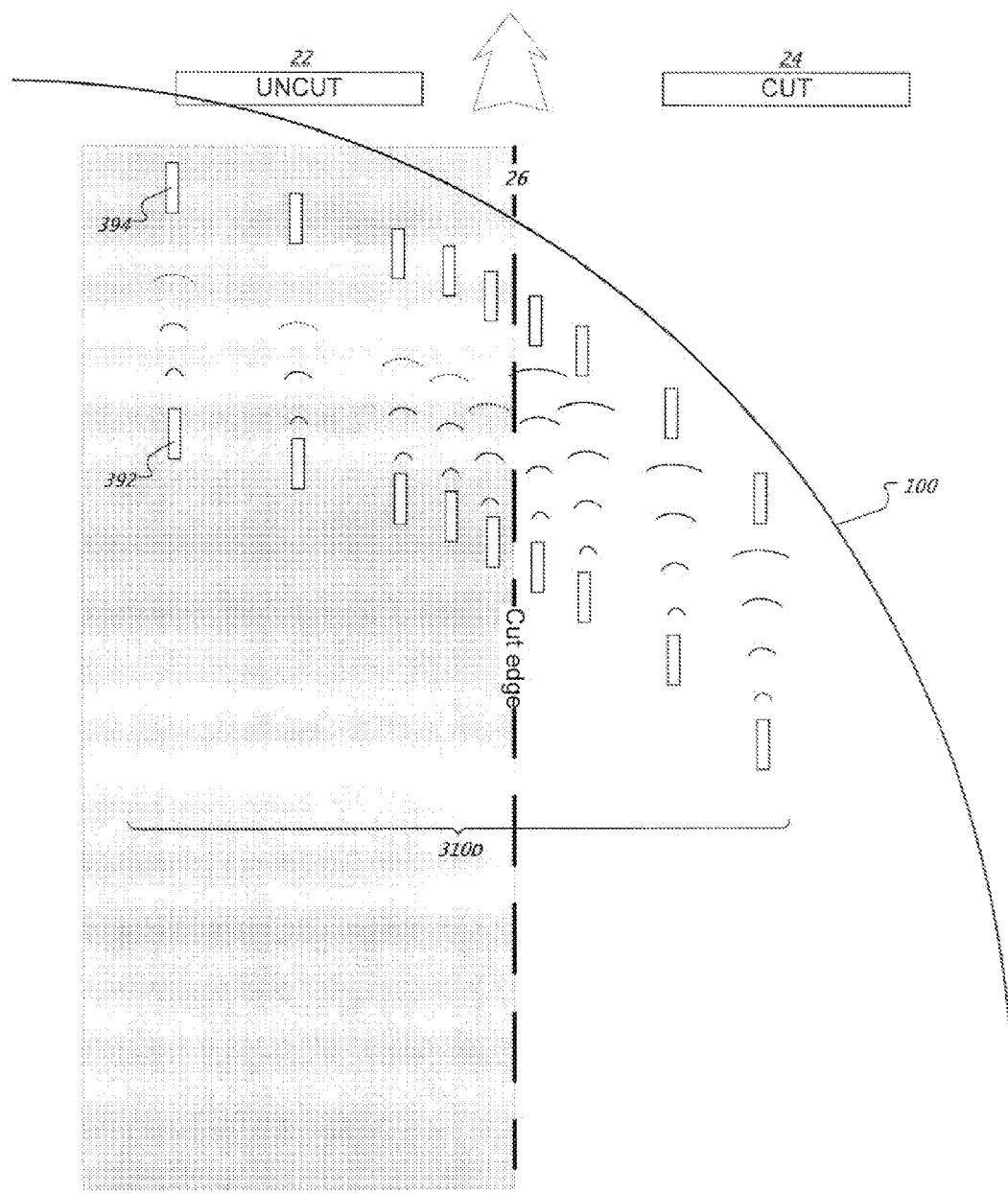
FIG. 15B is a top schematic view of a lawn care robot.

Referring to FIG. 15B, in some implementations, the robot 10 includes a cut edge detector 310D having one or more front-to-back emitter-receiver sensor pairs 390. In some instances, several emitter-receiver sensor pairs 390 arranged with a detection axis in a forward direction detect more grass than if arranged transverse to the forward direction. Each emitter-receiver sensor pair 390 may provide one bit or several bits. Multiple front-to-back sensor pairs 390 form a lateral array spanning the cut edge 26 to provide a signal for following the cut edge 26.

In some implementations, each sensor 312, 322 or sensor array 310, 320 is arranged to rotate back or fold up and return when the mower robot 10 encounters obstructions or obstacles at the height of the cutter 200 or above. In some instances, the mower robot 10 stops the cutter 200 from cutting when an obstruction has caused the sensor array 310, 320 to flip or rotate upward.

Referring to FIG. 16A, in some implementations, the robot 10 includes a cut edge detector 310D having a sensor housing 3910 defining a cavity 3930 and a cavity opening 3932 configured to allow grass 22 entry while inhibiting direct sunlight 3990 into the cavity 3930. The cavity 3930 may be colored a light absorbing color (e.g. black) or made of a light absorbing material. Grass 20 is inherently springy and may pop-up alter deflection. The sensor housing 3910 is mounted to deflect uncut grass 22, while passing over uncut grass 24, as the robot 10 maneuvers across the lawn 20. The sensor housing 3910 allows the deflected uncut grass 22 to self-straighten upward through the cavity opening 3932 and into the cavity 3930. In some examples, the sensor housing 3910 is mounted to the body 100 at height relative to a ground surface that minimizes entrance of cut grass 24 the cavity 3930. An emitter-receiver sensor pair 3900, in communication with the controller 3350, is carried by the housing 3910 and includes an IR or visible light emitter 3920 and receiver 3940 (e.g. photon detector). The emitter 3920 is positioned inside the cavity 3930 and configured to emit an emission 3922A across the cavity opening 3932. The receiver 3940 is positioned below the emitter 3920 and configured to receive a grass reflected emission 3922B, while not receiving any direct sunlight 3990. The receiver 3940 has a defined field of view that intersects a field of emission across the cavity opening 3932. In preferred examples, the emitter-receiver sensor pair 3900 is arranged so that grass 20 below a certain height substantially does not reflect emissions 3922 back to the receiver 3940.

Figure 16B:
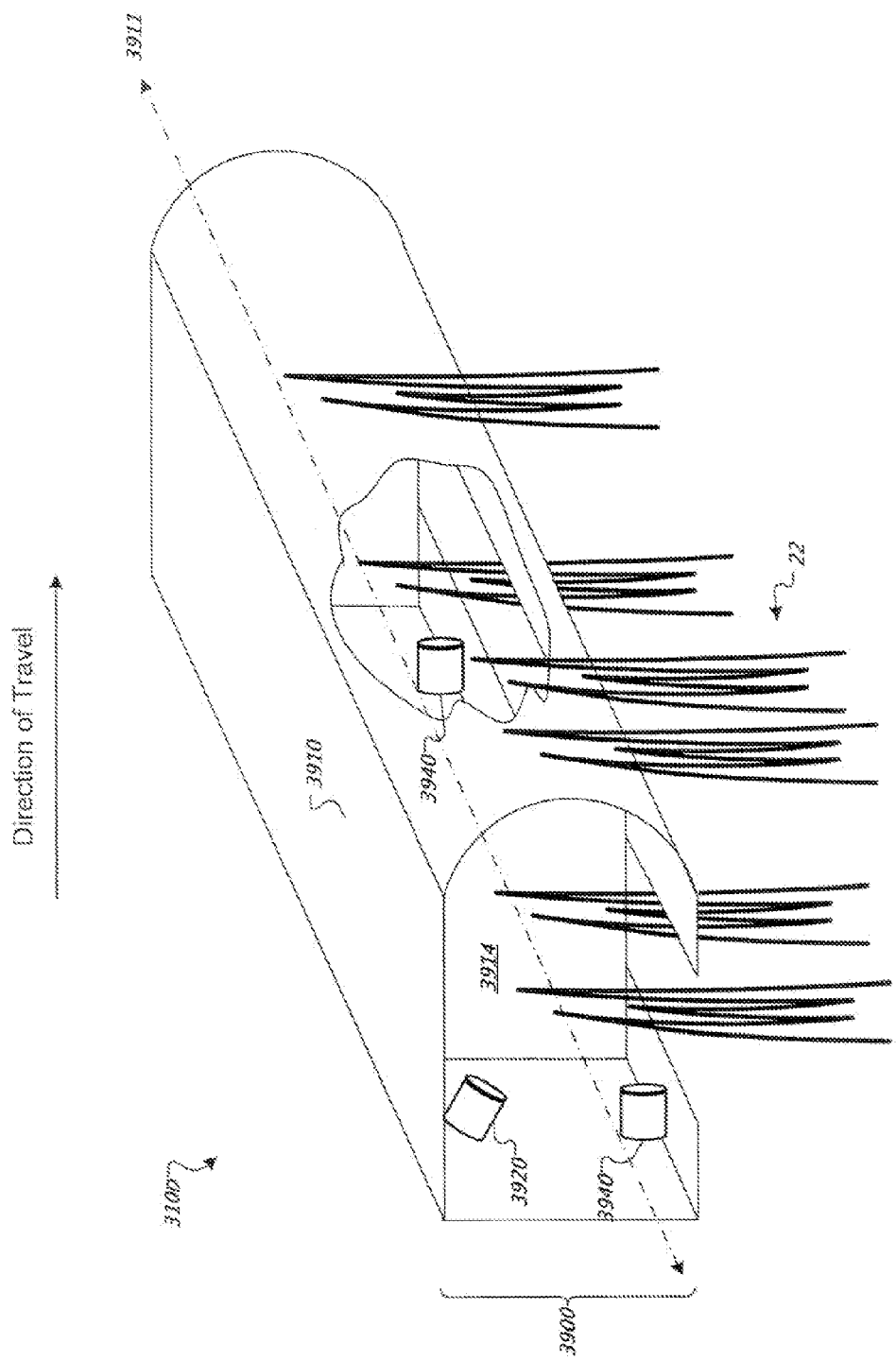
Figure 16C:
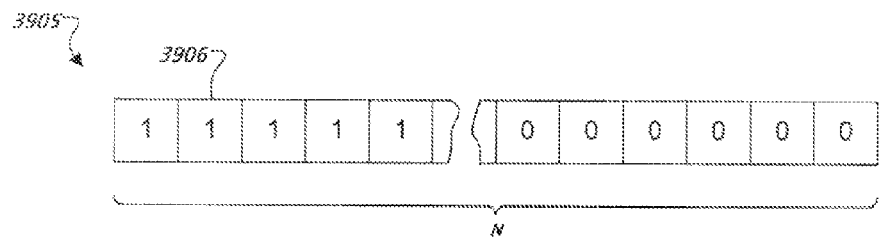
FIG. 16C is a schematic view of a grass height row vector.

Referring to FIGS. 16B-C, in some implementations, the sensor housing 3910 is configured to carry an array of emitter-receiver sensor pairs 3900 (also referred to as grass height sensors) equally spaced apart and in communication with the controller 3350. The sensor housing 3910 may be linear along a longitudinal axis 3911 defined by the horsing 3910 or curved and located on a forward portion of the body 100. In some examples, dividers 3914 separate each emitter-receiver sensor pair 3900. The array of grass height sensors 3900 may span the entire width or only a portion of the width of the body 100. In some examples, a portion of the array of grass height sensors 3900 is used for the calibrator 320. For example, one half of the array of grass height sensors 3900 provides edge detection, while the other half provides calibration. As the robot 10 travels forward, grass height estimates are acquired by the grass height sensors 3900 based on signal strength of the receiver 3940 from reflected emissions 3922B. One example of measuring signal strength is turning the emitter 3920 off, measuring a first signal strength of the receiver 3940, turning emitter 3920 on, measuring a second signal strength of the receiver 3940, and obtaining a difference between the first and second signal strengths. The resulting difference in signal strengths is used for the sensor measurement (grass height signal) and generally has lower signal-to-noise ratios. A grass height signal obtained by each grass height sensor 3900 is compared by the controller 3350 to a threshold value, above which grass is considered uncut and below which grass is considered cut, and stored as binary decisions in a grass height row vector 3905, as shown in FIG. 16C. Periodically, the controller 3350 compares the grass height row vector 3905 to previously stored exemplar row vectors 3905B representative of ideal grass edge measurements at each sensor pair array position 3906 to determine a location of the cut edge 26 along the sensor array. With N number of grass height sensors 3900 in the array, there are (N−1) possible edge positions each having a stored exemplar row vector 3905B plus "no grass" and "all grass" stored exemplar row vectors 3905B. The controller 3350 selects the exemplar row vector 3905B (and corresponding grass edge array position) having the minimum number of differences (element by element) with the compared grass height row vector 3905 to determine the location of the cut edge 26 along the sensor array 310D and therefore a cut edge position 26 under the body 100. The number of differences with the selected exemplar row vector 3905B is called the "grass edge clarity". The cut edge position and grass edge clarity may be used to influence the drive system 400 to create a grass edge following behavior.

The following example grass height vector Vx was acquired from an array of eight sensors 3900. Vx=[0 1 0 0 1 1 1 0]

Table 1 below provides exemplar grass height vectors 3905B and respective edge positions for an eight sensor array.

TABLE 1

| Exemplar Grass Height Vectors | Edge position |
|---|---|
| [00000000] | 0 - no grass |
| [00000001] | 1 |
| [00000011] | 2 |
| [00000111] | 3 |
| [00001111] | 4 |
| [00011111] | 5 |
| [00111111] | 6 |
| [01111111] | 7 |
| [11111111] | 8 - all grass |

Table 2 below provides the number of differences between the example grass height vector Vx and each exemplar grass height vector 3905B.

TABLE 2

| Exemplar Grass Height Vectors | Difference with $V_x$ (Edge Clarity) |
|---|---|
| [00000000] | 4 |
| [00000001] | 5 |
| [00000011] | 4 |
| [00000111] | 3 |
| [00001111] | 2 |
| [00011111] | 3 |
| [00111111] | 4 |
| [01111111] | 3 |
| [11111111] | 4 |

In the example above, the controller 3350 selects the exemplar row vector [0 0 0 0 1 1 1 1] (and corresponding grass edge array position of 4) as having the minimum number of differences (element by element) with the compared grass height row vector Vx. The fourth grass edge array position from a total of eight sensors 3390 is approximately the center of the detector 310D.

Figure 16D:
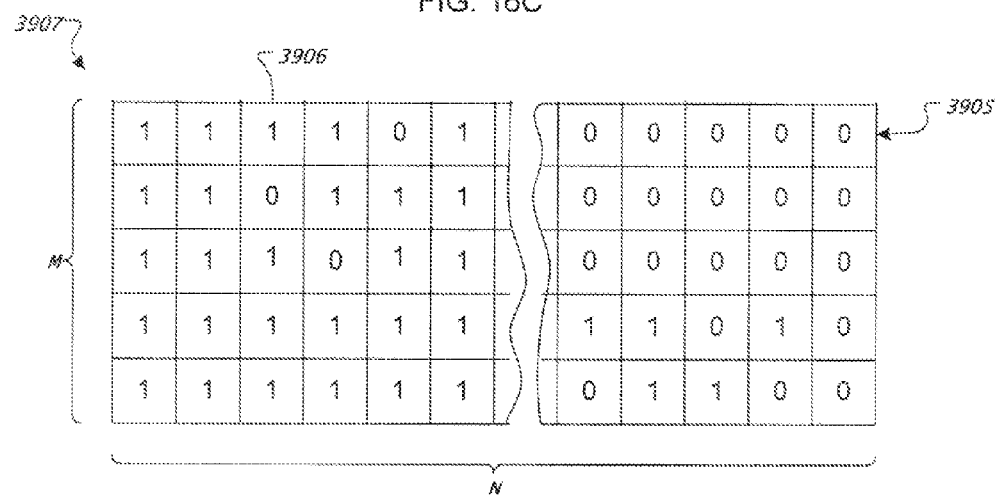
FIG. 16D is a schematic view of a two-dimensional grass height row vector array.

Referring to FIG. 16D, in some implementations, the use of a one dimensional vector 3905 for estimating a cut edge position and grass edge clarity is extended to a two dimensional model 3907 (e.g. a two-dimensional array) having a sliding window of M row vectors 3905 representing successive binary readings of the N grass height sensors 3900. The number of row vectors 3905, M, included in the two dimensional array 3907 depends on the frequency of measurements made over a distance, X, traveled by the robot 10 in a period of time, T. In one example, the sensors 3900 measure grass height at a frequency of 512 Hz. A summation of differences between exemplar row vectors 3905B and measured grass height row vectors 3905 is performed in the same manner described above, except on a row by row basis. The results of the compared rows may be averaged. In some examples, column data is summarized into a single summary row vector, where a row element 3906 is designated as "uncut" (e.g. by a corresponding 0 or 1) if any of the elements in that column contained an "uncut" designation.

Figure 16E:
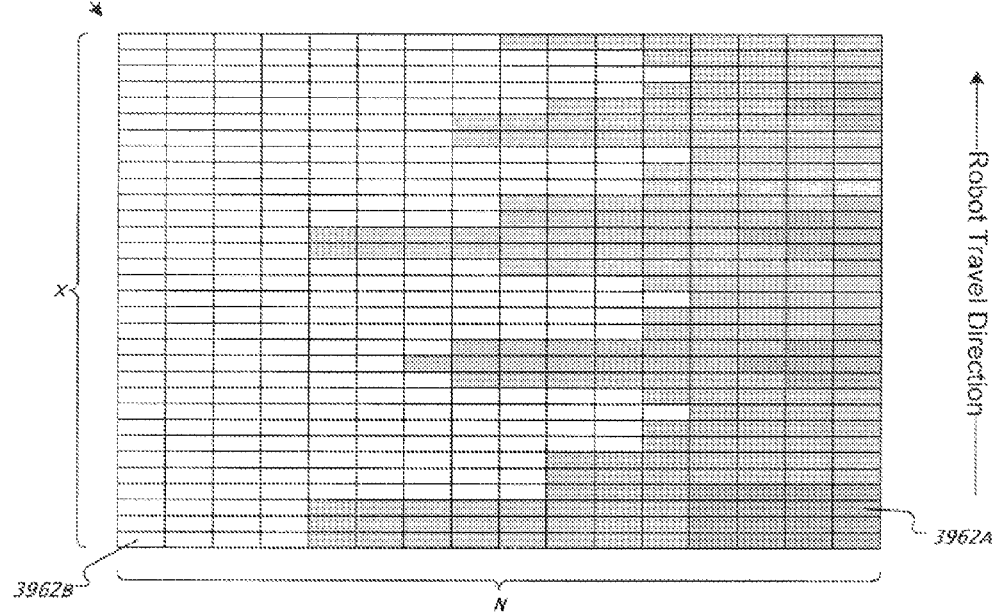
FIG. 16E is a schematic view of a grass height image from a cut edge defector.

Referring to FIG. 16E, in some implementations, a peak grass height signal 3962 is determined for each sensor 3900 or a combination of sensors 3900 by combining grass height results from adjacent sensors 3900 (e.g. of 1-2 adjacent sensors 3900 on one or both sides of the sensor 3900). The controller 3350 compares the peak grass height signals 3962 against stored threshold values, as described earlier, to determine if the grass is cut or uncut. In one example, the array of grass height sensors 3900 is divided into pairs of adjacent sensors 3900 and a peak grass height signal 3962 is determined for each pair of adjacent sensors 3900. A grass height image 3960, as shown in FIG. 16E, is created depicting the peak grass height signals of the grass height sensors 3900 or combinations of sensors 3900. The horizontal axis of the image represents the array of N grass height sensors 3900 and the vertical axis represents the number of measurements made within window of travel, X, by the robot within a period of time, T. Depending on the method of obtaining the peak grass height signals 3962, each pixel 3964 may represent a peak (or avenge) value for a combination of sensors 3900 or only one sensor 3900 over a period of time. The pixel 3964 may have a color and/or intensity proportional to grass height signal strength. The controller 3350 compares an array of pixels (e.g. 4 pixels wide by 1 pixel high or 16 pixels wide by 16 pixels high) with one or more stored reference patterns (of the same array size) of different possible edge configurations. Different criteria may be employed in matching reference patterns with sample arrays to determine the location of the cut edge 26. With pattern matching, the controller 3350 can determine the orientation of the cut edge 26 with respect to the robot 10. For example, while searching for a cut edge 26 to follow, the robot 10 can determine an approach angle when encountering a cut edge 26 based on the orientation of the orientation of the cut edge 26 with respect to the robot 10. In the example shown in FIG. 16E, the darker pixels 3964A represent weaker the peak grass height signals 3962 characteristic of cut grass 24 and the lighter pixels 3964B represent stronger the peak grass height signals 3962 characteristic of uncut grass 22. The boundary between the lighter and darker pixels 3962 provides the estimated location of the cut edge 26. In this particular example, the robot 10, while executing an edge following behavior, mannered left and right to follow the cut edge 26, hence the vertical zig-zag appearance. As an energy saving technique, the robot 10 may turn off the cutters 200 to save power while detecting all cut grass 24 and then turn the cutters 200 on again once uncut grass 22 is detected.

The drive system 400 maneuvers the robot 10 while keeping the grass edge 26 centered in the array of grass height sensors 3900 of the cut edge detector 310D. In one implementation, the drive system 400, configured as a differential drive and at least one passive front caster, in one example, uses the determined grass edge 26 to steer the robot 10 by selecting a turn radius. The further left the determined grass edge 26 is of the center of the array of grass height sensors 3900, the shorter left turning radius selected by the drive system 400. The further right the determined grass edge 26 is of the center of the array of grass height sensors 3900, the shorter the right turning radius selected by the drive system 400. The turn radius is proportional to an error in edge placement (i.e. location of the cut edge 26 with respect to the center of the robot 10.) In another implementation, when the determined grass edge 26 is left or tight of the center of the array of grass height sensors 3900, the drive system 400 turns the robot 10 left or right, respectively, as sharply as possible while keeping both left and right drive wheels 410 and 420, respectively, moving forward. The drive system 400 drives the robot 10 straight when the determined grass edge 26 is centered on the array of grass height sensors 3900.

Several robotic behaviors are employed to achieve mowing coverage of the lawn 20. In some implementations, the behaviors are executed serially (versus concurrently). The highest priority behavior is a perimeter following behavior. While creating the perimeter following behavior, the robot 10 follows a perimeter through bump sensing or the use of confinement devices (e.g. boundary responders 600). This tends to create cut-grass edges 26 around obstacles and property perimeters that can later be followed using a cut edge following behavior. The next highest priority behavior is cut edge following. The cut edge following behavior uses the grass edge position as estimated by the grass edge sensor array 310D to control the heading of the robot 10. The grass edge following behavior creates a new cut edge 26 behind the robot 10 that closely matches the contour of the edge 26 it was following. The next highest priority behavior is a tall grass turn behavior, which is executed after the robot 10 detects all uncut grass as estimated by the grass sensor array 310D for a predetermined amount of time, such as five seconds. Using only dead reckoning, the robot 10 performs a tight turn to bring the grass edge sensor array 310D back into the grass edge 26 just cut by the robot mower 10. The robot 10 may maintain a history of the cut edge sensing to allow approximations of the location of the last detected at edge 26. The robot 10 may also drive in a random direction or pattern (e.g. spiral) to find a cut edge 26. The tall grass turn behavior is designed to avoid fragmentation of the lawn 20 into many islands of uncut grass 22 that need to be found through random traverses rather than through methodical cutting by following a grass edge 26.

Figure 17:
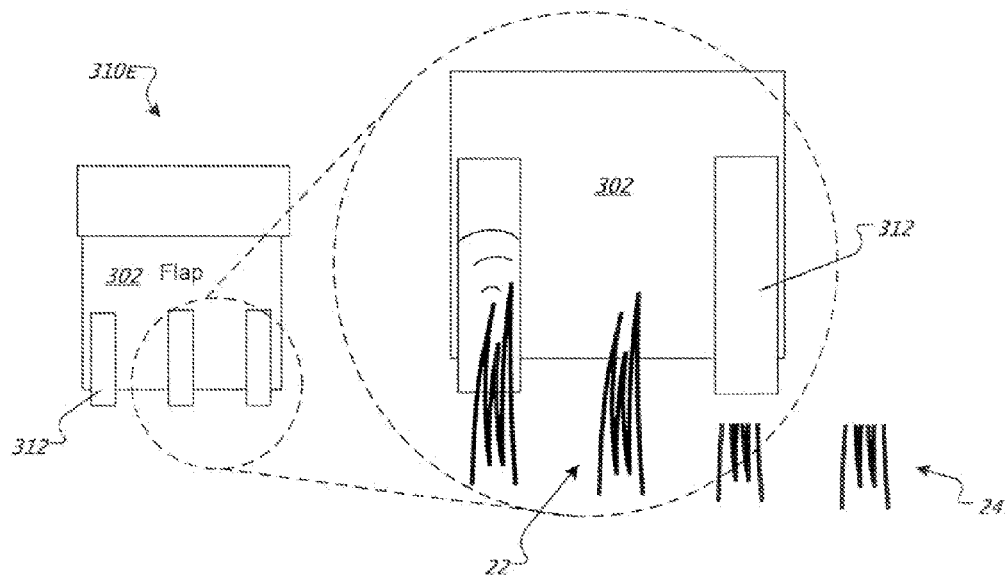
FIGS. 17-19 are schematic views of cut edge detectors.

Referring to FIG. 17, in some implementations, the robot 10 includes a cut edge detector 310F having a flap 302 of sufficiently flexible material to which the sensors 312, 322 are secured. The sensors 312, 322 move together with the flap 302 when an obstruction is encountered. The sensors 312, 322 are arranged to precede the cutting head 200 in a direction of mower robot 10 at a height at or near the cutting height. In some examples, the sensors 312, 322 include microphones (alone or attached to strips of material), piezoelectric transducers, conductors, capacitors, or excited transducers with damped or interfered wavelengths. Each detector or transducer 312, 322 is arranged such that a disturbance by contact with a blade or clump of grass is detectable (by movement, vibration, bending, conductivity, capacitance). The detectors 312, 322 may be isolated from the supporting continuous flap 302 or able to detect disturbances of the flap 302 (which may provide an averaged signal). In some cases, only a protruding tip of the detector 312, 322 may be sensitive (e.g., for piezoelectric material excited by bending).

Figure 18:
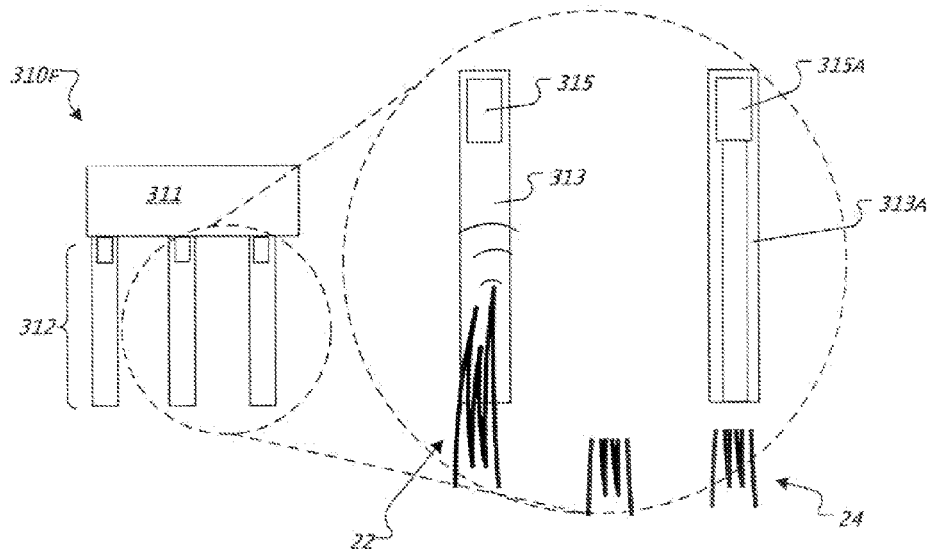

Referring to FIG. 18, in some implementations, the robot 10 includes a cut edge detector 310F having multiple sensors 312 extending downward from a sensor mount 311 and including a vibration (or signal) sensor 315 mounted to a sensor probe 313 (i.e. signal or vibration conductors). The sensors 312 are arranged such that a disturbance by contact with a blade or clump of grass is detectable (by movement, vibration, bending, conductivity, capacitance). The flexibility and/or drape of the probes 313 may be similar to string, chain, bristles, or stiff pins, and may be selected to dampen, attenuate or filter vibrations detrimental to the detection of uncut grass 22. The length of the probe 313 serves to transmit the vibration or signal to the signal sensor 315, and in some cases, to attenuate, damp, or filter the signal or vibration. In one example, a piezoelectric strip sensor 312A includes a strip of thin piezo film 315A deposited on a Mylar substrate 313A (or individual strips mounted to individual struts 313). The sensor 312A is mounted to allow deflection by blades of grass, or deflection by a moving finger in contact with the blades of grass. The sensor 312A produces a voltage output when mechanically deflected that is proportional to the amount and rate-of-change of deflection. The sensor output may be subject to signal filtering and amplification.

Alternatively, a lightweight detector member may be rotatably mounted to a potentiometer, ball sensor, mechanical switch, or optical encoder (reflective or transmissive photo-interrupter) that measures detector member rotation from encountered grass in an amount proportional to grass density, height, thickness, etc.

Figure 19:
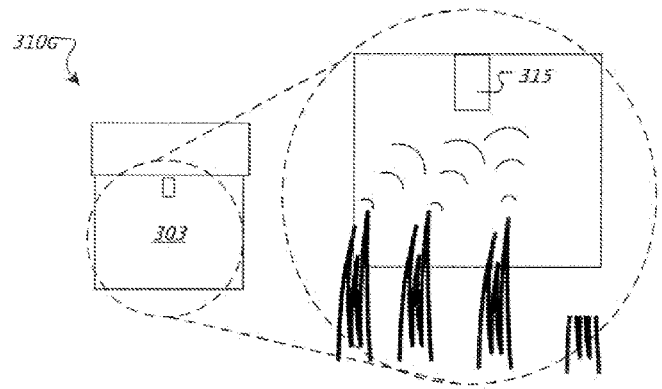

Referring to FIG. 19, in some implementations, the robot 10 includes a cut edge detector 310G having a vibration (or signal) sensor 315 mounted on a continuous contact flap 303. The flexibility of the flap 303 may be similar to a thin plastic sheet, metal foil, or sheet metal, and may be selected to dampen, attenuate or filter vibrations detrimental to the detection of uncut grass 22 as well as to average multiple signals conducted by the flap 303. Examples of the vibration (or signal) sensor 315 include a microphone, a piezoelectric transducer, a conductive sensor, a capacitive sensor, and an exciting transducer. Resonating or standing waves geminated by the flap 303 may be dampened or subject to interference with the exciting transducer separate from a detection transducer. The vibration (or signal) sensor 315 is configured to detect flap disturbances by movement, vibration, bending, conductivity, capacitance, etc. (e.g. from contact with a series of blades or clumps of grass). The edge sensor configuration shown in FIG. 18 captures contacts across the width of the flap 303.

Figure 20:
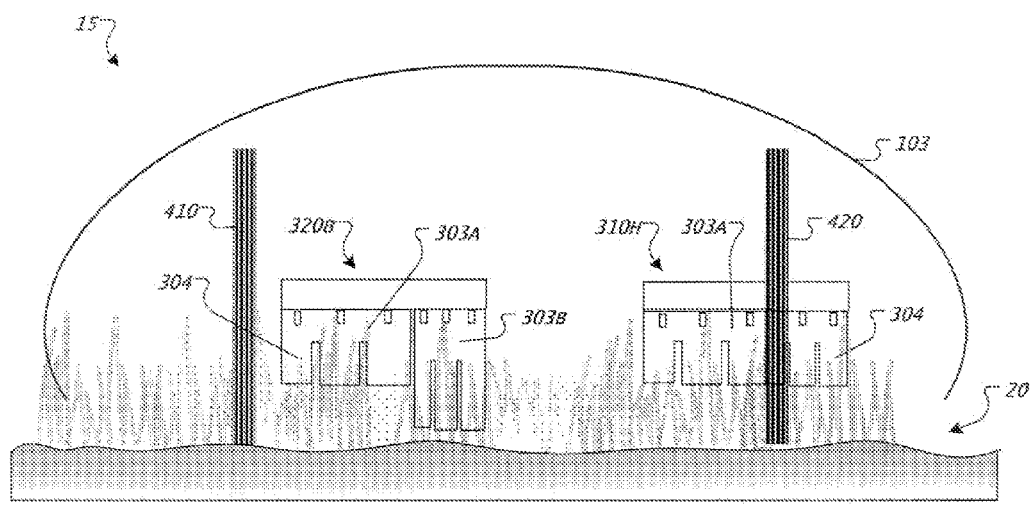
FIG. 20 is a rear schematic view of a lawn care robot having a cut edge detector and a calibrator.

Referring to FIG. 20, in some implementations, the robot 10 includes a cut edge defector 310H and calibrator 320B carried by the body 103. The cut edge detector 310H is a crenellated flap 303A with separate flap portions 304 providing either separation or flexibility to isolate, dampen, attenuate or filter vibrations or other conducted signals detrimental to the detection of uncut grass 22. The separate calibration array 320B trailing in the uncut grass 22 provides a signal for normalizing or continuously calibrating a grass detection signal provided by the cut edge detector 310H in the example illustrated, the calibrator 320B includes a first crenellated flap 303A and a second relatively longer crenellated flap 303B. The second relatively longer crenellated flap 303B detects a complete lack of grass (e.g., as a secondary or complementary grass sensor 330).

Multiple sensors 312, 322 may be placed into the grass 20 (e.g. with probes 313 or flaps 303) at different heights, e.g., in crenellated, staircase, or other stepped fashion, to provide additional information and resolution. In some instances, the sensors 312, 322 are actuated upward and downward by a motor or linkage to measure obstruction, reflection, or conducted signal (including sound) at different heights. In some additional instances, the sensors 312, 322 (and all of or a subset of the associated struts, probes, sensors, or flaps) are actuated upward and downward by a motor or linkage to follow a grass height as detected or as predicted.

Figure 21:
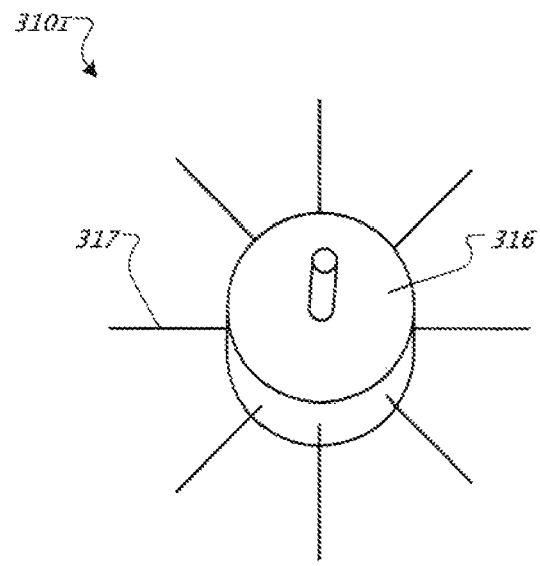
FIGS. 21-22 are schematic views of cut edge detectors.
Figure 22:
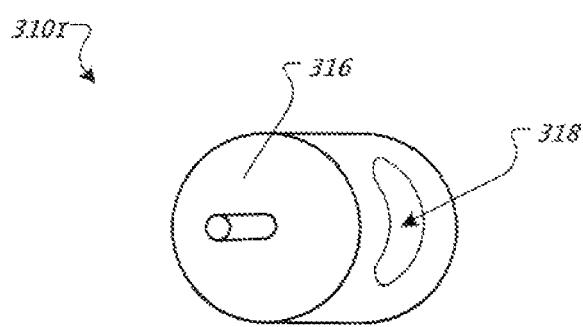

Referring to FIGS. 21-22, in some implementations, a rotating cut edge detector 310I, rotating in a horizontal or vertical plane, replaces multiple sensors 312, 322 and increases a signal frequency. For conductive sensors, a rotating cut edge detector 310I, rotating in a horizontal plane, may be used. The rotating cut edge detector 310I includes a rotating disk 316 configured with protrusions/spokes 317 or slots/depressions 318 which rotate with the disk 316 to increase the frequency and intensity of contacts with the grass 20. The size of the rotating disk 316 determines the averaged area for a signal, and different disk sizes may be used in different locations on the robot 10. Alternatively, the same disk size may be used in situations in which the disk size controls the resonant frequency, capacitance, or other size-dependant property. In some examples, a disk height is adjustable (e.g. via a motor or links) according to grass height, or increased/decreased periodically. The signal provided is characteristic of grass rubbing against, contacting, or striking the disk 316. For example, the signal may be characteristic of acoustics, vibrations, or mechanical resistance (to rotation) from the grass 20. The rotating cut edge detector 310I provides signal readings while the robot 10 is stationary as well.

The cut edge detector 310, in some implementations, resolves the cut edge 26 down to about plus or minus an inch horizontally, ½ inch preferably, and resolves the cut edge 26 down to about plus or minus ½" height, ¼" preferably. In some examples, the cut edge detector 310 detects an edge 26 when approaching from a first direction between about 30-90 degrees to a second direction normal to the cut edge 26. In other examples, fee cut edge detector 310 detects the edge 26 when approaching from between about 0-30 degrees from a direction normal to the cut edge 26.

In some implementations, the robot 10 includes a substantially horizontally oriented forward sensing boundary sensor 340. In some instances, a reflection type sensor as shown and described herein with reference to FIG. 13 is used. In other instances, the boundary sensor 340 is a camera or passive reception sensor. In many cases, the cliff detection sensor would be of analogous type. The boundary sensor 340 defects, for example, flowers, bushes, and fragile flexible structures not detectable by a depressible bumper soon enough to prevent damage. In some instances, the boundary sensor 340 is configured similarly to the multi-frequency color-based grass sensor 330 described earlier. The boundary sensor 340 may be filtered, shuttered, partially covered, or the signal therefrom conditioned, to emphasize vertical and diagonal lines typical of plant stalks and trunks.

Figure 23A:
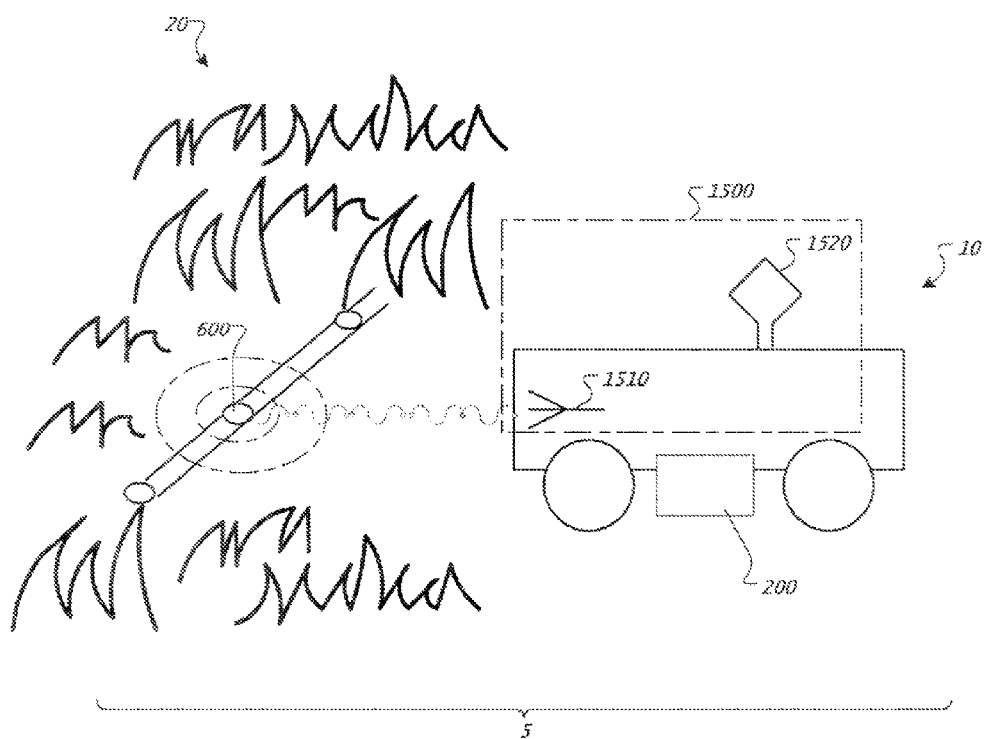
FIG. 23A is a schematic view of a lawn care robot system and mowing robot encountering a boundary responder.

FIG. 23A is a schematic view of a lawn care robot system 5 including a robot 10 and boundary responders 600. Boundary responders 600 placed on or in the ground 20 constrain or influence a behavior of the robot 10. In some implementations, the autonomous robot 10 includes a boundary responder emitter-receiver unit 1500 including a signal emitter 1510 which continuously or periodically emits a signal (e.g. a radio-frequency, electro-magnetic wave, or an acoustic signal) and a signal receiver 1520. In other implementations, the emitter 1510 is not necessary with certain kinds of active or semi-active boundary responder 600. Examples of boundary responders 600 include passive resonant boundary responders and powered active radio-frequency identification (RFID) boundary responders. Passive boundary responders echo or generate a responsive signal to a signal emitted from the robot 10 that is detected by the signal receiver 1520. Passive resonant boundary responders are detected by measuring the energy transferred from the emitter 1510 operating at a resonant frequency. Each of the boundary responders 600 discussed may be structured to drape well, in the manner of loose chain with a small bend radius (e.g., less than 2 inches, preferably less than 1 inch). In some examples, active boundary responders 600 are only powered when the robot 10 is within a certain range.

When the robot 10 approaches and detects a boundary responder 600, the robot 10 initiates a responsive behavior such as altering its heading (e.g. bouncing back away from the boundary responder 600) or following along the boundary responder 600. The boundary responder 600, in some examples, passively responds to a signal emitted by the signal emitter 1310 of the robot 10 and does not require a connection to a central power source such as an AC power outlet or origin dock. In other examples, the boundary responder 600 is a powered perimeter wire 6012 that responds to a signal emitted by the signal emitter 1510 of the robot 10. The powered perimeter wire 600 may be connected to a central power source such as an AC power outlet or origin dock. The powered perimeter wire 6012 may also be provided on a spool and cut to length for application. The powered perimeter wire 600 may also be provided in pre-cut length for application having connectors at each end of the pre-cut wire. In some implementations, passive and active boundary responders 600 are both detected by the same robot antenna 1520.

Figure 23B:
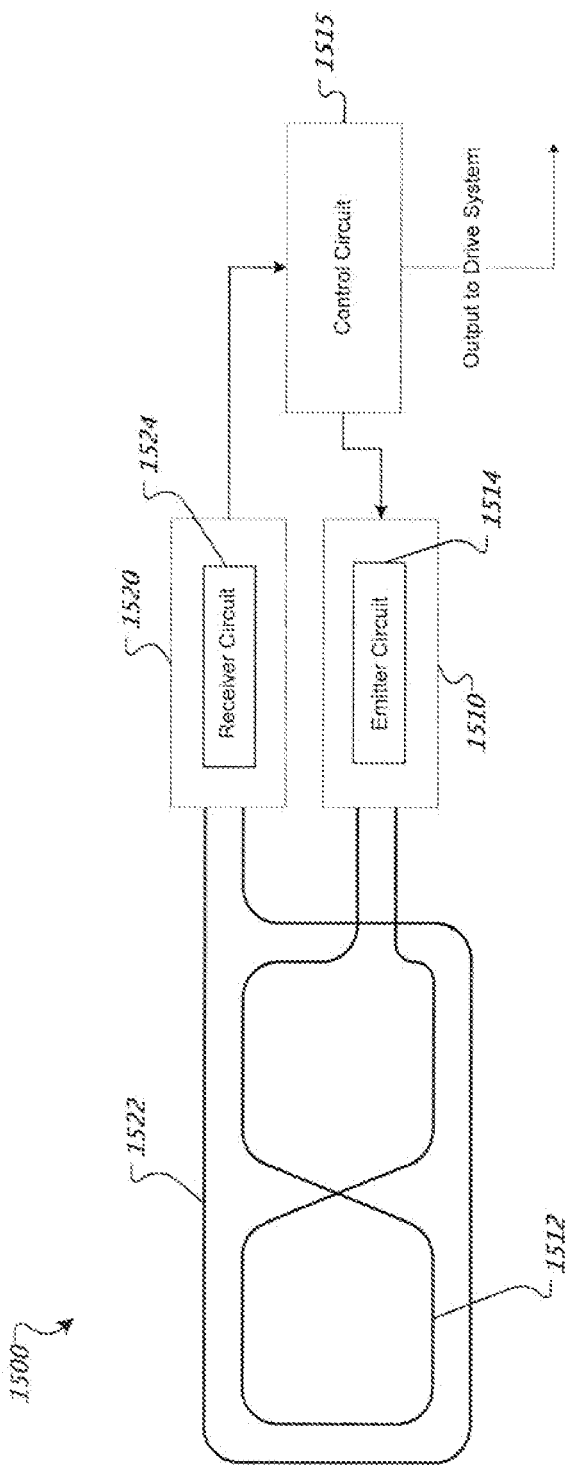
FIG. 23B is a schematic view of boundary responder detector for a lawn care robot system.

Referring to FIG. 23B, in some implementations, the signal emitter 1510 is a circuit 1514 including an antennae loop 1512 configured as a figure eight, which creates a null in the antennae loop 1512 to prevent ringing and minimizes transmitted signal coupling into the receiver antennae 1522 thereby allowing earlier detection of a received pulse in the time domain. The signal receiver 1520 is a circuit 1524 including an antennae loop 1522 surrounding and coplanar with the antennae figure eight loop 1512 of the signal emitter 1510. The figure-eight antennae loop 1512 coplanar with the receiver antennae loop 1522 provide increased detection range for the same amount of transmitting power over conventional coplanar antennae loops. An emitter-receiver control unit 1515 controls the signal emitter 1510 and receiver 1520 and communicates with the drive system 400. The emitter-receiver control circuit 1515 activates the signal emitter 1510 for a period of time. The signal emitter 1510 emits a radio frequency (RF) signal (e.g. at 13.56 MHz) to passive boundary responders 600 tuned to the transmittal frequency. Inductive and/or capacitive circuits 620 in the passive boundary responders 600 absorb the RF energy and re-radiate the energy back to the signal receiver 1520 (e.g. at a frequency other than 13.56 MHz). The re-radiate signal will persist for a period of time after the signal emitter 1510 has ceased emissions. The detected signal is processed by the emitter-receiver control unit 1515 and communicates a boundary responder presence to the drive system 400. Depending on the type of boundary responder 600, the drive system 400 may direct the robot 10 away, over, or to follow the boundary responder 600.

Referring to FIG. 24, a boundary responder 600 includes a boundary responder body 610 having one or more inductive and/or capacitive circuits 620 (herein termed "tank circuits"). The tank circuits 620 may be formed, deposited, or printed on the boundary responder body 610. For example, the tank circuits 620 may be formed on the boundary responder body 610 by photolithography, in a manner similar to silicon integrated circuit manufacturing; printed onto the boundary responder body 610 using ink jet or other depositional techniques; or manufactured individually and affixed to the boundary responder body 610. The tank circuits 620 may include localized compact folded/concentric loops, or loops extending along the length of the cord or tape body 610A. Although the boundary responder 600 is shown as a flat tape with printed circuits, the circuits 620 may include longer concentric, spiraled or other antenna-like elements, and may be constructed in a tape-like form wound or rolled into a cord-like or wire-like form.

In some examples, the boundary responder 600 has a predictable resonance frequency by having the boundary responder body 610 formed as a continuous cord or web with discrete inductive/tank circuit elements 620 of a known responsive frequency.

In general, tank circuits 620 are known and used in different arts. For example, low frequency versions are placed to facilitate the detection of buried cables (e.g., 3M Electronic Segment System, U.S. Pat. Nos. 4,767,237; 5,017,415), trapped miners (U.S. Pat. No. 4,163,977), or swallowed radioendosondes (e.g., the Heidelberg capsule), such as U.S. Pat. Nos. 6,300,737; 6,465,982; 6,586,908; 6,885,912; 6,850,024; 6,615,108; WO 2003/065140, all of which are expressly incorporated herein by reference in their entireties. When tank circuits 620 are exposed to a magnetic pulse or electromagnetic energy at a particular frequency they will ring for a time at a frequency determined by the capacitor and inductor. Each tank circuits 620 may be tuned to the same frequency, in some examples, and for better discrimination timed to two or more different frequencies, in other examples. In some implementations, the robot 10 pulses a transmitter 1510 and looks for a response from the tank circuits 620 of the boundary responders 600. In other implementations, the robot 10 sweeps a transmitting frequency and looks for a response at each particular frequency. Certain types of receiving coils for the signal receiver 1520 (a figure-8 coil, for example) can detect a phase shift as an external tank circuit 620 passes a centerline of the coil, allowing the robot 10 to detect when it crosses the boundary responder 600. In some examples, a receiving coil or antenna of the signal receiver 1520 and the tank circuits 620 of the boundary responders 600 are disposed in parallel planes.

In some implementations, the boundary responder 600 includes amorphous metal, which may remain passive but emit a responsive signal when it receives an electromagnetic signal. When the boundary responder 600 composed of amorphous metal (either entirely or partially) receives an electromagnetic signal, for example, the amorphous metal becomes saturated and emits a spectrum of electromagnetic signals, including harmonic frequencies of the received incoming electromagnetic signal. Amorphous metal requires very little magnetic field to become saturated. When an amorphous metal is exposed to even weak RF energy the metal goes info and out of magnetic saturation during each cycle. This provides a non-linearity in the metal's response to the radiation and results in the production of harmonies to a fundamental frequency. This property is quite rare in normal environments. In some implementations, to detect a boundary responder 600, the robot 10 generates a signal (e.g. modulated frequency) to excite any nearby amorphous metal which will radiate harmonics of the transmitted frequency. The robot 10 detects the harmonics of the radiated frequency (using synchronous detection, for example) to determine a locality with respect to the boundary responder 600.

In some examples, the emitter 1510 of the robot 10 emits an electromagnetic signal as it traverses a yard 20. Upon approaching a boundary responder 600, the boundary responder 600 receives the electromagnetic signal from the robot 10 and emits a responsive signal including harmonies of the received electromagnetic signal. The signal receiver 1520 of the robot 10 receives and analyzes the responsive electromagnetic signal using a circuit or algorithm. The robot 10 then performs a predetermined behavior (such as turning away from or following the boundary responder 600, as appropriate).

A wire-like or tape-like boundary responder 600 including at least one portion composed of amorphous metal does not need a tank circuit 620, thereby reducing manufacturing costs. When the boundary responders 600 includes tank circuits 620 or is composed of amorphous metal (or both), the boundary responders 600 may be cut to length (at fixed or variable intervals), curved, bent, or otherwise manipulated for placement on or beneath the yard 20. The boundary responders 600 may be supplied on a spool or reel, for example, and cut with scissors or garden shears into segments of a particular length. The boundary responder 600 is affixed to the yard 20 by a number of methods, including, for example, placing it beneath thick grass; adhering it to the ground 20 using lime, concrete, epoxy, resin, or other adhesive (e.g., when traversing pavement such as a driveway or sidewalk), tacking it down with lawn nails or stakes, or burying it up to an effective depth of soil such that the boundary responder 600 can still detect and respond to incoming signals.

The boundary responder 600 is severable or separable at and between the circuits 620. Cutting boundary responders 600 made of amorphous metal or having many tank circuits 620 about its entire length does not destroy the ability of the boundary responder 600 to detect and respond to incoming signals. If one tank circuit is 620 is damaged during cutting, other tank circuits 620 located elsewhere along the boundary responder body 610 will still function properly. When amorphous metal is cut, its electromagnetic properties remain generally unchanged.

Referring to FIG. 25, a boundary responder 600A, in some examples, includes a circuit 620A having has one or more pairs of conductors (e.g. parallel wires) shorted together to form an inductor loop 622. Load circuits 624 may set a resonant frequency. In some implementations, the narrow (e.g. ⅜") wire loop 622 is constructed of parallel wires (e.g. 300-ohm twin lead) with the ends shorted to create a loop inductor capable of resonating at an appropriate wavelength (e.g., 100 MHz). Twin-lead is available in many forms, including antenna tape and invisible twin lead (thin wires bonded to sticky tape). Although FIG. 24 shows spaces between the circuits 620A (which may be marked with "cut here" indicia of any kind), the boundary responder 600A, in some examples, includes a boundary responder body 610 having continuous twin leads 622. Shorting shunts placed along the responder body 610 at fixed intervals (e.g. 1 to 6 feet) creates repeating circuits 620A. The boundary responder 600A is severable or separable at the shunts between circuits 620A. The shunts may include loading inductors or capacitors to make resonance less dependent on length.

Orientation of the detection antenna 1520 on the robot 10 may be appropriate to detect the circuits 620. The defection antenna 1520 may be provided in a rotating loop or as three orthogonally arranged impedance balanced antennae components, which detects energy absorption by the resonant circuit 620 at a known frequency. The configuration depicted in FIG. 24 can power active RFID-type components.

Referring to FIG. 26, a boundary responder 600B, in some examples, includes spiral or multi-loop conductors 622 with optionally attached loading elements (capacitor, inductor) 624. In cases where longer circuit loops 620 are used, e.g. 1-6 foot long inductive loops, the boundary responders 600 may be severed at marked places 626 (e.g. perforations) between adjacent circuit loops 620. In each case, the loading elements 624 are optional.

Figure 27:
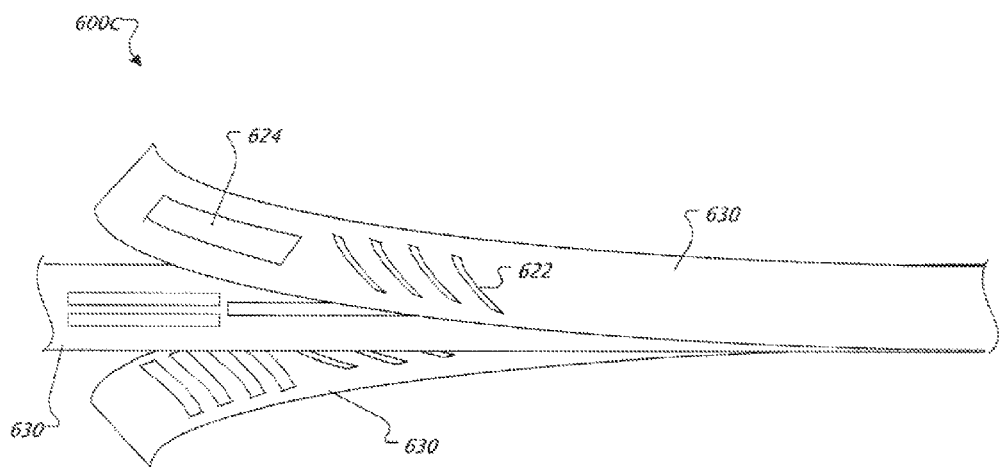

FIG. 27 shows a boundary responder 600C including a boundary responder body 610 formed of multiple laminae 630. Each lamina 630 includes printed, deposited, or etched loading elements 624 (capacitor, inductor) and/or loop inductors 622, or parts thereof. Some of the structures 622, 624 may be completed by lamination of the entire responder body 610 (e.g. parts of the loading elements and/or loops being distributed among different laminae). The lamina 630 may be single sheets of Mylar with a deposited shaped layer or metal foil etched to a desired shape.

Figure 28:
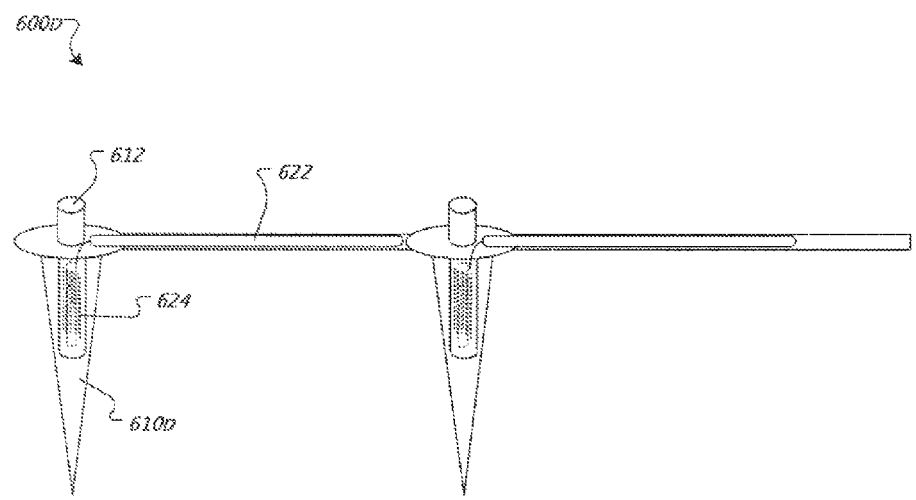
Figure 37:
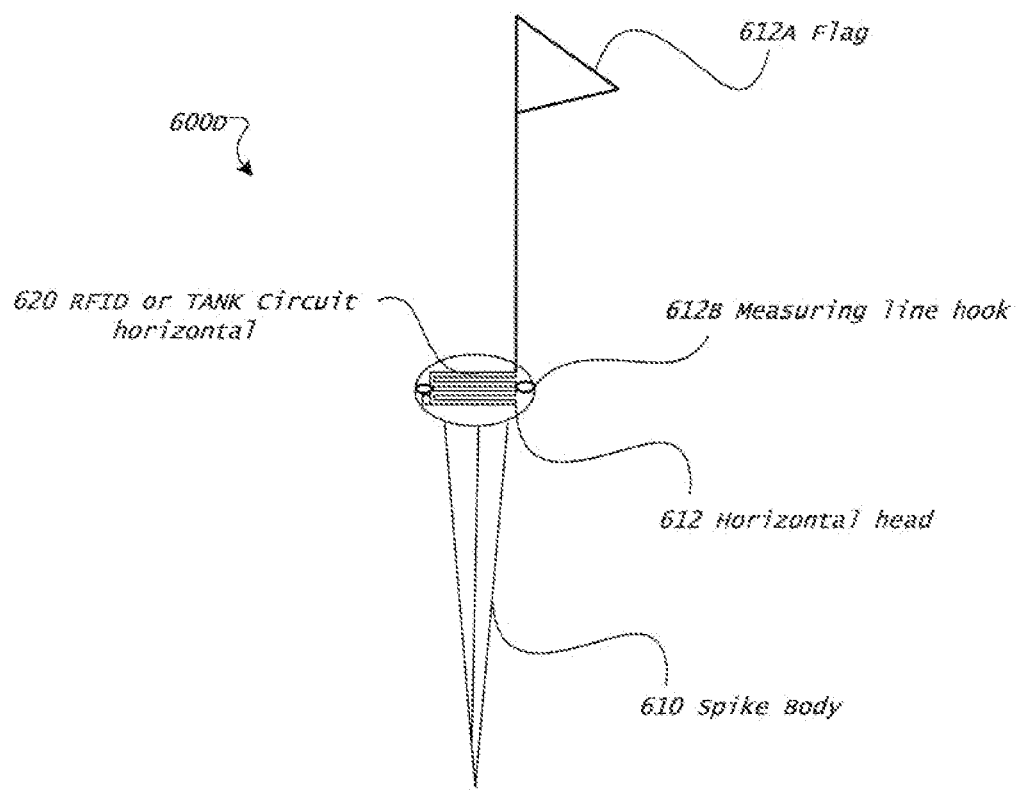
FIG. 37 is a schematic view of a spike type boundary responder.

FIGS. 28 and 37 depict a boundary responder 600D including a circuit 620D arranged within a responder body 610D formed as a spike or tack. In some examples, the responder body spike 610D includes a responder top 612 visible above the ground 20. In some examples, the responder top 612 is passively excitable, e.g., fluorescing and detectable by the not-grass detector 330. The responder top 612 is a flag in some examples with loading elements 624 placed in a flagpole. In some examples, the boundary responder 600D is connected to an extended loop inductor 622 or extended antenna, with or without loading elements 624 in the responder body spike 610D or flagpoles. The boundary responder 600D may be connected to one another to form a stand. If loading elements 24 are in the responder body spikes 610D, the resonance may be dominated by the loading elements 24, but an extending antenna 622 can distribute the length of the circuit responsive to resonance between periodically placed boundary responders 600D. In some examples, the tank circuit 620 of the boundary responders 600 are disposed in a head portion of the responder body 610D (e.g. to position the tank circuit 620 in a plane parallel to the signal receiver 1520 of the robot 10).

Figure 29:
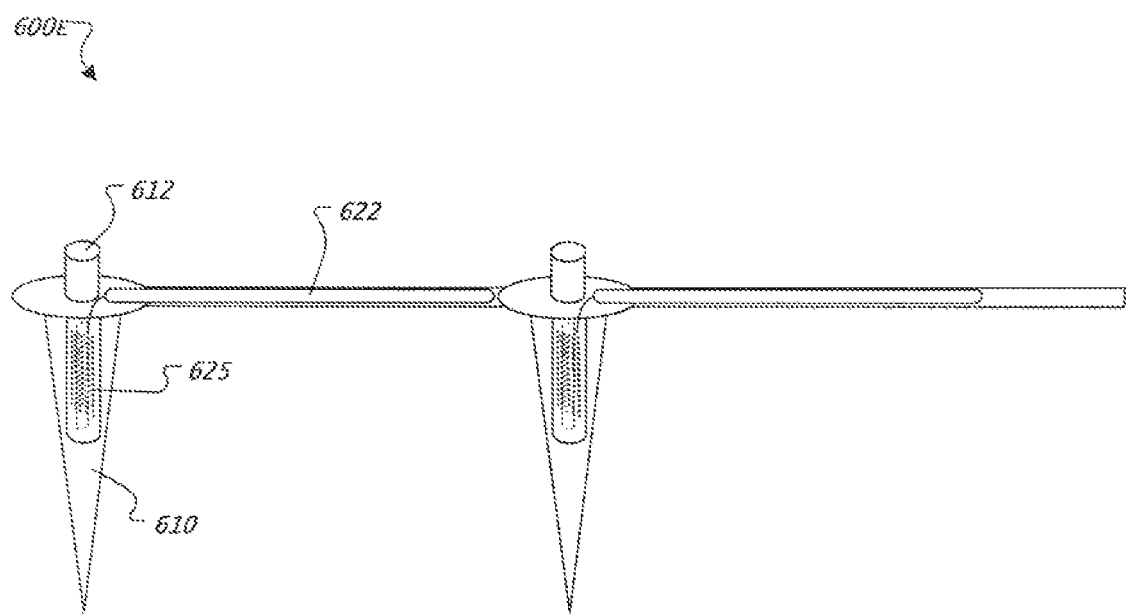

Referring to FIG. 29, in non-passive examples, a boundary responder 600E includes RFID emitters 625 in place of loading elements 624 and emitting a signal detectable by the signal receiver 1520 of the robot 10 and a loop 622E. The RFID tag 525 receives a signal transmitted by the signal emitter 1510 off be robot 10 and replies by broadcasting stored information. In some examples, the boundary responder 600E includes a power source (e.g. battery) to extend a range of the boundary responder 600E (e.g. the robot 10 could detect the boundary 600E at a greater distance).

In some implementations, the boundary responder 600 includes one or more acoustic devices which chirp when remotely excited to establish a boundary. In other implementations, the boundary responder 600 emits and/or receives visible-spectrum signals (color codes or other encoded message passing, for example) via retro-reflectors or optical targets. Optical targets are distinguishable from other objects in a visual field of the robot 10. The optical targets may be printed with a "self-similar" retro-reflective pattern illuminable with modulated illumination. The optical targets may identify endpoints of the boundary responder 600.

In one example, a boundary responder 600F includes a magnetically chargeable loop 622F. A moving (e.g. rotating) magnet carried by the robot 10 transfers energy. For example, a magnet is placed on a moving part of the cutter 200 (e.g. a spinning blade, or oscillating shears). The boundary responder 600F is installed in or on the ground 20 with the loop 622 orientated to derive sufficient flux through the loop 622. The material of the rotating or reciprocating support for the magnet or magnets should not short out the lines of flux (e.g., plastic or non-conductors). In some examples, the magnetically chargeable loop 622F is used to wakeup a battery powered continuous loop 622D.

In another variation, a boundary responder 600G includes a plastic cable body 610G with fluorescence embedded therein or painted thereon, activatable with a UV radiating source (e.g. LED) on the robot 10 and severable to any length. The fluorescence boundary responder 600G, in some examples, is masked or embedded to encode (e.g. long, short, long) a responder kind. In still another variation, a boundary responder 600H includes a quarter or half-wave antenna or inductor-loaded antenna, detectable by resonance, re-radiation, or energy absorption in a similar fashion to the tank circuits 620 previously discussed herein. Again, different frequencies may be defected. If the boundary responder 600H is cut to length, a first pass by the robot 10 establishes a frequency to be expected on that particular lawn 20. In still another variation, a boundary responder 600I includes a flat responder body 610I defining rumble strips vibrationally or acoustically detected and preferably arranged with distinctive periodicity to generate distinct frequencies for detection.

Figure 30:
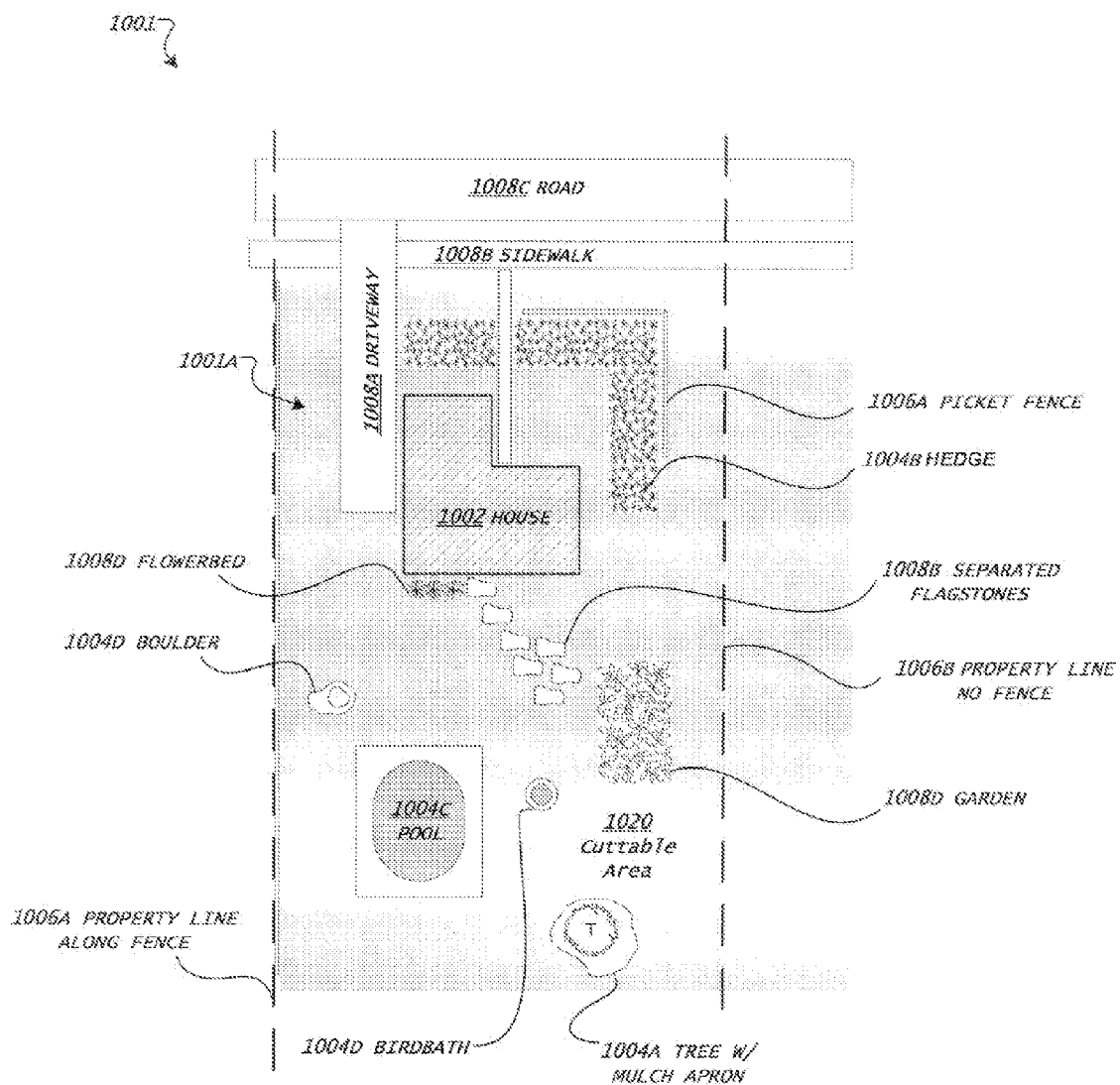
FIG. 30 is a schematic view of a property having boundaries, obstacles, cuttable areas, and non-cuttable areas.
Figure 31:
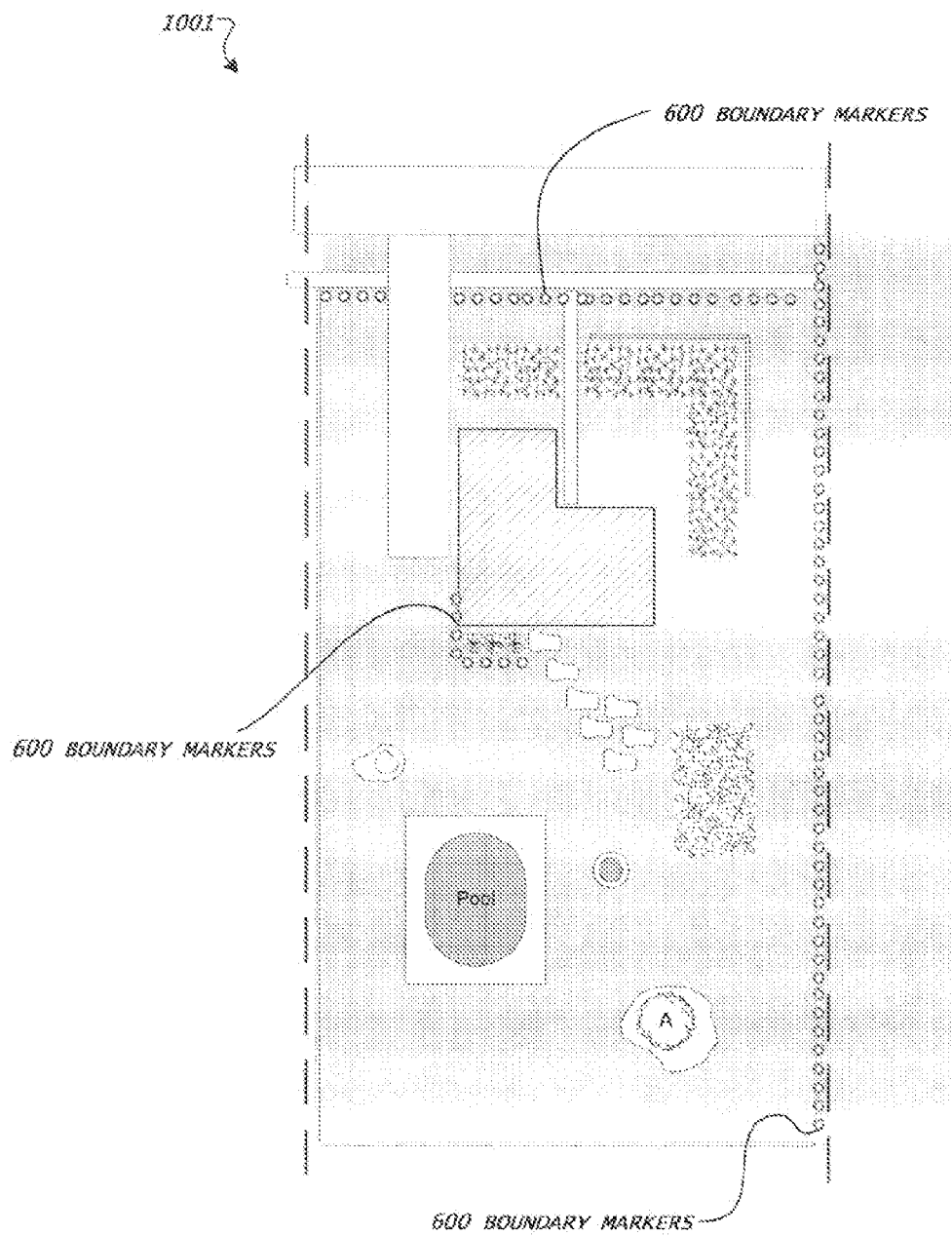

FIG. 30 provides a schematic view of a property 1001 with a property interior 100A having a house 1002 surrounded by cuttable areas 1020 (e.g. a grassy lawn 20), grass-cutting obstacles 1004 (e.g. trees 1004A, bushes 1004B, and water 1004C, and immovable objects 1004D) boundaries 1006 (e.g. fences 1006A and property lines 1006B), and non-cuttable areas 1008 (e.g. driveways 1008A, sidewalks 1008B, and roads 1008C, and flowers/garden 1008D).

Figure 31:
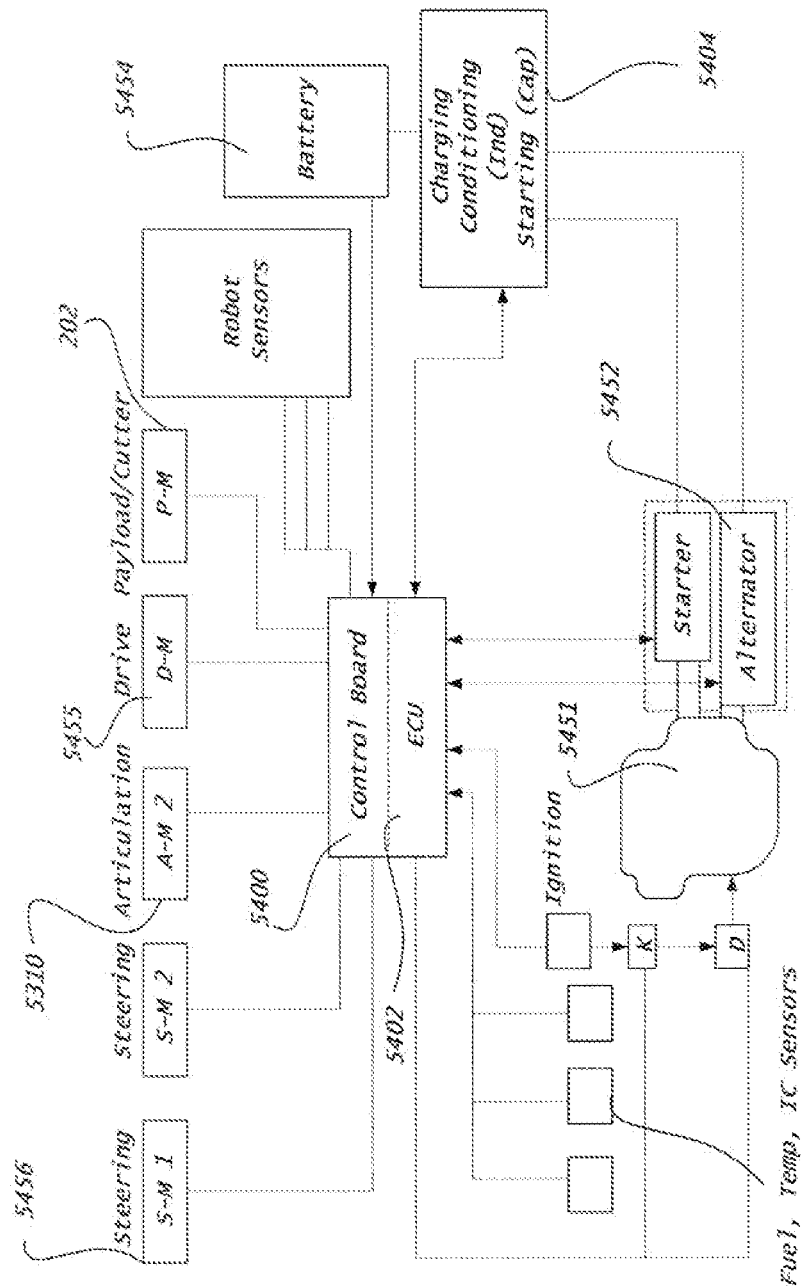
FIG. 31 is a schematic view of a property having boundary responders.

Referring to FIG. 31, an example mower system installation for a property 1001 includes arranging boundary responders 600 along the length of a neighboring property line 1006B. There is no particular need to arrange segments along the sidewalks 1008B or street 100BC, as these will be detected as described herein. The flower bed 1008D, which is both fragile and difficult to detect, is also protected with a boundary responder 600. The remainder of the obstacles 1004, 1006 in the property 1001 are detected by a sensor suite of the robot 10 as described herein. In this case, most of the lawn 1020 is contiguous with a few areas bounded by pavement 1008B. The mower robot 10 can be lead to the bounded areas or provided with a behavior that follows boundary responders 600 to the bounded areas. For example, a behavior may direct the robot 10 to follow the boundary responders 600 across pavement or mulch 1008 with the cutter 200 turned off, but not across a drop or cliff. A cliff sensor suitable for detecting such cliffs or drops is disclosed in U.S. Pat. No. 6,594,844 and incorporated by reference herein in its entirety.

Figure 32:
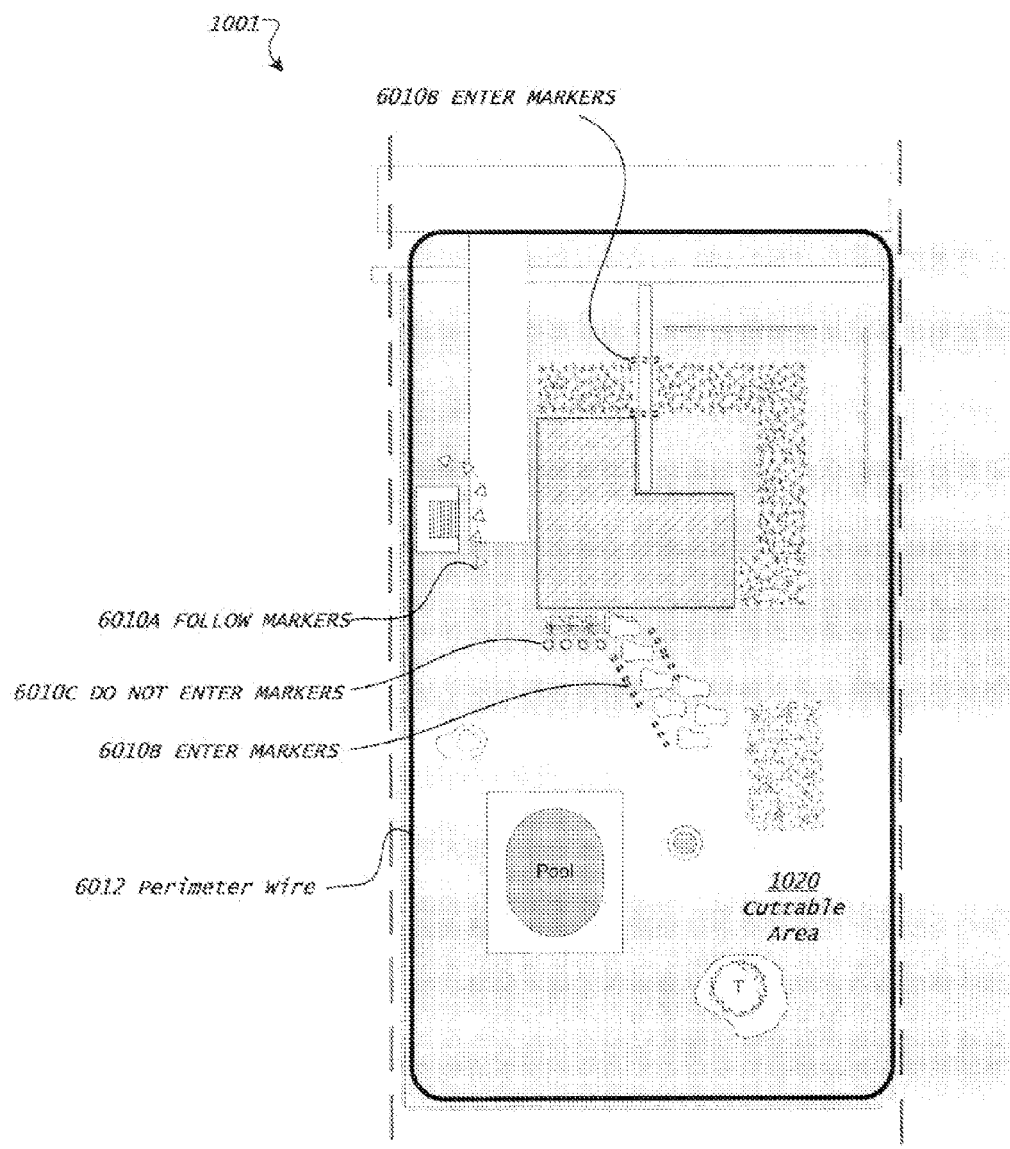
FIG. 32 is a schematic view of a property having follow and enter responders.

Referring to FIG. 32. In some examples, multiple types of boundary responders 600 exist. Boundary responders 600 including resonant circuits 620 (whether using lumped or distributed inductance and capacitance) may have different resonant frequencies to convey boundary type information. In one example, a passive boundary responder 6010 signals the robot 10 to maneuver over it and whether mowing should start, continue, or halt. The passive boundary responder 6010 may also trigger the robot 10 to perform other actions upon detection. For example, a follow type boundary responder 6010A signals the robot 10 to follow the responder 6010A for its entire length (e.g., to cross a driveway or navigate a long dirt or pavement path between zones). In another example, an enter type boundary responder 6010B signals the robot 10 to enter an area normally off-limits (e.g., to navigate along a sidewalk to get from front to rear yards or to continue cutting across a path of separated flagstones). In yet another example, upon detecting a do not enter type boundary responder 6010C, the robot 10 initiates a behavior to alter its heading to bounce back away from the boundary responder 6010C.

In some implementations, the powered perimeter wire 6012 and the passive boundary responders 6010A-C both operate at the same frequency (e.g. at 13.56 MHz). The powered perimeter wire 6012 has a duty cycle, alternating between powered and un-powered, to not overshadow signals from passive boundary responders 6010A-C located on a property 1001 circumscribed by the powered perimeter wire 6012. When the powered perimeter wire 6012 is quiet, the signal receiver 1520 can detect passive boundary responders 6010A-C. The duty cycle is set to allow the robot 10 to quickly alternate monitoring of active responder 6012 and passive responder 6010A-C confinement while maneuvering across the lawn 1020.

After installation of the boundary responders 600, the robot 10 may traverse the property 1001 without any cutters 200 activated to check the placement of boundary responders 600. In some instances, the robot 10 is configured to operate only when within a certain range of the boundary responders 600 or when the boundary responders 600 are active (e.g. for safety purposes). For example, the robot 10 is configured to detect a current direction in boundary responders 600 powered with alternating current to determine whether it is inside or outside of a boundary perimeter. Other techniques of preventing robot escapes include using GPS to determine a robot location, determining a distance from a beacon, and using virtual walls including beacons that emit an emission (e.g. infrared light or radio frequency) detectable by the robot 10. In some examples, the robot 10 employs proximity detection to protect against moving into people or pets. A radio frequency identification tag (RFID) recognizable by the robot 10 may be placed on people or pets to prevent their collision with the robot 10.

Robot navigation components may be divided into five sub-categories: follow cut grass edge (i.e. find the boundary between the cut and uncut grass); stay on the grass (i.e. passive grass/not-grass detection); stay within the arbitrary boundaries (i.e. don't cut the neighbor's lawn); don't stray too far (e.g. backup/secondary system); and end near a specified location. The backup system, for example, may be a radio-based detector restricting the robot 10 from traveling too far from a home base (which would be optionally integrated with a battery charging device). Some implementations include using a GPS circuit, determining a signal strength of the responder 600, or resolving a time of flight from a local encoded beacon. As a security and/or safety measure, the robot 10, in some examples, may not operate other than within a restricted coordinate set, or absent an appropriate signal. To minimize error and signal loss from weather, canopy or obstacles, the robot 10 may be trained with the signal characteristics of the property 1001 (e.g. the first full cycle of mowing the lawn would collect baseline signal data for determining minimum and maximum thresholds of the property 1001). This provision may also be overridden by the user with appropriate authorization. A beacon or GPS signal may aid the robot 10 in returning to an end location specified by the user, or an additional short or mid-range radio or visible beacon provided for homing purposes.

U.S. Pat. No. 6,690,134 by Jones et al., entitled Method and System for Robot Localization and Confinement, the entire disclosure of which is herein incorporated by reference it its entirety, discloses methods for confining and localizing an indoor robot using directed IR beams and multi-directional sensors; and U.S. Provisional Patent Application No. 60/741, 442, "Robot Networking, Theming, and Communication System," filed Dec. 2, 2005, which is herein incorporated by reference in its entirety, discloses additional methods for chamber-to-chamber localization, confinement, and navigation using different frequencies and ranges of IR beams and multi-directional sensors. These can be used as, in combination with, or instead of, the boundary responders 600 discussed herein. Although the use of IR beams and detectors is less effective outdoors, various implementations may use higher wavelengths of IR emission and detection (e.g., 900 nm+). The IR emission and detection may be baffled, channeled, and filtered to remove sunlight and/or sunlight spectral components. The IR emission and detection may also be modulated to permit AC coupling on receivers to reject daylight and other steady light sources. Narrow beam (5 degrees or less) microwave (e.g., in conventional radar gun/detector frequencies) emitters and detectors can be used instead of, or in addition to, directed IR beams (complementary false positive rejection) with the same interpreting software and behaviors.

Figure 33:
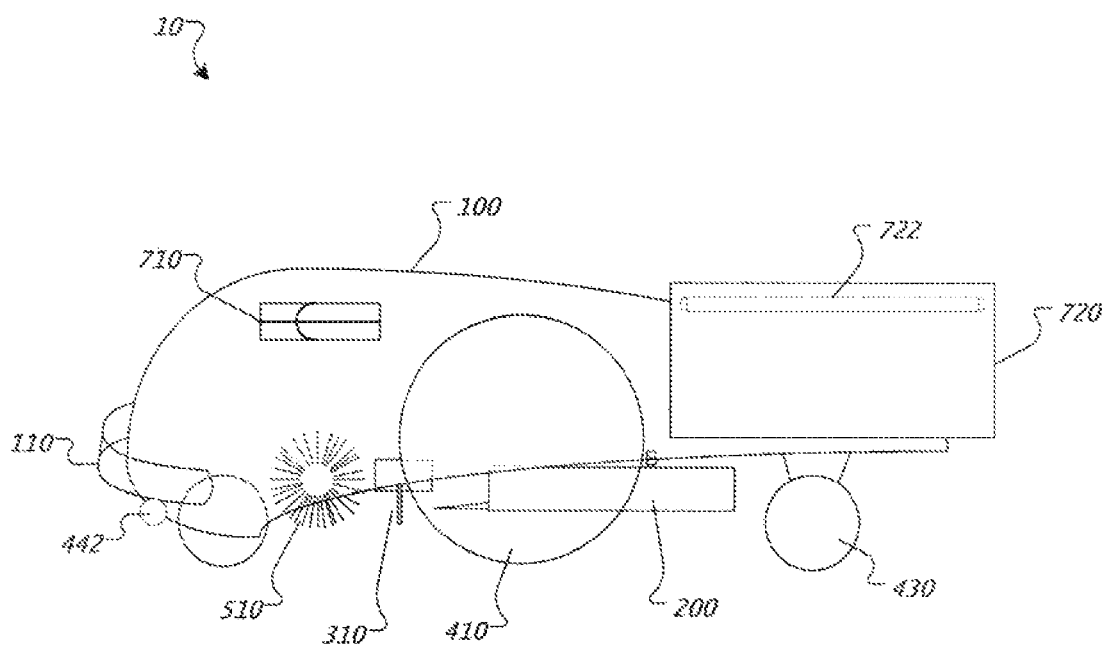
FIG. 33 is a schematic view of a lawn care robot.

Referring to FIG. 33, in some examples, the mower robot 10 includes one or more tilt sensors 710 (e.g. accelerometers) monitoring a robot tilt to avoid mowing or maneuvering above a maximum robot tilt angle. The tilt sensor 710 may also provide terrain data that aids robot maneuvering and behaviors. For example, when the tilt sensor defects a robot tilt, the robot 10 compares a measured robot inclination with known values to determine whether it is maneuvering over a threshold, tree roots, humps, hillocks, small hills, or other surface phenomena that may be treated as obstacles, but not easily detectable by bumpers or proximity sensors.

In some examples, the mower robot 10 includes a rain sensor, such that it returns to a home base when rain is detected.

The robot 10 includes at least one stasis detector 442, in some examples, such as an idle wheel sensor (e.g., optical, magnetic, limit switch encoder on non-driven wheels) or a drive wheel torque/current sensor for detecting a stuck condition. The cut edge sensor 310 or edge calibration sensor 320 is used as a stasis sensor in some cases, or as a backup sensor for a wheel torque/current sensor type stasis sensor. Any camera, including optical mouse-type or other low-pixel cameras, even when used for other purposes (e.g., grass/no grass), can be used as a stasis sensor when no movement is detected. In some cases, a motor load of the cutter 200 is monitored for a stasis or stock condition. Any combination of these can be interpreted as a stuck condition when the circumstances giving rise to that response are appropriate (e.g., no grass detected+no cutting load=stuck, unless front wheel is rotating and motor load is normal).

In some implementations, the robot 10 includes additional obstacle detectors such as bump, infrared, optical, sonic, and horizontal-scanning sensors for detecting collision hazards (i.e. chain-link fences) within a path of the robot 10. In one example, a horizontally oriented sonic sensor is capable of detecting a flower pot or tree trunk prior to a collision, enabling the robot 10 to alter its heading to avoid the obstacle.

In some examples, the robot 10 includes a clipping collector 720, such as a sack or barrel for collecting grass clippings or yard debris. The clipping collector 720 includes a capacity sensor 722, in one implementation. Examples of the capacity sensor 722 include an acoustic sensor that analyzes an acoustic spectral response of a substantially rigid clipping barrel and a break-beam optical sensor. The break-beam optical sensor has an emitter projecting a beam of light across the clipping collector to a receiver. When the beam of light is not detected by the receiver, the robot 10 determines that the clipping collector 720 is full and performs an appropriate behavior such as ceasing mowing, or dumping the contents of the clipping collector 720 at a designated location, for example.

In some examples, the robot 10 communicates wirelessly with a remote monitor, also discussed interchangeably herein as a wireless remote able to communicate with transceiver 55 on the robot. The remote monitor is a small console or indicator, in some instances, not significantly larger than 3 cubic inches. The remote monitor may be affixed to a refrigerator door or other metal object using a magnet. The remote monitor signals to an operator that the robot 10 needs assistance when the robot 10 becomes stuck, damaged, unsafe for operation, or unable to empty the clipping collector, for example. The remote monitor may include a kill switch to terminate operation of the robot 10; and/or may transmit a dead-man signal without which the robot 10 will not operate. In one example, the robot 10 sends a radio-frequency signal via an unlicensed frequency (e.g. 900 MHz or 2.4 GHz) to the remote monitor. The wireless signal may encode information via frequency or amplitude modulation, for example, and/or via any appropriate communications standard such as Bluetooth, ZigBee, WiFi, IEEE 802.11a, b, g, n, wireless USB (UWB), or a proprietary protocol such as discussed in U.S. Provisional Patent Application. No. 60/741,442, "Robot Networking, Theming, and Communication System."

A base station acts as a relay or intermediary, in some instances, between the robot 10 and the remote monitor. In some examples, the base station includes a charging system and communicates with a wired or wireless home network. The remote monitor sounds an audible alarm (particularly if the signal issued by the robot indicated that a dangerous condition or accident had occurred) and/or flashing light or other signal, for example, to bring a robot distress condition to the attention of an operator. The remote monitor may communicate data transmitted by the robot 10 on a display (e.g. LCD) or via a voice synthesizer. Examples of transmitted data include area of lawn mowed, remaining power level, and warning alarms.

A base station and an autonomous robot configured for autonomously docking and recharging is specifically described in U.S. patent application Ser. No. 10/762,219, by Cohen, et al., filed on Jan. 21, 2004, entitled Autonomous Robot Auto-Docking and Energy Management Systems and Methods, the entire disclosure of which is herein incorporated by reference it its entirety. User input commands, functions, and components used for scheduling a mowing cycle directly on the robot 10 or via the base station and/or any boundary responders 600 are specifically described in U.S. patent application. Ser. No. 11/166,891, by Dubrovsky et al., filed on Jun. 24, 2005, entitled Remote Control Scheduler and Method for Autonomous Robotic Device, the entire disclosure of which is herein incorporated by reference it its entirety.

In some implementations, the robot 10 mows a swath 23 having a generally spiral path, combined with boundary following, edge following, and random movement. Spiral spot cleaning essentially equivalent to spiral mowing as well as wall following essentially equivalent to obstacle and/or boundary responder following are specifically described in U.S. Pat. No. 6,809,490, by Jones et al., entitled, Method and System for Multi-Mode Coverage for an Autonomous Robot, the entire disclosure of which is herein incorporated by reference it its entirety.

The robot 10 may have a single dominant following side 101, 102, or let one side 101, 102 dominate depending on whether a boundary 600, 1004, 1006, 1008 or cut edge 26 is to be followed. Boundary responders 600 may be followed differently from physical boundaries, e.g., on the robot edge, the cut edge, or the robot center. When the cutting head 200 extends fully across one side 101, 102 of the robot body 100 but not the other, either side 101, 102 of the robot 10 may still be a dominant and/or boundary following side. The robot 10 follows obstacles 1004, 1006, 1008 on the side 101, 102 having greatest cutter extension to cut as close to an edge as possible, yet may still follow cut edges 26 on the other side 101, 102.

Alternatively, the robot 10 may follow both cut edges 26 and boundaries 600, 1004, 1006, 1008 on the same side 101, 102 with an asymmetrical blade arrangement 200. An asymmetrical cutter 200 leaves an uncut spot, e.g., where the cutting head 200 is offset to the right and the robot 10 spirals to the left, the bottom portion of the robot 10 with no cutting head coverage creates a small uncut circle in the center of the spiral. This can be addressed by adding to the spiral a center pass based on dead reckoning, or by following the spiral with one or two center pass figure-eights based on dead reckoning, or by reversing the direction of the spiral.

Figure 34:
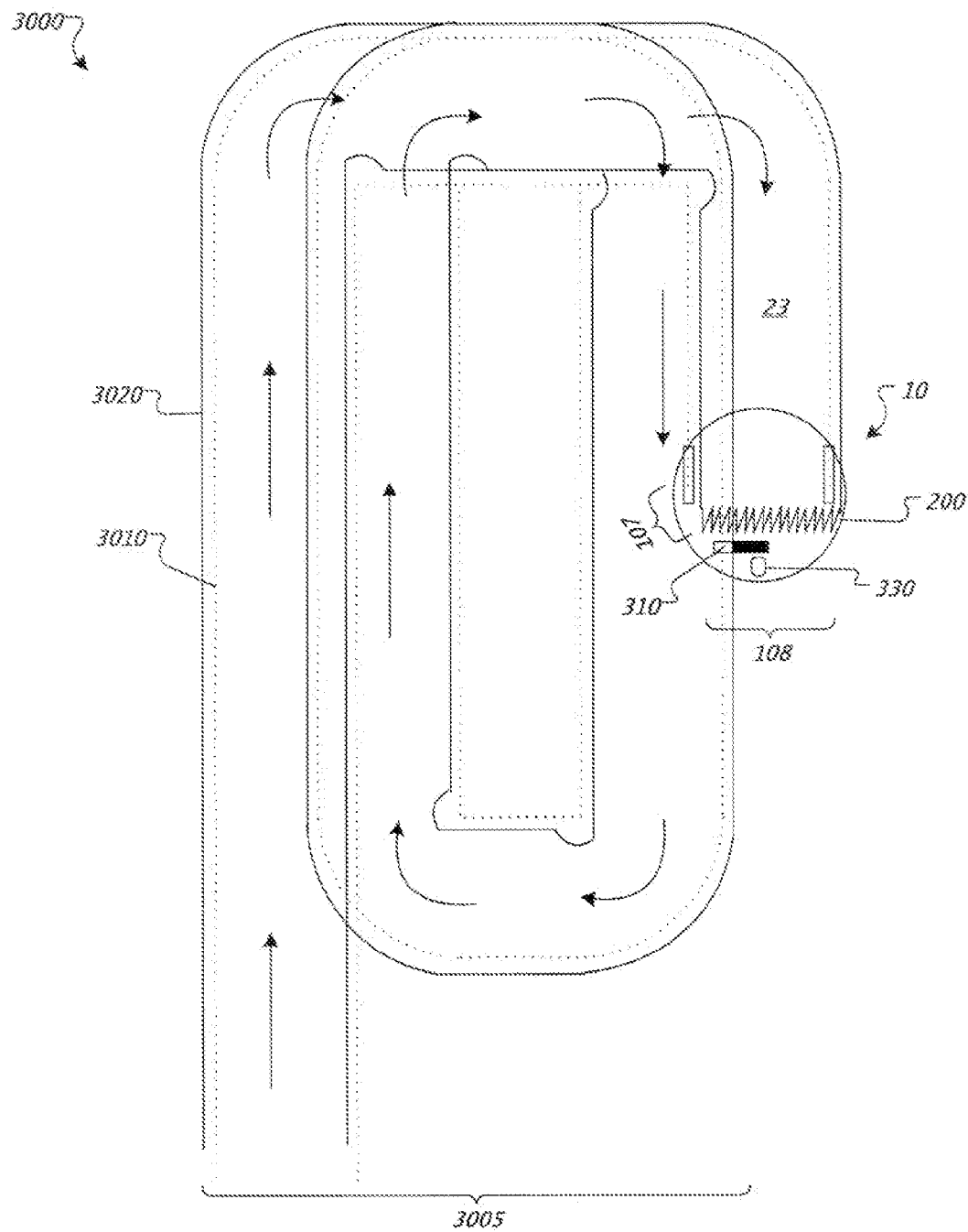
FIG. 34 is a schematic view of an example cutting pattern mowed by a lawn care robot.

FIG. 34 provides a schematic view of an alternative non-random coverage pattern 3000 by the robot 10. The pattern 3000 is suitable for robots 10 having offset and non-offset cutting heads 200. To make the pattern 3000, the robot 10 follows a succession of offset overlapping loops 3005, such as those traversed by Zamboni® ice resurfacing machines. A general wheel path 3010 is shown in dotted lines and a general coverage path 3020 is shown in solid lines. The overlap is sufficient to cover any uncut spots caused by the offset cutting head 200 or offset differential drive system 400. The pattern 3000, in one example, includes as a series of overlapping rounded-corned rectangles achieved by right-angle differentially steered turns. In other examples, the pattern 3000 includes smooth ovals. A distance across each loop 3005 of the pattern 3000 can be any size. Larger loops 3005 incorporating many substantially straight lines provide greater cutting efficiency than smaller loops 3005. However, drift error may accumulate with large loops 3005, disrupting the pattern 3000. If the loops 3005 are too small, too much time is spent turning. A cutting quality during turning may not be as satisfactory as while cruising straight. A balance of cutting performance, speed, and loop size may be established for each yard 20. In one example, the loop 3005 is sized to completely cover a center of the loop 3005 on a third to sixth parallel pass (parallel whether the loop 3005 is irregular, circular, oval, square, or rectangular) and overlaps by no more than half of a cutting width on each pass. Example patterns 3000 include loops 3005 overlapping by about 120%-200% of a distance 107 from a wheel center to an edge of the cutting head 200, loops 3005 offset by a cutting width 108 minus about 120%-200% of distance 107, loops 3005 overlapping by about ⅕-⅓ of the cutting head width 108, and loops 3005 offset by about ⅘-⅔ of the cutting head width 108, having loops 3005 less than three to four times as wide as the yard 20. In many instances, the loops 3005 are substantially symmetrical. The pattern 3000 is adjusted to leave no gaps in the cut area 22 for a robot 10 cutting to a following or dominant side edge 101, 102, or having a cutter 200 that does not extend to the edge on either side 101, 102.

With any cutting path, it is not critical that the rows are straight, but more important that the robot follows its previous pass/swath 23. The reference swath 23 may be parallel to a curved or stepped obstacle. Following previous swaths 23 improves efficiency, as compared to random bouncing (reducing time on the working surface from 5× deterministic to 1.5-3 times deterministic), and improves a user's perception of the robot's effectiveness and aesthetics of the lawn 20.

A method of mowing a yard includes placing an autonomous mower robot 10 in a yard 20 and allowing the robot 10 to mow a reference row/swath 23 of arbitrary or boundary-constrained length. The robot 10 proceeds to follow a cut edge 26 of the reference row/swath 23. At the end of the reference row 23, the robot 10 turns and row follows for each successive row 23, mowing a pattern 3000 as described above. The pattern 3000 has successive offset overlapping loops 3005 that spiral and increase in size with each iterative loop 3005. The robot 10 continues mowing by following the cut edge 26 of a preceding row 23 until an arbitrary area has been cut or the pattern 3000 is interrupted by an obstacle 1004 or boundary 1006. The robot 10 then moves to a new uncut area 24 of lawn 20 (randomly or using collected boundary history), mows a new reference row 23, and repeats the mowing process until the lawn 20 is estimated to be complete. The robot 10 uses a reference heading from a navigational system to establish each reference row 23, the edge of which is followed to mow substantially parallel rows.

In addition to or in lieu of the cut edge sensor 310, in some example, the robot 10 includes one or more auxiliary navigational systems to enhance alignment and navigation of the robot 10. For example, the robot 10 may include a global positioning satellite (GPS) receiver, a radio signal time-of-flight sensor, an inertial guidance system including one or more accelerometers or gyroscopes, or an optical landmark sensor. Any single positional system may suffer drift or continuously decreasing precision during operation. Multiple positional systems enhance navigational precision.

In one example, the robot 10 includes an electronic compass that returns a heading accurate to about +/−6 degrees. In another example, the robot 10 includes an odometer. In yet another example, the robot 10 includes a global positioning satellite (GPS) receiver, which provides a heading within a few degrees accuracy after traveling tens of meters in a straight line. By integrating the input from two or more heading systems the heading precision can be improved (for example, in accordance with any of the techniques set forth in U.S. patent application "Mobile Robot Autonomous Navigational and Obstacle-Avoidance System," U.S. Application Ser. No. 60/754,635, filed Dec. 30, 2005, inventor Brian YAMAUCHI, the contents of which are incorporated herein by reference in their entirety). For instance, after mowing a 100 meter swath 23, the robot 10 turns approximately 180 degrees to start a new swath 23 and obtains a first heading vector from the GPS receiver. The GPS may render a degree of error of about plus or minus 6 degrees. The robot 10 obtains a second heading vector from an electronic compass and compares the two heading vectors to determine an averaged heading to follow.

If, for example, it is desired to approximate rows/swaths 23, the robot 10 may obtain, assistance from the heading. Rows/swaths 23 may be made parallel by edge following or without edge following by a heading vector. Alternatively, the rows/swaths 23 may be slightly open and zig-zagged, e.g., opening by a degree amount larger than the heading error every turn. The rows/swaths 23 may alternate parallel rows with closed-angle rows, e.g., crossing back to redo a likely cot area 22 by either more than the heading error or less than the row width every turn. Each row/swath 23 is arranged to successively advance the mowed area 22.

In one example, a hybrid compass/odometry localization technique is used to determine a robot position. The compass is used to determine a robot orientation and odometry is used to determine a distance translated between updates. The robot position is determined using the following equations:

$$\Delta_t = \sqrt{(x_t - x_{t-1})^2 + (y_t - y_{t-1})^2}$$
$$x'_t = \Delta_t \cos\theta_t$$
$$y'_t = \Delta_t \sin\theta_t$$

where (xt, yt) is the odometry position at time t, θt is the compass heading at time t, Δt is the distance traversed between time t−1 and time t, and (x't, y't) is the hybrid compass/odometry position estimate for time t.

Odometry tends to accumulate error. Over a single traverse of the lawn 20, odometry may accumulate over 90 degrees of orientation error, for example. In contrast, a compass in conjunction with odometry enables the robot 10 to determine the robot position within a few degrees. The hybrid compass/odometry localization method may determine a robot position accurately to within a few meters after a circuit of the lawn 20. The inclusion of one to three axes of accelerometer data increases accuracy as well. Any combination of odometry, compass, GPS or inertial guidance may be processed by a Kalman filter if sufficient computation capacity is available.

In examples using GPS inertial or odometric guidance, landmark recognition and/or other dead reckoning or navigational sensors, the robot 10 can determine whether it has crossed a boundary 1006, 1008 into a road, or onto a neighbor's property, for example, and take appropriate corrective action (such as shutting down or navigating back to a home point or recognized landmark).

The robot 10 may align its initial row or each set of rows using a preferred heading. From row 23 to row 23, the robot 10 may use corrected heading data to avoid drift and maintain an appearance of successive rows. The robot 10 may use the corrected heading data to locate new areas to mow as well.

Referring to FIGS. 35A-D, as discussed above, the robot system 5 may use a combination of active boundary wire 6012 and passive guard barriers 6010. The robot system may be provided with splice and/or terminator connectors 5910 for moving, rerouting, or repairing the active boundary 6012. A typical rearrangement is shown in FIG. 35A, where a user has elected not to mow a driveway 1008A but instead reroutes the active boundary 6012 using two splice connectors 5910. The splice connectors 5910 may butt-splice or side-by-side splice a single or dual conductor, and are preferably tool-less snap-closed connectors that include a blade that penetrates insulation and connects the wires 6012. The splice connectors

5910 may also be terminators, e.g., terminating a dual-conductor length to become a loop. The splice connectors 5910 may be used to connect wire 6012 provided as discrete lengths. An example splice connectors 5910 is shown in FIG. 35B. As shown in FIG. 35A, the entire active perimeter 6012 may be a combination of wire lengths and splice connectors 5910 (not excluding other devices which may be placed along the perimeter). In some cases, the splice connectors 5910 may be provided with test circuits useful for checking the position of a break in the boundary (e.g., if each splice connector includes a socket, conductor loops can be tested by connecting adjacent splice connectors using a test line with a detector (e.g., lamp), or by plugging in a test lamp at subsequent splice connectors).

FIGS. 35A and 35C, depicts robot-activated power stations 5912 placed along the active perimeter 6012. The robot-activated power stations 5912 may be battery and/or solar powered, which may in some cases permit isolated lengths to be used or a main extension 5920 from household AC to the powered perimeter boundary 6012 to be avoided. Some power stations 5912 may include an emitter, receiver, or antenna, as well as control. The robot 10, in this case, is provided with an emitter 1510 that "excites" nearby power stations 5912. For example, the robot 10 may be provided with an RF or IR emitter 1510 of limited range that only activates ("wakes up") a power station 5912 when the robot 10 is in a certain range. The excitation range may be longer than the distance between any two to four power stations 5912. After a power station 5912 is activated, it may handshake with the robot 10 over the receiver channel using its own emitter or over another channel for communication (e.g., line-of-sight such as collimated or omnidirectional visible light or IR) to ensure that a neighbor's power stations, for example, are not activated. Implementations that activate a limited portion anywhere along an entire perimeter 6012 (e.g., a sector or sub-portion of the entire boundary including two to four power stations) only when the robot 10 approaches the perimeter 6012, allow the boundary 6012 to be battery powered and/or use smaller batteries. The power stations 5912 may be placed along, and bridge, single conductor or dual conductor perimeters 6012. In the case of dual conductors, any two power stations 5912 or power station 5912 and terminator may close a circuit formed by the dual conductors.

FIG. 35 shows an anchor 5930. An anchor 5930 may be a beacon including a primary non-line of sight emitter of limited signal strength and may include a secondary line of sight or directional emitter as well. When the robot 10 travels outside the signal strength limit of the anchor 5930, it may deactivate or may seek the anchor using the secondary emitter. A virtual anchor may be provided using terrestrial navigation signals, e.g., GPS. A robot 10 provided with a global positioning (GPS) receiver may be locked to a position approximately within the center of the yard to be eared for or mowed. Although commercial GPS typically has insufficient resolution to provide a useful location within most yards and is not reliable under canopy or other natural, barriers. GPS can provide sufficient resolution to determine that the robot 10 is no longer close to an anchor point 5930. A controller 452 on the robot 10 may deactivate the robot 10 when it is sufficiently far (e.g., 100 feet) from its anchor point 5930; and may also activate an anti-theft claxon, radio beacon, lockout, or other countermeasure when the robot 10 is very far (e.g., greater than 200 yards) from its anchor point 5930.

Figure 36:
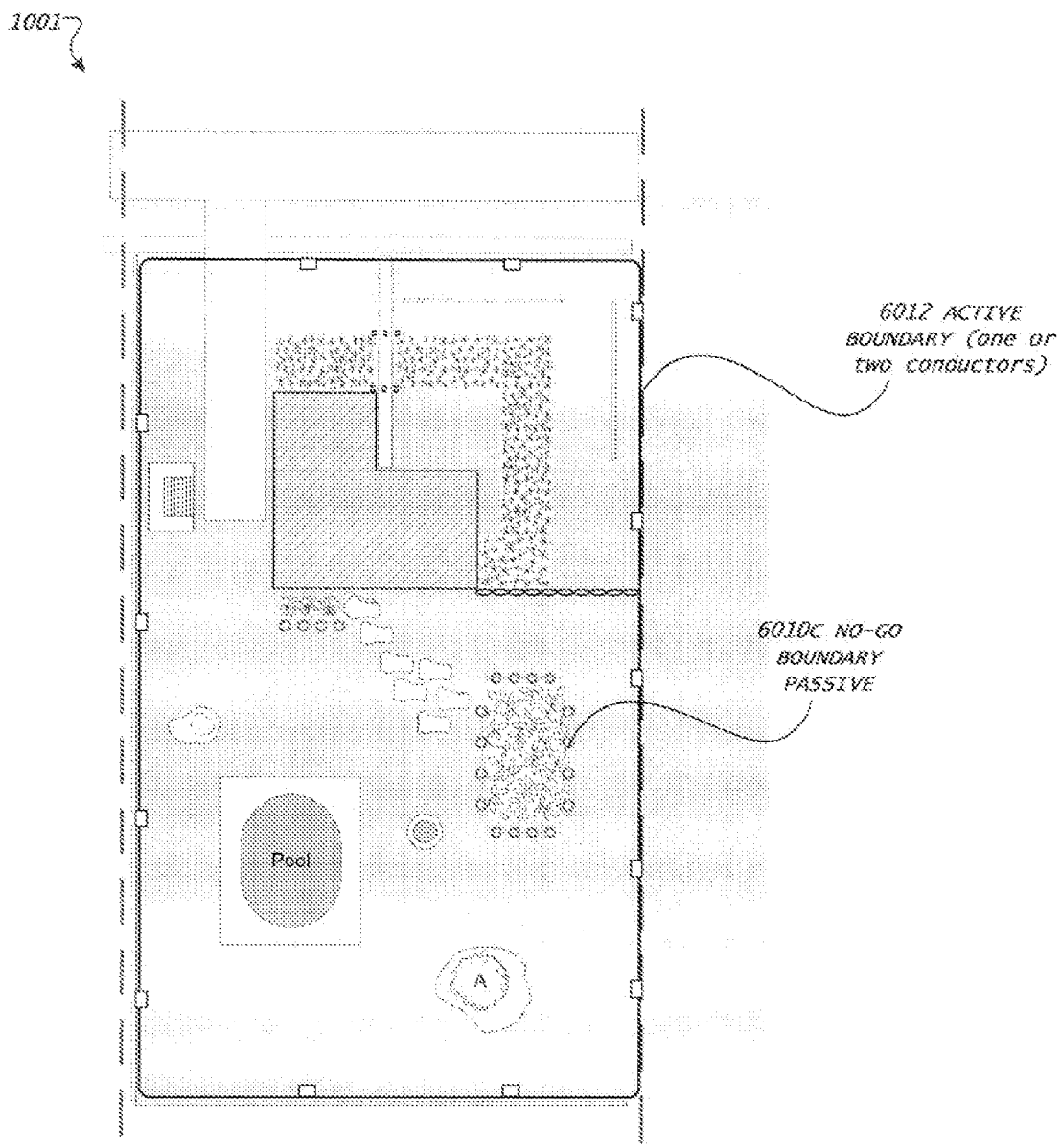
FIG. 36 is a schematic view of a property with a perimeter boundary having splice connectors, power stations, and boundary responders.
Figure 38:
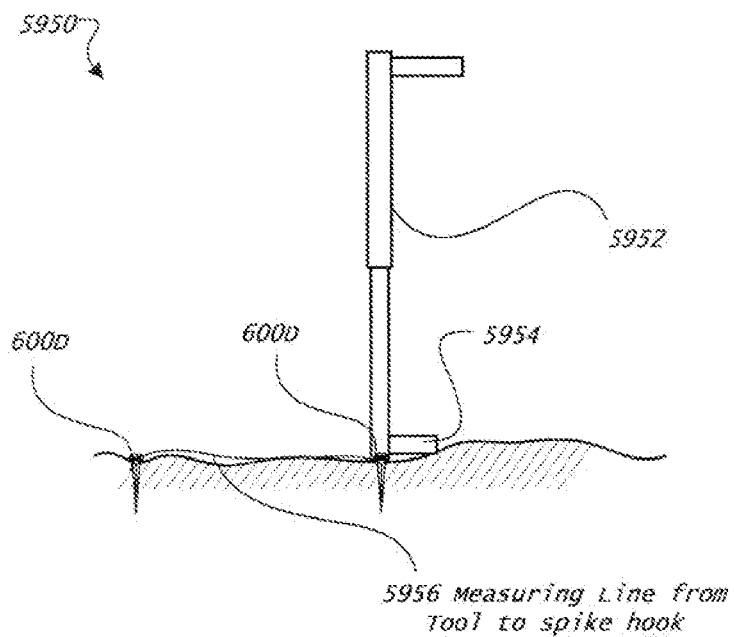
FIG. 38 is a schematic view of a spike type boundary responder installation tool.

FIGS. 36-38 depicts a typical use of passive "spike" type guard barriers 600D. As shown in FIG. 36, the no-go boundary type passive spikes 6010C may be arranged to surround an area that would not be detected by hard surface, boundary, bump, or other detections. The spikes 600D are placed at from one half to two robot working widths from one another, depending on the antenna 1520 and emitter 1510 configuration of the robot 10. The spikes 600D may be used in conjunction with the splice connector 5910-type boundary or power station 5912 type boundary of FIG. 35. As shown in FIG. 37, each spike 600D may include an RFID or tank circuit disposed on a horizontal thumbtack-type head. The head 612 prevents the spike 600D from being pushed too far (more than 3-5 inches for a spike of corresponding length) into the ground and burying the circuit 620 to be detected. The perpendicular orientation of the spike-head circuit 620 permits arranging the antenna or circuit 620 in the best orientation (e.g., parallel) to be excited and/or detected by an antenna 1510 on the robot 10. The head 612 may be provided with hooks or holes 612A formed therein for using a line to check the distance between spikes. Optionally, each spike or some spikes may be provided with a flag 612B (e.g., "corner" spikes with a different resonant frequency or encoding, and used in corners, may be the only ones provided with small flags).

Spikes 600D may be easier to install if they are provided with an installation tool 5950. The tool 5950 may be a "spiking tool" approximately 36 to 48 inches in height (i.e., the approximate height or lower of a typical user's hip) and may be provided with a handle 5952 at the top and a stirrup 5954 at the bottom. In use, a spike 600D may be placed in the tool 5950 (either manually in a slot or loaded from the top of the tool 5950 to fall into a receiving mechanism at the bottom). Then the tool 5950 is arranged to insert the spike 600D in the earth. The stirrup 5954 permits the user to use his or her weight to force the spike 600D into the ground. A measuring line 5956 may hang from the tool 5950, and the measuring line 5956 may be hooked or fixed to a last-placed adjacent spike 5950 to set a distance from spike to spike. The tool 5950 may also be provided with a clamp or levering mechanism to more easily close the splice connectors previously mentioned. The shall extending from the handle 5952 to the stirrup 5954 may include a telescoping, folding, or other compacting mechanism to permit the tool 5950 to stow in a smaller size. In this case, the clamp or levering mechanism may be arranged for use with the tool 5950 in the smaller size.

A number of implementations have been described. Nevertheless, it will be understood that various modifications may be made without departing from the spirit and scone of the disclosure. For example, the robot may be used without a network. The network may be used without a robot. A different mobility platform may be provided for the robot. No one (or more) element or feature described is implicitly, explicitly, or inherently critical or necessary to the operation of the robot or lawn care system, except as explicitly described herein. Although several sensor arrangements have been described as detecting grass along a lateral line substantially perpendicular to the direction of forward movement, the sensor orientation itself may be front to backer diagonal. Although reference has been made to lawn-mowing and/or shrub-trimming robots, it is nonetheless understood that any of the features set forth also apply to any lawn care autonomous robot. Accordingly, other implementations are within the scope of the following claims.

What is claimed is:

1. A robot lawnmower swath edge detector system comprising:
 a controller carried by a body of a robot; and
 a grass length sensor carried by the body of the robot and in communication with the controller, the grass length sensor comprising:
  a sensor housing defining a cavity and a cavity opening directly downward configured to allow grass entry into the cavity while inhibiting direct sunlight into the cavity;
  an emitter carried by the housing in the cavity and configured to emit an emission across the cavity opening; and
  a receiver carried by the housing and configured to receive a grass-reflected emission, the receiver positioned in the cavity in a position where the housing blocks direct sunlight and the receiver positioned in the cavity on substantially the same side of the housing as the emitter in a location relative to the emitter such that the receiver receives emissions reflected from grass penetrating into the cavity;
 wherein the controller compares outputs from multiple ones of the grass length sensors to determine a swath edge location.

2. The robot lawnmower swath edge detector system of claim 1 wherein the grass length sensor comprises a plurality of grass length sensors spans a distance comprising at least a steering error distance and a grass length sensor width.

3. The robot lawnmower swath edge detector system of claim 2 wherein the grass length sensors are substantially equally spaced apart.

4. The robot lawnmower swath edge detector system of claim 2 wherein the grass length sensors are separated by dividers.

5. The robot lawnmower swath edge detector system of claim 2 wherein the controller compares outputs from multiple ones of the grass length sensors to provide a calibration.

6. The robot lawnmower swath edge detector system of claim 2 wherein the grass length sensors acquire a grass height estimate.

7. The robot lawnmower swath edge detector system of claim 1 wherein the grass length sensor comprises a plurality of grass length sensors spans a distance of between about 4 and about 10 inches.

8. The robot lawnmower swath edge detector system of claim 1 wherein the grass length sensor comprises a plurality of grass length sensors spanning a distance of a width of the body of the robot.

9. The robot lawnmower swath edge detector system of claim 1 wherein the grass length sensor comprises plurality of grass length sensors spanning a distance of a portion of the width of the robot body.

10. The robot lawnmower swath edge detector system of claim 1 wherein the cavity is colored a light-absorbing color.

11. The robot lawnmower swath edge detector system of claim 10 wherein the cavity is colored black.

12. The robot lawnmower swath edge detector system of claim 1 wherein the sensor housing is configured to deflect uncut grass.

13. The robot lawnmower swath edge detector system of claim 12 wherein the sensor housing is configured to allow deflected uncut grass to self-straighten upward through the cavity opening and into the cavity.

14. The robot lawnmower swath edge detector system of claim 1 wherein the sensor housing is mounted to the body of the robot at a height relative to a ground surface that minimizes entrance of cut grass into the cavity.

15. The robot lawnmower swath edge detector system of claim 1 wherein the emitter includes a visible light emitter.

16. The robot lawnmower swath edge detector system of claim 1 wherein the receiver includes a visible light receiver.

17. The robot lawnmower swath edge detector system of claim 1 wherein the receiver is positioned below the emitter.

18. The robot lawnmower swath edge detector system of claim 1 wherein the receiver is positioned within the cavity so as to not receive any direct sunlight.

19. The robot lawnmower swath edge detector system of claim 1 wherein the receiver has a defined field of view that intersects a field of emission of the emitter.

20. The robot lawnmower swath edge detector system of claim 1 wherein the emitter and receiver are positioned within the cavity at a height such that grass below a specific height does not reflect grass-reflected emissions back to the receiver.

* * * * *